US012285379B2

(12) United States Patent
Zhou et al.

(10) Patent No.: US 12,285,379 B2
(45) Date of Patent: Apr. 29, 2025

(54) SYSTEMS, METHODS, AND DEVICES FOR PERCUSSIVE MASSAGE THERAPY

(71) Applicant: Therabody, Inc., Los Angeles, CA (US)

(72) Inventors: Zenger Zhou, Shenzhen (CN); Jaime Sanchez Solana, Los Angeles, CA (US); Eduardo Merino, Los Angeles, CA (US); Timothy Roberts, Los Angeles, CA (US); Sunny Wang, Dongguan (CN); Lymond Lin, Shenzhen (CN); Tony Zhong, Shenzhen (CN); Danny Zeng, Shenzhen (CN); Alex Zhu, Xiamen (CN); Richard Tang, Shenzhen (CN); Yc Liu, Shenzhen (CN); Yano Pang, Shenzhen (CN); Phil Huang, Shenzhen (CN)

(73) Assignee: Therabody, Inc., Los Angeles, CA (US)

( * ) Notice: Subject to any disclaimer, the term of this patent is extended or adjusted under 35 U.S.C. 154(b) by 0 days.

(21) Appl. No.: 18/397,229

(22) Filed: Dec. 27, 2023

(65) Prior Publication Data

US 2025/0099323 A1 Mar. 27, 2025

Related U.S. Application Data

(63) Continuation of application No. 18/534,304, filed on Dec. 8, 2023, now Pat. No. 12,161,599, which is a (Continued)

(51) Int. Cl.

*A61H 23/00* (2006.01)
*A61H 23/02* (2006.01)

(52) U.S. Cl.

CPC ....... *A61H 23/006* (2013.01); *A61H 23/0263* (2013.01); *A61H 2201/0153* (2013.01);
(Continued)

(58) Field of Classification Search

CPC .... A61H 23/00; A61H 23/006; A61H 23/008; A61H 23/02; A61H 23/0254;
(Continued)

(56) References Cited

U.S. PATENT DOCUMENTS

| | | | |
|---|---|---|---|
| 657,765 | A | 9/1900 | Gibbs |
| 675,772 | A | 6/1901 | Ferguson |

(Continued)

FOREIGN PATENT DOCUMENTS

| | | | |
|---|---|---|---|
| AT | 510048 | A1 | 1/2012 |
| AU | 2019204770 | B1 | 10/2019 |

(Continued)

OTHER PUBLICATIONS

Bob & Brad YouTube channel, "Massage Gun Heads: Heal Muscles Faster by Using Correct Head", YouTube (Year: 2020).*

(Continued)

*Primary Examiner* — Colin W Stuart

(74) *Attorney, Agent, or Firm* — Sterne, Kessler, Goldstein & Fox P.L.L.C.

(57) ABSTRACT

A massage head for a percussive therapy device includes a base. The base is configured to connect a massage attachment to a reciprocating shaft of a percussive therapy device. The massage head also includes an end portion that includes a heater. The massage head also includes a medial portion located between the base and the end portion. The medial portion is configured to resiliently bias the end portion away from the base.

17 Claims, 42 Drawing Sheets

Related U.S. Application Data continuation of application No. PCT/CN2023/120408, filed on Sep. 21, 2023.

(52) U.S. Cl.
CPC .................. *A61H 2201/149* (2013.01); *A61H 2201/1664* (2013.01); *A61H 2201/1685* (2013.01)

(58) Field of Classification Search
CPC ........ A61H 2201/0165; A61H 2201/02; A61H 2201/0207; A61H 2201/0221; A61H 2201/0228; A61H 2201/0285; A61H 2201/0153; A61H 2201/149; A61H 2201/1664; A61H 2201/1685
See application file for complete search history.

(56) References Cited

U.S. PATENT DOCUMENTS 1,545,027 A 7/1925 Ashlock
1,594,636 A 8/1926 Smith
1,657,765 A 1/1928 Pasque
1,784,301 A 12/1930 Mekler
D91,454 S 2/1934 Decker
D93,943 S 11/1934 Harry
2,179,594 A 11/1939 Johnson
D118,980 S 2/1940 Gilbert
D129,045 S 8/1941 Glenn
2,391,671 A 12/1945 Berg
D143,678 S 1/1946 Snyder et al.
2,475,861 A 7/1949 Alfred
D161,484 S 1/1951 Curtis
D163,324 S 5/1951 Charles
D180,923 S 9/1957 Nicholas
D181,742 S 12/1957 Alfred
2,931,632 A 4/1960 De Angelis et al.
2,987,334 A 6/1961 Wendling
3,053,559 A 9/1962 Norval
3,077,837 A 2/1963 Sidney et al.
D195,145 S 4/1963 Robert
D197,142 S 12/1963 James
3,172,675 A 3/1965 Gonzalez
D207,505 S 4/1967 Whitman
3,452,226 A 6/1969 Hettich
3,545,301 A 12/1970 Richter
3,626,934 A 12/1971 Andis
3,699,952 A 10/1972 Waters et al.
3,705,579 A 12/1972 Morini et al.
D230,522 S 2/1974 Norman
D237,454 S 11/1975 James
D237,455 S 11/1975 Schramm
3,942,251 A 3/1976 Griffies et al.
3,968,789 A 7/1976 Simoncini
4,031,763 A 6/1977 Eisenberg
4,046,142 A 9/1977 Whitney
4,088,128 A 5/1978 Mabuchi
4,150,668 A 4/1979 Johnston
4,158,246 A 6/1979 Meadows et al.
4,173,217 A 11/1979 Johnston
4,203,431 A 5/1980 Abura et al.
D265,985 S 8/1982 House, II
4,506,159 A 3/1985 Reuter et al.
4,513,737 A 4/1985 Mabuchi
4,533,796 A 8/1985 Engelmore
4,549,535 A 10/1985 Wing
4,565,189 A 1/1986 Mabuchi
4,566,442 A 1/1986 Mabuchi et al.
4,596,406 A 6/1986 Van Vleet et al.
D287,814 S 1/1987 Hiraishi et al.
4,691,693 A 9/1987 Sato
4,692,958 A 9/1987 McMakin
D292,368 S 10/1987 Mikiya
4,730,605 A 3/1988 Noble et al.
D300,132 S 3/1989 Culbertson et al.
4,815,224 A 3/1989 Miller
4,841,955 A 6/1989 Evans et al.
D303,373 S 9/1989 Ching, Jr.
D310,005 S 8/1990 Precht
D314,320 S 2/1991 Brosius et al.
4,989,613 A 2/1991 Finkenberg
4,991,298 A 2/1991 Matre
5,014,681 A 5/1991 Heeman et al.
D320,379 S 10/1991 Culbertson
D321,338 S 11/1991 Sakamoto et al.
5,085,207 A 2/1992 Fiore
5,088,474 A 2/1992 Mabuchi et al.
5,092,317 A 3/1992 Zelikovski
5,103,809 A 4/1992 DeLuca et al.
5,123,139 A 6/1992 Leppert et al.
D329,166 S 9/1992 Doggett
D329,291 S 9/1992 Wollman
D329,292 S 9/1992 Wollman
D331,467 S 12/1992 Wollman
D334,012 S 3/1993 Chen
5,201,149 A 4/1993 Eisenblatter
5,207,697 A 5/1993 Carusillo et al.
5,212,887 A 5/1993 Farmerie
D338,802 S 8/1993 Maass
D345,077 S 3/1994 Maass
D345,727 S 4/1994 Flowers et al.
D345,888 S 4/1994 Joss et al.
D349,029 S 7/1994 Matsunaga et al.
5,417,644 A 5/1995 Lee
D363,352 S 10/1995 Huen
D367,712 S 3/1996 Young
5,501,657 A 3/1996 Feero
D374,934 S 10/1996 Lie
5,569,168 A 10/1996 Hartwig
5,573,500 A 11/1996 Katsunuma et al.
5,656,017 A 8/1997 Keller et al.
5,656,018 A 8/1997 Tseng
D383,366 S 9/1997 Heck
D383,435 S 9/1997 Svetlik
D384,639 S 10/1997 Kawakami et al.
D387,728 S 12/1997 Kawakami et al.
D388,175 S 12/1997 Lie
D397,991 S 9/1998 Kawakami et al.
D400,161 S 10/1998 Nagele et al.
D400,758 S 11/1998 Hippen et al.
5,860,669 A 1/1999 Wass et al.
D408,543 S 4/1999 Back
5,910,197 A 6/1999 Chaconas
5,925,002 A 7/1999 Wollman
D412,485 S 8/1999 Kato et al.
5,935,089 A 8/1999 Shimizu
5,951,501 A 9/1999 Griner
D417,648 S 12/1999 Clowers et al.
6,003,052 A 12/1999 Yamagata
6,006,631 A 12/1999 Miner et al.
D425,014 S 5/2000 Willkens et al.
D430,774 S 9/2000 Naft et al.
D430,938 S 9/2000 Lee
D432,077 S 10/2000 Zurwelle et al.
D433,300 S 11/2000 Buck
6,146,383 A 11/2000 Studer et al.
6,165,145 A 12/2000 Noble
D439,984 S 4/2001 Thach
D440,136 S 4/2001 Buck
6,227,959 B1 5/2001 Beaudry
6,228,042 B1 5/2001 Dungan
6,228,120 B1 5/2001 Leonard et al.
6,245,031 B1 6/2001 Pearson
6,290,660 B1 9/2001 Epps et al.
D448,852 S 10/2001 Engelen
6,401,289 B1 6/2002 Herbert
6,406,445 B1 6/2002 Ben-Nun
6,432,072 B1 8/2002 Harris et al.
6,479,752 B1 11/2002 Neuroth et al.
6,537,236 B2 3/2003 Tucek et al.
6,539,328 B1 3/2003 Cremonese et al.
D474,445 S 5/2003 Matsuoka et al.
6,558,338 B1 5/2003 Wasserman
6,568,089 B1 5/2003 Popik et al.

(56) References Cited

U.S. PATENT DOCUMENTS

| | | | |
|---|---|---|---|
| D475,595 | S | 6/2003 | Hatch et al. |
| D475,679 | S | 6/2003 | Cooper et al. |
| D476,746 | S | 7/2003 | Harris et al. |
| 6,599,250 | B2 | 7/2003 | Webb et al. |
| 6,599,260 | B2 | 7/2003 | Tucek et al. |
| D478,385 | S | 8/2003 | Dirks et al. |
| D481,279 | S | 10/2003 | Buck |
| 6,663,657 | B1 | 12/2003 | Miller |
| 6,682,496 | B1 | 1/2004 | Pivaroff |
| 6,715,781 | B1 | 4/2004 | Smith |
| 6,723,050 | B2 | 4/2004 | Dow et al. |
| 6,723,060 | B2 | 4/2004 | Miller |
| 6,758,826 | B2 | 7/2004 | Luettgen et al. |
| 6,805,700 | B2 | 10/2004 | Miller |
| 6,823,762 | B2 | 11/2004 | Hu |
| 6,846,295 | B1 | 1/2005 | Ben-Nun |
| D504,111 | S | 4/2005 | Ozawa et al. |
| D510,317 | S | 10/2005 | Sun |
| 6,994,575 | B1 | 2/2006 | Clark et al. |
| 7,041,072 | B2 | 5/2006 | Calvert |
| D530,270 | S | 10/2006 | Ozawa et al. |
| 7,128,721 | B2 | 10/2006 | Ferber et al. |
| D531,733 | S | 11/2006 | Burout, III et al. |
| 7,169,169 | B2 | 1/2007 | Tucek et al. |
| 7,223,250 | B2 | 5/2007 | Brattesani et al. |
| D544,102 | S | 6/2007 | Pivaroff |
| D544,436 | S | 6/2007 | Kawahara et al. |
| D547,264 | S | 7/2007 | Kondo |
| D553,252 | S | 10/2007 | Masuda |
| D553,562 | S | 10/2007 | Okada et al. |
| 7,384,405 | B2 | 6/2008 | Rhoades |
| D575,224 | S | 8/2008 | Taniguchi et al. |
| 7,431,706 | B2 | 10/2008 | Louis |
| D579,868 | S | 11/2008 | Harrison |
| D580,353 | S | 11/2008 | Harrison et al. |
| 7,470,081 | B2 | 12/2008 | Miyahara et al. |
| D587,977 | S | 3/2009 | Waldron |
| 7,497,639 | B2 | 3/2009 | Lebot et al. |
| 7,503,923 | B2 | 3/2009 | Miller |
| D593,204 | S | 5/2009 | Manke et al. |
| 7,549,966 | B2 | 6/2009 | Fujii et al. |
| D597,482 | S | 8/2009 | Kondo et al. |
| D604,235 | S | 11/2009 | Tarter |
| D605,586 | S | 12/2009 | Tong |
| D606,192 | S | 12/2009 | Summerer et al. |
| 7,731,672 | B2 | 6/2010 | Chiang |
| 7,740,249 | B1 | 6/2010 | Gao |
| D622,660 | S | 8/2010 | Taniguchi et al. |
| 7,857,729 | B2 | 12/2010 | Sullivan et al. |
| D631,315 | S | 1/2011 | Xue et al. |
| 7,877,880 | B2 | 2/2011 | Royle |
| 7,927,259 | B1 | 4/2011 | Rix |
| 7,927,294 | B2 | 4/2011 | Kamimura et al. |
| 7,946,977 | B2 | 5/2011 | Klearman et al. |
| 7,963,717 | B2 | 6/2011 | Seger |
| 7,996,996 | B2 | 8/2011 | Hirabayashi |
| D649,657 | S | 11/2011 | Petersen et al. |
| D658,759 | S | 5/2012 | Marescaux et al. |
| D659,644 | S | 5/2012 | Gretz |
| D666,303 | S | 8/2012 | Ding et al. |
| 8,313,450 | B2 | 11/2012 | Ben-Nun |
| 8,342,187 | B2 | 1/2013 | Kalman et al. |
| D682,195 | S | 5/2013 | Aglassinger |
| 8,435,194 | B2 | 5/2013 | Dverin et al. |
| 8,479,616 | B2 | 7/2013 | Tsai |
| 8,517,895 | B2 | 8/2013 | Shalev et al. |
| 8,622,943 | B2 | 1/2014 | Ben-Nun |
| 8,646,348 | B2 | 2/2014 | Hung |
| D703,337 | S | 4/2014 | Fuhr et al. |
| D703,480 | S | 4/2014 | Lownds |
| 8,695,461 | B2 | 4/2014 | Moss et al. |
| D706,433 | S | 6/2014 | Fuhr et al. |
| D708,742 | S | 7/2014 | Dallemagne et al. |
| 8,770,882 | B2 | 7/2014 | Ersoy |
| 8,777,881 | B2 | 7/2014 | Tsai |
| 8,864,143 | B2 | 10/2014 | Lin |
| 8,870,796 | B2 | 10/2014 | Hoffmann |
| D722,016 | S | 2/2015 | Beukema |
| 8,945,104 | B2 | 2/2015 | Boone, III et al. |
| 8,951,216 | B2 | 2/2015 | Yoo et al. |
| D726,495 | S | 4/2015 | Ryan |
| 9,017,273 | B2 | 4/2015 | Burbank et al. |
| D734,863 | S | 7/2015 | Hennessey |
| D735,348 | S | 7/2015 | Hennessey |
| 9,107,486 | B2 | 8/2015 | Brewer et al. |
| 9,132,058 | B2 | 9/2015 | Imboden et al. |
| 9,138,257 | B2 | 9/2015 | Revivo |
| D740,222 | S | 10/2015 | Tang |
| 9,272,837 | B2 | 3/2016 | Linzell |
| D756,180 | S | 5/2016 | Chen |
| D759,237 | S | 6/2016 | Heath et al. |
| D759,238 | S | 6/2016 | Heath et al. |
| 9,364,385 | B2 | 6/2016 | Yang |
| D763,442 | S | 8/2016 | Price et al. |
| 9,416,805 | B2 | 8/2016 | Cascolan et al. |
| D776,612 | S | 1/2017 | Chen et al. |
| D778,439 | S | 2/2017 | Håkansson et al. |
| 9,597,256 | B1 | 3/2017 | Paul |
| 9,677,901 | B2 | 6/2017 | Yamamoto |
| 9,744,600 | B2 | 8/2017 | Yang et al. |
| 9,872,813 | B2 | 1/2018 | Giraud et al. |
| 9,889,066 | B2 | 2/2018 | Danby et al. |
| D817,732 | S | 5/2018 | Rettler |
| D817,869 | S | 5/2018 | Lee et al. |
| D819,221 | S | 5/2018 | Lei |
| 9,981,366 | B2 | 5/2018 | Todd et al. |
| D823,478 | S | 7/2018 | Park |
| 10,034,813 | B1 | 7/2018 | Silver |
| D826,418 | S | 8/2018 | Lad |
| D837,395 | S | 1/2019 | Gan |
| D838,378 | S | 1/2019 | Cao |
| D840,547 | S | 2/2019 | Harle et al. |
| 10,201,470 | B2 | 2/2019 | Griner |
| D842,489 | S | 3/2019 | Spewock et al. |
| D842,491 | S | 3/2019 | Fleming et al. |
| D843,656 | S | 3/2019 | Zhang et al. |
| D844,896 | S | 4/2019 | Levi et al. |
| D847,362 | S | 4/2019 | Tang |
| D847,364 | S | 4/2019 | Lee et al. |
| 10,252,051 | B2 | 4/2019 | Nichols |
| 10,276,844 | B2 | 4/2019 | Wackwitz et al. |
| D847,990 | S | 5/2019 | Kimball |
| 10,314,762 | B1 | 6/2019 | Marton et al. |
| 10,335,345 | B2 | 7/2019 | Choe |
| 10,357,425 | B2 | 7/2019 | Wersland et al. |
| D855,822 | S | 8/2019 | Marton et al. |
| D858,432 | S | 9/2019 | Altenburger |
| D862,382 | S | 10/2019 | Altenburger |
| D866,790 | S | 11/2019 | Lee et al. |
| D867,279 | S | 11/2019 | Altenburger |
| 10,557,490 | B2 | 2/2020 | Wersland et al. |
| D877,351 | S | 3/2020 | Wersland et al. |
| D880,419 | S | 4/2020 | Hernandez et al. |
| D880,714 | S | 4/2020 | Wersland et al. |
| D880,715 | S | 4/2020 | Wersland et al. |
| D880,716 | S | 4/2020 | Wersland et al. |
| D884,205 | S | 5/2020 | Zhuang |
| 10,702,448 | B2 | 7/2020 | Wersland et al. |
| D893,738 | S | 8/2020 | Zhuang |
| 10,758,027 | B2 | 9/2020 | Skidmore et al. |
| 10,857,064 | B2 | 12/2020 | Wersland et al. |
| 10,918,565 | B2 | 2/2021 | Wersland et al. |
| 10,940,081 | B2 | 3/2021 | Nazarian et al. |
| 10,945,915 | B2 | 3/2021 | Wersland et al. |
| 10,959,674 | B2 | 3/2021 | Leaper |
| 10,959,908 | B2 | 3/2021 | Lee et al. |
| 10,959,911 | B2 | 3/2021 | Wersland et al. |
| D919,560 | S | 5/2021 | Taniguchi et al. |
| 10,993,874 | B1 | 5/2021 | Marton et al. |
| 11,090,221 | B1 | 8/2021 | Haddock Dicarlo et al. |
| 11,160,721 | B2 | 11/2021 | Wersland et al. |
| 11,160,723 | B2 | 11/2021 | Wersland et al. |
| 11,357,697 | B2 | 6/2022 | Wersland et al. |
| 11,432,994 | B2 | 9/2022 | Wersland et al. |

(56) References Cited

U.S. PATENT DOCUMENTS

| | | | |
|---|---|---|---|
| 11,452,667 | B2 | 9/2022 | Tan et al. |
| 11,452,670 | B2 | 9/2022 | Wersland et al. |
| 11,478,400 | B1 | 10/2022 | Marton et al. |
| 11,478,606 | B1 | 10/2022 | English et al. |
| 11,488,592 | B2 | 11/2022 | Kim et al. |
| 11,564,860 | B2 | 1/2023 | Wersland et al. |
| 11,819,625 | B1 | 11/2023 | Nazarian et al. |
| 2001/0016697 | A1 | 8/2001 | Gorsen |
| 2001/0027280 | A1 | 10/2001 | Huang |
| 2002/0057203 | A1 | 5/2002 | Borders et al. |
| 2002/0082532 | A1 | 6/2002 | Tucek et al. |
| 2002/0115947 | A1 | 8/2002 | Young |
| 2002/0119767 | A1 | 8/2002 | Fieldhouse et al. |
| 2002/0177795 | A1 | 11/2002 | Frye |
| 2002/0182563 | A1 | 12/2002 | Boutoussov et al. |
| 2002/0183668 | A1 | 12/2002 | Huang |
| 2002/0188233 | A1 | 12/2002 | Denyes |
| 2003/0009116 | A1 | 1/2003 | Luettgen et al. |
| 2003/0014079 | A1 | 1/2003 | Tucek |
| 2003/0028134 | A1 | 2/2003 | Lev et al. |
| 2003/0094356 | A1 | 5/2003 | Waldron |
| 2003/0144615 | A1 | 7/2003 | Lin |
| 2003/0195443 | A1 | 10/2003 | Miller |
| 2004/0176710 | A1 | 9/2004 | Kennedy et al. |
| 2005/0075591 | A1 | 4/2005 | Hafemann |
| 2005/0109137 | A1 | 5/2005 | Hartmann |
| 2005/0113870 | A1 | 5/2005 | Miller |
| 2005/0126018 | A1 | 6/2005 | Haas |
| 2005/0131461 | A1 | 6/2005 | Tucek et al. |
| 2005/0203445 | A1 | 9/2005 | Tsai |
| 2005/0235988 | A1 | 10/2005 | Hansen et al. |
| 2005/0252011 | A1 | 11/2005 | Neumeier |
| 2006/0025710 | A1 | 2/2006 | Schulz et al. |
| 2006/0047315 | A1 | 3/2006 | Colloca et al. |
| 2006/0074455 | A1 | 4/2006 | Strandberg |
| 2006/0116614 | A1 | 6/2006 | Jones et al. |
| 2006/0118841 | A1 | 6/2006 | Eliason et al. |
| 2006/0123941 | A1 | 6/2006 | Wadge |
| 2006/0178603 | A1 | 8/2006 | Popescu |
| 2006/0192527 | A1 | 8/2006 | Kageler et al. |
| 2006/0211961 | A1 | 9/2006 | Meyer et al. |
| 2006/0272664 | A1 | 12/2006 | O'Dwyer |
| 2007/0055186 | A1 | 3/2007 | Hsieh |
| 2007/0129220 | A1 | 6/2007 | Bardha |
| 2007/0144310 | A1 | 6/2007 | Pozgay et al. |
| 2007/0150004 | A1 | 6/2007 | Colloca et al. |
| 2007/0173886 | A1 | 7/2007 | Rousso et al. |
| 2007/0179414 | A1 | 8/2007 | Imboden et al. |
| 2007/0270727 | A1 | 11/2007 | Khorassani Zadeh |
| 2007/0282228 | A1 | 12/2007 | Einav et al. |
| 2007/0299464 | A1 | 12/2007 | Cruise et al. |
| 2008/0077061 | A1 | 3/2008 | Dehli |
| 2008/0097260 | A1 | 4/2008 | Tsukada et al. |
| 2008/0103419 | A1 | 5/2008 | Adamson |
| 2008/0146980 | A1 | 6/2008 | Rousso et al. |
| 2008/0167588 | A1 | 7/2008 | Chen |
| 2008/0169715 | A1 | 7/2008 | Mills et al. |
| 2008/0177207 | A1 | 7/2008 | Liao |
| 2008/0185888 | A1 | 8/2008 | Beall et al. |
| 2008/0200849 | A1 | 8/2008 | Hollington et al. |
| 2008/0243041 | A1 | 10/2008 | Brenner et al. |
| 2008/0306417 | A1 | 12/2008 | Imboden et al. |
| 2008/0312568 | A1 | 12/2008 | Chen |
| 2008/0314610 | A1 | 12/2008 | Meixner |
| 2009/0005812 | A1 | 1/2009 | Fuhr |
| 2009/0112134 | A1 | 4/2009 | Avni |
| 2009/0188119 | A1 | 7/2009 | Oberheim |
| 2009/0270777 | A1 | 10/2009 | Wu et al. |
| 2009/0309313 | A1 | 12/2009 | Knorr et al. |
| 2009/0326540 | A1 | 12/2009 | Estes |
| 2010/0100119 | A1 | 4/2010 | Herndon |
| 2010/0137752 | A1 | 6/2010 | Heine et al. |
| 2010/0137907 | A1 | 6/2010 | Tsai |
| 2010/0145242 | A1 | 6/2010 | Tsai |
| 2010/0160841 | A1 | 6/2010 | Wu |
| 2010/0162579 | A1 | 7/2010 | Naughton et al. |
| 2010/0176919 | A1 | 7/2010 | Myers et al. |
| 2010/0204694 | A1 | 8/2010 | Mehta et al. |
| 2010/0210194 | A1 | 8/2010 | Thomaschewski et al. |
| 2010/0249637 | A1 | 9/2010 | Walter et al. |
| 2010/0274162 | A1 | 10/2010 | Evans |
| 2010/0286569 | A1 | 11/2010 | Nagano |
| 2010/0298863 | A1 | 11/2010 | Hindinger et al. |
| 2011/0037431 | A1 | 2/2011 | Mackle |
| 2011/0055720 | A1 | 3/2011 | Potter et al. |
| 2011/0098537 | A1 | 4/2011 | Justis et al. |
| 2011/0098615 | A1 | 4/2011 | Whalen et al. |
| 2011/0118637 | A1 | 5/2011 | Lev et al. |
| 2011/0201979 | A1 | 8/2011 | Voss et al. |
| 2011/0224580 | A1 | 9/2011 | Leathers et al. |
| 2011/0314677 | A1 | 12/2011 | Meier et al. |
| 2012/0059294 | A1 | 3/2012 | Schubert et al. |
| 2012/0065556 | A1 | 3/2012 | Smith et al. |
| 2012/0078071 | A1 | 3/2012 | Bohm et al. |
| 2012/0124758 | A1 | 5/2012 | Sabisch et al. |
| 2012/0161706 | A1 | 6/2012 | Zhou |
| 2012/0197357 | A1 | 8/2012 | Dewey et al. |
| 2012/0207147 | A1 | 8/2012 | Macdonald et al. |
| 2012/0232445 | A1 | 9/2012 | Lev et al. |
| 2012/0238922 | A1 | 9/2012 | Stemple et al. |
| 2012/0253245 | A1 | 10/2012 | Stanbridge |
| 2013/0014968 | A1 | 1/2013 | Kehoe et al. |
| 2013/0030506 | A1 | 1/2013 | Bartolone et al. |
| 2013/0046212 | A1 | 2/2013 | Nichols |
| 2013/0052871 | A1 | 2/2013 | Eklind |
| 2013/0085421 | A1 | 4/2013 | Gillespie et al. |
| 2013/0116503 | A1 | 5/2013 | Mertens et al. |
| 2013/0133210 | A1 | 5/2013 | Weir et al. |
| 2013/0138023 | A1 | 5/2013 | Lerro |
| 2013/0218058 | A1 | 8/2013 | Ceoldo et al. |
| 2013/0237751 | A1 | 9/2013 | Alexander |
| 2013/0241470 | A1 | 9/2013 | Kim |
| 2013/0261516 | A1 | 10/2013 | Cilea et al. |
| 2013/0261517 | A1 | 10/2013 | Rodgers |
| 2013/0271067 | A1 | 10/2013 | Yu et al. |
| 2013/0281897 | A1 | 10/2013 | Hoffmann et al. |
| 2013/0304642 | A1 | 11/2013 | Campos |
| 2014/0024982 | A1 | 1/2014 | Doyle |
| 2014/0031866 | A1 | 1/2014 | Fuhr et al. |
| 2014/0097793 | A1 | 4/2014 | Wurtz et al. |
| 2014/0101872 | A1 | 4/2014 | Utsch et al. |
| 2014/0163443 | A1 | 6/2014 | Young et al. |
| 2014/0180331 | A1 | 6/2014 | Turner |
| 2014/0190023 | A1 | 7/2014 | Vitantonio et al. |
| 2014/0194900 | A1 | 7/2014 | Sedic |
| 2014/0200495 | A1 | 7/2014 | Jones |
| 2014/0202493 | A1 | 7/2014 | Zelickson et al. |
| 2014/0207032 | A1 | 7/2014 | Dematio et al. |
| 2014/0209594 | A1 | 7/2014 | Besner |
| 2014/0221887 | A1 | 8/2014 | Wu |
| 2014/0288473 | A1 | 9/2014 | Matsushita |
| 2014/0305747 | A1 | 10/2014 | Kumar et al. |
| 2014/0310900 | A1 | 10/2014 | Curry et al. |
| 2014/0316313 | A1 | 10/2014 | Mayer et al. |
| 2015/0005682 | A1 | 1/2015 | Danby et al. |
| 2015/0042254 | A1 | 2/2015 | Kato |
| 2015/0045702 | A1 | 2/2015 | Lin |
| 2015/0082562 | A1 | 3/2015 | Kamada |
| 2015/0098184 | A1 | 4/2015 | Tsai et al. |
| 2015/0119771 | A1 | 4/2015 | Roberts |
| 2015/0133833 | A1 | 5/2015 | Bradley et al. |
| 2015/0145297 | A1 | 5/2015 | Lee |
| 2015/0148592 | A1 | 5/2015 | Kanbar et al. |
| 2015/0157528 | A1 | 6/2015 | Le et al. |
| 2015/0176674 | A1 | 6/2015 | Khan et al. |
| 2015/0216719 | A1 | 8/2015 | DeBenedictis et al. |
| 2015/0217142 | A1 | 8/2015 | Schafer |
| 2015/0257964 | A1 | 9/2015 | Ajiki |
| 2015/0305969 | A1 | 10/2015 | Giraud et al. |
| 2015/0320352 | A1 | 11/2015 | Ben Shalom et al. |
| 2015/0328081 | A1 | 11/2015 | Goldenberg et al. |
| 2015/0359704 | A1 | 12/2015 | Imboden et al. |
| 2015/0375315 | A1 | 12/2015 | Ukai et al. |
| 2016/0000642 | A1 | 1/2016 | Zipper |

(56) References Cited

U.S. PATENT DOCUMENTS

2016/0017905 A1 1/2016 Cascolan et al.
2016/0030279 A1 2/2016 Driscoll et al.
2016/0045661 A1 2/2016 Gray et al.
2016/0112841 A1 4/2016 Holland
2016/0113840 A1 4/2016 Crunick et al.
2016/0113841 A1 4/2016 Godfrey et al.
2016/0127129 A1 5/2016 Chee et al.
2016/0129186 A1 5/2016 Douglas et al.
2016/0136037 A1 5/2016 Cai
2016/0136040 A1 5/2016 Li
2016/0151238 A1 6/2016 Crunick et al.
2016/0166464 A1 6/2016 Douglas et al.
2016/0166833 A1 6/2016 Oh et al.
2016/0170996 A1 6/2016 Frank et al.
2016/0192814 A1 7/2016 Kang et al.
2016/0206502 A1 7/2016 Køltzow
2016/0243359 A1 8/2016 Sharma
2016/0263732 A1 9/2016 Lourenco et al.
2016/0269486 A1 9/2016 Gupta et al.
2016/0310353 A1 10/2016 Barasch
2016/0311091 A1 10/2016 Wang
2016/0324717 A1 11/2016 Burton
2016/0331308 A1 11/2016 Zhou
2016/0338901 A1 11/2016 Cohen
2016/0346163 A1 12/2016 Konik et al.
2016/0367425 A1 12/2016 Wersland
2017/0027798 A1 2/2017 Wersland
2017/0042754 A1 2/2017 Fowers et al.
2017/0049278 A1 2/2017 Thomassen
2017/0069191 A1 3/2017 Erkkila
2017/0119623 A1 5/2017 Attarian
2017/0128320 A1 5/2017 Chen
2017/0156974 A1 6/2017 Griner
2017/0156975 A1 6/2017 Mills
2017/0189227 A1 7/2017 Brunson et al.
2017/0216136 A1 8/2017 Gordon
2017/0233063 A1 8/2017 Zhao et al.
2017/0246074 A1 8/2017 Wu
2017/0304144 A1 10/2017 Tucker
2017/0304145 A1* 10/2017 Pepe ..................... A61H 23/02
2017/0308046 A1 10/2017 Li et al.
2017/0312161 A1 11/2017 Johnson et al.
2017/0319866 A1 11/2017 Liu
2017/0360641 A1 12/2017 Nakata et al.
2018/0008512 A1 1/2018 Goldstein
2018/0021591 A1 1/2018 Chandler
2018/0033437 A1 2/2018 Inada
2018/0036198 A1 2/2018 Mergl et al.
2018/0039478 A1 2/2018 Sung et al.
2018/0050440 A1 2/2018 Chen
2018/0056029 A1 3/2018 Akimoto et al.
2018/0078449 A1 3/2018 Callow
2018/0133101 A1 5/2018 Inada
2018/0140100 A1 5/2018 Cribbs
2018/0140502 A1 5/2018 Shahoian et al.
2018/0141188 A1 5/2018 Lai
2018/0154141 A1 6/2018 Ahn
2018/0185234 A1 7/2018 Ishiguro et al.
2018/0200141 A1 7/2018 Wersland et al.
2018/0236572 A1 8/2018 Ukai
2018/0243158 A1 8/2018 Loghmani et al.
2018/0263845 A1 9/2018 Wersland et al.
2018/0279843 A1 10/2018 Paul et al.
2018/0288160 A1 10/2018 Paul et al.
2018/0296433 A1 10/2018 Danby et al.
2018/0315499 A1 11/2018 Appelbaum et al.
2018/0315504 A1 11/2018 Inada et al.
2019/0000709 A1 1/2019 Sone et al.
2019/0021929 A1 1/2019 Einav et al.
2019/0038229 A1 2/2019 Perraut et al.
2019/0066833 A1 2/2019 Wicki
2019/0110945 A1 4/2019 Kawagoe et al.
2019/0175434 A1 6/2019 Zhang
2019/0209424 A1 7/2019 Wersland et al.
2019/0216677 A1 7/2019 Paul
2019/0232478 A1 8/2019 Zawisza et al.
2019/0254921 A1 8/2019 Marton et al.
2019/0254922 A1 8/2019 Marton et al.
2019/0262607 A1 8/2019 Nichols
2019/0307983 A1 10/2019 Goldman
2019/0314239 A1 10/2019 Ci
2019/0337140 A1 11/2019 Shanklin
2019/0350793 A1 11/2019 Wersland et al.
2019/0371136 A1 12/2019 Whitaker
2019/0381271 A1 12/2019 Jo
2020/0000237 A1 1/2020 Wu
2020/0009010 A1 1/2020 Park et al.
2020/0016027 A1 1/2020 Kim et al.
2020/0035237 A1 1/2020 Kim et al.
2020/0069510 A1 3/2020 Wersland et al.
2020/0085675 A1 3/2020 Lee et al.
2020/0090175 A1 3/2020 Davis et al.
2020/0113777 A1 4/2020 Novak et al.
2020/0179210 A1 6/2020 Barragan Gomez
2020/0179215 A1 6/2020 Lerner
2020/0214927 A1 7/2020 Clowney et al.
2020/0230012 A1 7/2020 Fuhr
2020/0241683 A1 7/2020 Le et al.
2020/0261306 A1 8/2020 Pepe
2020/0261307 A1 8/2020 Wersland et al.
2020/0268594 A1* 8/2020 Pepe .................. A61H 15/0085
2020/0294423 A1 9/2020 Blain et al.
2020/0352821 A1 11/2020 Wersland et al.
2020/0357046 A1 11/2020 McGann
2020/0360723 A1 11/2020 Azar et al.
2020/0390644 A1 12/2020 Yang
2020/0397651 A1 12/2020 Park et al.
2020/0405570 A1 12/2020 Kodama
2021/0000683 A1 1/2021 Cheng
2021/0022951 A1 1/2021 Hu
2021/0022955 A1 1/2021 Wersland et al.
2021/0059898 A1 3/2021 Wersland et al.
2021/0085555 A1 3/2021 Davis et al.
2021/0093023 A1 4/2021 Kuhner-Stout et al.
2021/0128402 A1* 5/2021 Dai ........................... A61F 7/00
2021/0137777 A1 5/2021 Bennett et al.
2021/0244610 A1* 8/2021 Wersland ............. A61H 23/006
2021/0244611 A1 8/2021 Wersland et al.
2021/0307995 A1 10/2021 Zhou
2021/0330539 A1 10/2021 Faussett
2022/0000706 A1 1/2022 Grbic
2022/0000781 A9 1/2022 Leneweit et al.
2022/0007810 A1 1/2022 Paspatis et al.
2022/0023141 A1 1/2022 Buc et al.
2022/0040030 A1* 2/2022 Tang ........................ A61H 7/00
2022/0054347 A1 2/2022 Tan et al.
2022/0054350 A1 2/2022 Merino et al.
2022/0087433 A1 3/2022 Mao et al.
2022/0233397 A1 7/2022 Huang
2022/0241135 A1 8/2022 Wang
2022/0257460 A1 8/2022 Wersland et al.
2022/0287909 A1 9/2022 Sanchez Solana et al.
2022/0323290 A1 10/2022 Sloan
2022/0362097 A1* 11/2022 Hart ..................... A61H 23/006
2023/0001131 A1 1/2023 English et al.
2023/0080370 A1 3/2023 Katz et al.
2023/0090085 A1 3/2023 Dai et al.
2023/0145400 A1 5/2023 Wersland et al.
2023/0277410 A1 9/2023 Cisneros et al.
2023/0301868 A1 9/2023 Makarov et al.
2023/0329965 A1* 10/2023 Williams ............. A61H 23/006
2023/0398324 A1 12/2023 McVey et al.
2024/0050689 A1 2/2024 English

FOREIGN PATENT DOCUMENTS

CN 86101310 A 9/1986
CN 1432452 A 7/2003
CN 1720120 A 1/2006
CN 2788807 Y 6/2006
CN 201239336 Y 5/2009
CN 201333160 Y 10/2009
CN 201524220 U 7/2010
CN 101888050 A 11/2010

(56) References Cited

FOREIGN PATENT DOCUMENTS

| | | | |
|---|---|---|---|
| CN | 201711952 | U | 1/2011 |
| CN | 201743890 | U | 2/2011 |
| CN | 201847899 | U | 6/2011 |
| CN | 301664182 | S | 9/2011 |
| CN | 202161539 | U | 3/2012 |
| CN | 102666029 | A | 9/2012 |
| CN | 202637439 | U | 1/2013 |
| CN | 103648320 | A | 3/2014 |
| CN | 203598194 | U | 5/2014 |
| CN | 104352341 | A | 2/2015 |
| CN | 303250924 | S | 6/2015 |
| CN | 303250929 | S | 6/2015 |
| CN | 205163583 | U | 4/2016 |
| CN | 205286890 | U | 6/2016 |
| CN | 104352341 | B | 7/2016 |
| CN | 205459750 | U | 8/2016 |
| CN | 205494357 | U | 8/2016 |
| CN | 205598186 | U | 9/2016 |
| CN | 106074129 | A | 11/2016 |
| CN | 106236528 | A | 12/2016 |
| CN | 206081000 | U | 4/2017 |
| CN | 106859949 | A | 6/2017 |
| CN | 107374898 | A | 11/2017 |
| CN | 304561844 | S | 3/2018 |
| CN | 207286298 | U | 5/2018 |
| CN | 108543126 | A | 9/2018 |
| CN | 207855923 | U | 9/2018 |
| CN | 109009978 | A | 12/2018 |
| CN | 109259995 | A | 1/2019 |
| CN | 208405314 | U | 1/2019 |
| CN | 208448086 | U | 2/2019 |
| CN | 109528473 | A | 3/2019 |
| CN | 109907965 | A | 6/2019 |
| CN | 209154392 | U | 7/2019 |
| CN | 110868983 | A | 3/2020 |
| CN | 106618998 | B | 8/2020 |
| CN | 111616938 | A | 9/2020 |
| CN | 111973419 | A | 11/2020 |
| CN | 113143721 | A | 7/2021 |
| CN | 113509366 | A | 10/2021 |
| CN | 113509369 | A | 10/2021 |
| DE | 3633888 | A1 | 4/1988 |
| DE | 19905199 | A1 | 7/2000 |
| DE | 102015102112 | A1 | 8/2015 |
| DE | 202015005257 | U1 | 10/2016 |
| EP | 0436719 | B1 | 5/1994 |
| EP | 1430863 | A1 | 6/2004 |
| EP | 1728494 | A1 | 12/2006 |
| EP | 1964537 | A1 | 9/2008 |
| EP | 2080500 | A1 | 7/2009 |
| EP | 2181786 | A1 | 5/2010 |
| EP | 2328255 | A1 | 6/2011 |
| EP | 1728494 | B1 | 1/2013 |
| EP | 3388003 | A1 | 10/2018 |
| GB | 2066081 | A | 7/1981 |
| GB | 2262236 | A | 6/1993 |
| JP | S5230553 | A | 3/1977 |
| JP | S5428491 | A | 3/1979 |
| JP | S60135123 | A | 7/1985 |
| JP | H0219157 | A | 1/1990 |
| JP | H03218763 | A | 9/1991 |
| JP | H048128 | B2 | 2/1992 |
| JP | H0447440 | A | 2/1992 |
| JP | H0447440 | U | 4/1992 |
| JP | H0751393 | A | 2/1995 |
| JP | 2000189525 | A | 7/2000 |
| JP | 3077837 | U | 6/2001 |
| JP | 2002282322 | A | 10/2002 |
| JP | 2003077837 | A | 3/2003 |
| JP | 2003275265 | A | 9/2003 |
| JP | 2005204777 | A | 8/2005 |
| JP | 2006034941 | A | 2/2006 |
| JP | 2006212228 | A | 8/2006 |
| JP | 2008510588 | A | 4/2008 |
| JP | 2008289616 | A | 12/2008 |
| JP | 2010534110 | A | 11/2010 |
| JP | 2011502369 | A | 1/2011 |
| JP | 5129032 | B2 | 1/2013 |
| JP | 2013119018 | A | 6/2013 |
| JP | 2014511240 | A | 5/2014 |
| JP | 2015035844 | A | 2/2015 |
| JP | 2015104422 | A | 6/2015 |
| JP | 2018518347 | A | 7/2018 |
| JP | 2021510606 | A | 4/2021 |
| KR | 200313149 | Y1 | 5/2003 |
| KR | 200345192 | Y1 | 3/2004 |
| KR | 200435552 | Y1 | 1/2007 |
| KR | 100752432 | B1 | 8/2007 |
| KR | 20090119424 | A | 11/2009 |
| KR | 20100110413 | A | 10/2010 |
| KR | 20120004574 | A | 1/2012 |
| KR | 101123926 | B1 | 4/2012 |
| KR | 101162978 | B1 | 7/2012 |
| KR | 101406275 | B1 | 6/2014 |
| KR | 20170108550 | A | 9/2017 |
| KR | 20180031683 | A | 3/2018 |
| KR | 20200051098 | A | 5/2020 |
| RU | 2170567 | C1 | 7/2001 |
| TW | I359657 | B | 3/2012 |
| TW | 201440753 | A | 11/2014 |
| WO | WO-0100269 | A1 | 1/2001 |
| WO | WO-0119316 | A2 | 3/2001 |
| WO | WO-2009014727 | A1 | 1/2009 |
| WO | WO-2009102279 | A1 | 8/2009 |
| WO | WO-2011159317 | A1 | 12/2011 |
| WO | WO-2013114084 | A1 | 8/2013 |
| WO | WO-2013145346 | A1 | 10/2013 |
| WO | WO-2014118596 | A1 | 8/2014 |
| WO | WO-2015038005 | A2 | 3/2015 |
| WO | WO-2018012105 | A1 | 1/2018 |
| WO | WO-2019186225 | A1 | 10/2019 |
| WO | WO-2020139715 | A1 | 7/2020 |
| WO | WO-2021050861 | A1 | 3/2021 |
| WO | WO-2021168450 | A1 | 8/2021 |
| WO | WO-2021222571 | A1 | 11/2021 |
| WO | WO-2022011251 | A9 | 5/2022 |
| WO | WO-2023172676 | A2 | 9/2023 |

OTHER PUBLICATIONS

Tim Fraticelli—PTPProgress YouTube channel, "How to Choose the Right Massage Gun Attachment", YouTube (Year: 2021).*

Amazon: "OIVO Xbox One Controller Charger Dual Charging Station Updated Strap, Remote Charger Dock-2 Rechargeable Battery Packs Included," OIVO, Sep. 6, 2018, Especially annotated figures, Retrieved from Entire Document, 11 Pages.

Amazon: "PowerA Joy Con & Pro Controller Charging Dock Nintendo Switch," PowerA, Oct. 31, 2017, Especially annotated figures, Retrieved from Entire Document, 10 Pages.

Amazon: "Theragun G3PRO Percussive Therapy Device, White, Handheld Deep Muscle, Treatment Massager & Muscle Stimulator for Pain Relief, Recovery, Enhance Performance & Energize The Body," Feb. 13, 2019, Shown on pp. 1, 2 Pages, Retrieved from URL: https://www.amazon.com/dp/B07MJ2MCT3/ref=nav_timeline_asin?_encoding=UTF8&psc=1.

Anthony Katz, "The RAPTOR: Helps Patients and Saves Your Most Valuable Tool . . . Your Hands," DC Aligned:MeyerDC, Dec. 9, 2015, available at: http://news.meyerdc.com/community/vendor-spotlight/the-raptor-helps-patients-saves-your-most-valuable-tool-your-hands/ (last visited Feb. 15, 2023); 5 pages.

Bardwell D., "Wahl's Massage Products—Meant for Life's Big Pains," DougBardwell.com, Apr. 6, 2016, 7 Pages, [Retrieved on Jun. 3, 2021] Retrieved from URL: https://dougbardwell.com/db/2016/04/06/wahls-massage-products-meant-for-lifes-big-pains/.

Collins D., "External Rotor Motor Basics: Design and Applications," Jun. 6, 2018, 03 Pages.

Collins D., "FAQ: What are Hall Effect Sensors and What Is Theirs Role in Dc Motors?," Jan. 11, 2017, 03 Pages.

Defendant's Initial Invalidity Contentions, *Therabody, Inc.* v. *Tzumi Electronics LLC et al.*, Case No. SDNY-1-21-cv-07803 (PGG)(RWL), dated Aug. 17, 2022; 16 pages.

(56) References Cited

OTHER PUBLICATIONS

Description of Therabody GI Device, available at: https://www.therabody.com/us/en-us/faq/thearagun-devices/faq-devices-1.html?fdid=faq&csortb1=sortOrder&csortd1=1 (last visited Feb. 15, 2023).
Digi-Key's North American Editors: "How to Power and Control Brushless DC Motors," Dec. 7, 2016, 09 Pages.
Examination Report For Australian Patent Application No. 2016284030, dated May 7, 2018, 3 Pages.
Extended European Search Report for European Application No. 16815104.1, mailed Jan. 23, 2019, 08 Pages.
Extended European Search Report for European Application No. 18832213.5, mailed Jul. 21, 2021, 11 Pages.
Extended European Search Report for European Application No. 18832923.9, mailed Apr. 23, 2021, 7 Pages.
Extended European Search Report for European Application No. 20720323.3, mailed Sep. 9, 2021, 10 Pages.
Extended European Search Report for European Application No. 20802710.2, mailed May 10, 2022, 9 Pages.
Extended European Search Report for European Application No. 20802804.3, mailed Apr. 28, 2022, 8 Pages.
Extended European Search Report for European Application No. 21178300.6, mailed Oct. 19, 2021, 9 Pages.
Extended European Search Report for European Application No. 21178311.3, mailed Sep. 23, 2021, 5 Pages.
Holly Riddle, "Theragun vs. Hyperice vs, Hydragun: Massage Gun Showdown [Buyer's Guide]," ChatterSource: Health & Wellness, Mar. 9, 2021, available at: https://www.chattersource.com/article/massage-gun/ (last visited Feb. 17, 2023); 14 pages.
International Preliminary Report on Patentability for International Application No. PCT/US2016/038326, mailed Jan. 4, 2018, 8 Pages.
International Preliminary Report on Patentability for International Application No. PCT/US2018/022426, mailed Sep. 26, 2019, 9 Pages.
International Preliminary Report on Patentability for International Application No. PCT/US2018/039599, mailed Jan. 23, 2020, 8 Pages.
International Preliminary Report on Patentability for International Application No. PCT/US2018/040795, mailed Jan. 23, 2020, 7 Pages.
International Preliminary Report on Patentability for International Application No. PCT/US2019/067624, mailed Jul. 8, 2021, 11 Pages.
International Preliminary Report on Patentability for International Application No. PCT/US2020/017645, mailed Aug. 26, 2021, 11 Pages.
International Preliminary Report on Patentability for International Application No. PCT/US2020/031339, mailed Nov. 18, 2021,11 Pages.
International Preliminary Report on Patentability for International Application No. PCT/US2020/031936, mailed Nov. 18, 2021, 14 Pages.
International Preliminary Report on Patentability for International Application No. PCT/US2020/050385, mailed Mar. 24, 2022, 12 Pages.
International Preliminary Report on Patentability for International Application No. PCT/US2020/050399, mailed Jan. 13, 2022, 6 Pages.
International Preliminary Report on Patentability for International Application No. PCT/US2020/054773, mailed Apr. 21, 2022, 8 Pages.
International Preliminary Report on Patentability for International Application No. PCT/US2020/054842, mailed Apr. 21, 2022, 7 Pages.
International Preliminary Report on Patentability for International Application No. PCT/US2020/063426, mailed Jun. 16, 2022, 06 Pages.
International Preliminary Report on Patentability for International Application No. PCT/US2021/022500, mailed Oct. 6, 2022, 6 Pages.
International Preliminary Report on Patentability for International Application No. PCT/US2021/029900, mailed Nov. 10, 2022, 9 Pages.
International Preliminary Report on Patentability for International Application No. PCT/US2021/029903, mailed Nov. 10, 2022, 7 Pages.
International Search Report and Written Opinion for International Application No. PCT/US2016/038326, mailed Sep. 1, 2016, 9 Pages.
International Search Report and Written Opinion for International Application No. PCT/US2018/022426, mailed May 31, 2018, 10 Pages.
International Search Report and Written Opinion for International Application No. PCT/US2018/039599, mailed Sep. 24, 2018, 9 Pages.
International Search Report and Written Opinion for International Application No. PCT/US2018/040795, mailed Sep. 24, 2018, 8 Pages.
International Search Report and Written Opinion for International Application No. PCT/US2019/067624, mailed Feb. 3, 2020, 13 Pages.
International Search Report and Written Opinion for International Application No. PCT/US2020/017645, mailed May 20, 2020, 13 Pages.
International Search Report and Written Opinion for International Application No. PCT/US2020/031339, mailed Jun. 10, 2020, 12 Pages.
International Search Report and Written Opinion for International Application No. PCT/US2020/031347, mailed Aug. 3, 2020, 9 Pages.
International Search Report and Written Opinion for International Application No. PCT/US2020/031936, mailed Sep. 11, 2020, 17 Pages.
International Search Report and Written Opinion for International Application No. PCT/US2020/050385, mailed Dec. 3, 2020, 13 Pages.
International Search Report and Written Opinion for International Application No. PCT/US2020/050399, mailed Feb. 4, 2021, 11 Pages.
International Search Report and Written Opinion for International Application No. PCT/US2020/054773, mailed Jan. 12, 2021, 9 Pages.
International Search Report and Written Opinion for International Application No. PCT/US2020/054842, mailed Jan. 11, 2021, 8 Pages.
International Search Report and Written Opinion for International Application No. PCT/US2020/063426, mailed Feb. 26, 2021, 09 Pages.
International Search Report and Written Opinion for International Application No. PCT/US2021/022500, mailed Apr. 20, 2021, 7 Pages.
International Search Report and Written Opinion for International Application No. PCT/US2021/029900, mailed Oct. 6, 2021, 12 Pages.
International Search Report and Written Opinion for International Application No. PCT/US2021/029903, mailed Jul. 28, 2021, 8 Pages.
International Search Report and Written Opinion for International Application No. PCT/US2022/028309, mailed Sep. 8, 2022, 10 Pages.
International Search Report and Written Opinion for International Application No. PCT/US2022/076238, mailed Jan. 23, 2023, 12 Pages.
Japanese Office Action mailed Jan. 10, 2023, in Japanese Patent Application No. 2022165143, filed Oct. 14, 2022, 6 pages.
Japanese Office Action mailed Jun. 14, 2022, in Japanese Patent Application No. 2020555400, filed Dec. 19, 2019, 7 pages.
Machine translation from Espacenet of written description and claims for CN106074129A, 9 pages (2016).
Machine translation from Espacenet of written description and claims for CN111616938A, 5 pages (2020).
Machine translation from Espacenet of written description and claims for CN111973419A, 7 pages (2020).

(56) References Cited

OTHER PUBLICATIONS

Machine Translation of Written Description and Claims for WO2013145346A1 (Year: 2013).
Massage Expert: "Nursal Deep Percussion Massager Review—6 Interchangeable Nodes," Jan. 4, 2021, 6 Pages, [Retrieved on Jun. 3, 2021] Retrieved from URL: https://www.massagexpert.net/nursal-deep-percussion-massager-review/.
McFarland M., "Segway Was Supposed to Change the World, Two Decades Later, It Just Might," CNN Wire Service, Oct. 30, 2018, 7 Pages.
Notice of First Examination Opinion directed to Chinese Patent Application No. 202180041926.3, mailed Jul. 7, 2023, 16 pages.
Notice of Reasons for Rejection for Japanese Patent Application No. 2018-517683, dated Oct. 2, 2018, 10 Pages.
Office Action for Canadian Application No. 2,990,178, dated Oct. 15, 2018, 4 Pages.
Partial Supplementary European Search Report for European Application No. 18832213.5, mailed Apr. 20, 2021, 12 Pages.
Rachel [no family name indicated], "Jigsaw Massager," Instructables, Apr. 18, 2010, 6 Pages, Retrieved from URL: https://web.archive.org/web/20100418041422/ http://www.instructables.com/id/Jigsaw-Massager/.
Rockwell: "Trans4mer Operating Manual for Multi-purpose saw," Model RK2516/RK2516K, 2011, 32 Pages.
Supplementary European Search Report for European Application No. 19904459.5, mailed Apr. 15, 2021, 04 Pages.
TESTBERICHTE.DE: "Naipo Handheld Percussion Massager with Heating (MGPC 5000)," amazon.de, 7 Pages, [Retrieved on Jun. 3, 2021] Retrieved from URL: https://www.testberichte.de/p/naipo-tests/handheld-percussion-massager-with-heating-mgpc-5000-testbericht.html, See also a YouTube Review of this Device dated May 21, 2018 at https://www.youtube.com/watch?v=bi_QCJA3D9k.
Visual Description of Hyper Ice, Inc. Raptor Device, "Osteopatia Haidy Ortale—Raptor Massage," available at: https://www.youtube.com/watch?v=plyW8FBowVs (last visited Feb. 15, 2023); 1 page.
Visual Description of Hyper Ice, Inc. Raptor Device, "RAPTOR Solutions 1.3 Prone," available at: https://www.youtube.com/watch?v=6i1tRqdwPU8&t=156s (last visited Feb. 15, 2023); 1 page.
WORX Trans4mer "Safety and Operating Manual Original Instructions" for 12V Li-Ion Multipurpose saw, WX540, NX540.3, WX540.9, 16 pages (2013).
Written Opinion for International Application No. PCT/US2023/063004 mailed Jul. 28, 2023, 14 pages.
Youtube: "Unboxing: Joy-Con & Pro Controller Charging Dock for Nintendo Switch," Crusherbad64, Especially demonstration 8:30-8:55, (This reference is Being Used to Show Greater Details of Product not Clearly Disclosed in 'PowerA'), Feb. 26, 2018, Retrieved from entire document, 1 Page.
International Search Report and Written Opinion of the International Searching Authority directed to International Patent Application No. PCT/CN2023/120408, mailed Apr. 16, 2024; 22 pages.

* cited by examiner

Example Heart Rate Control – Target 50 BPM

| Dynamic Period | User Heart Rate | Percentage | Pulse Rate Calculation | Pulse rate |
|---|---|---|---|---|
| 1 | 88 | 100% | 100% x 88 = 88 | 60 |
| 2 | 82 | 97% | 97% x 82 = 80 | 60 |
| 3 | 75 | 94% | 94% x 75 = 71 | 60 |
| ... | ... | ... | ... | ... |
| 13 | 60 | 64% | 64% x 60 = 38 | 38 |
| 14 | 58 | 61% | 61% x 58 = 35 | 35 |
| 15 | 56 | 58% | 58% x 56 = 32 | 32 |

FIG. 6F

Example Heart Rate Control – Target 45 BPM

| Dynamic Period | User Heart Rate | Percentage | Pulse Rate Calculation | Pulse rate |
|---|---|---|---|---|
| 1 | 54 | 100% | 100% x 54 = 54 | 54 |
| 2 | 51 | 97% | 97% x 51 = 80 | 49 |
| 3 | 49 | 94% | 94% x 49 = 71 | 46 |
| ... | ... | ... | ... | ... |
| 13 | 45 | 64% | 64% x 45 = 29 | 45 |
| 14 | 45 | 61% | 61% x 45 = 27 | 45 |
| 15 | 45 | 58% | 58% x 45 = 26 | 45 |

FIG. 6G

Example Heart Rate Control – Target 50 BPM

| Dynamic Period | User Heart Rate | Percentage | Pulse Rate Calculation | Pulse rate |
|---|---|---|---|---|
| 1 | 40 | 100% | 100% x 40 = 40 | 40 |
| 2 | 41 | 103% | 103% x 41 = 42 | 42 |
| 3 | 43 | 106% | 106% x 43 = 46 | 46 |
| ... | ... | ... | ... | ... |
| 8 | 48 | 121% | 121% x 48 = 58 | 62 |
| 9 | 50 | 124% | 124% x 50 = 62 | 50 |
| 10 | 50 | 127% | 127% x 50 = 64 | 50 |

FIG. 6H

SYSTEMS, METHODS, AND DEVICES FOR PERCUSSIVE MASSAGE THERAPY

CROSS-REFERENCE TO RELATED APPLICATIONS

The present application is a continuation of U.S. application Ser. No. 18/534,304, filed Dec. 8, 2023, which is a continuation of International Application No. PCT/CN2023/120408, filed Sep. 21, 2023, both of which are hereby incorporated in their entirety by reference.

BACKGROUND

Percussive massage devices have become popular with athletes, fitness enthusiasts, and many other users for their ability to provide a range of benefits, such as relief of muscle tension and soreness. Several other types of therapy can also be useful for treating the same conditions, or other conditions experienced by various groups of people. For those reasons among others, many users rely on multiple devices to provide different types of therapy. Some such users can have difficulty achieving the synergistic potential of multiple types of therapy when using different devices for each treatment.

SUMMARY

Accordingly, there may be a need for providing new methods, devices, and/or systems for applying multiple types of therapy with a single device. Aspects of the present disclosure relate to a percussive massage device having a shaft that comprises a mount for electronic massage attachments. The mount includes electrical contacts for connecting electronics within the massage attachments to a power source and controller of the percussive massage device. The percussive massage device can therefore be configured for use with electronic massage attachments that provide different types of therapy in addition to percussive massage.

Further aspects of the present disclosure relate to electronic massage heads, which can be attachments for a percussive massage device. Some such aspects relate to a massage head comprising a base and a heater and heat spreader resiliently biased relative to the base by a cushion that makes the massage head flexible enough for percussive massage while also being configured to provide effective heat therapy. Further such aspects relate to a massage head comprising a panel for contacting treated tissue, a heat pump configured to cool the panel, and a heat sink configured to rapidly dissipate heat from the heat pump to ambient air. Some such aspects can provide effective cold therapy.

Further aspects of the present disclosure relate to an infrared module that can be included in a percussive massage device. The infrared module can be configured to provide infrared therapy. Still further aspects of the present disclosure relate to a percussive massage device comprising a biometric sensor and haptic motors. The percussive massage device can be configured to use the biometric sensor and haptic motors to establish feedback loops for therapeutic protocols. Such therapeutic protocols can include, for example, guided breathing exercises. Further such therapeutic protocols can be configured to induce changes in a user's heart rate.

In some embodiments, a therapeutic system may comprise a device. The device may comprise an electrical power source and a mount. The therapeutic system may also comprise an attachment configured to removably couple to the mount. The therapeutic system may also comprise a first electrical connector comprising a socket that defines an interior. The therapeutic system may also comprise a second electrical connector comprising a plurality of prongs arranged around a central axis. The attachment may comprise either the first electrical connector or the second electrical connector and the mount may comprise the other of the first electrical connector or the second electrical connector. The one of the first electrical connector or the second electrical connector comprised by the mount may be electrically connected to the power source. Prongs among the plurality of prongs are biased outward relative to the central axis and may be configured such that when the attachment is coupled to the mount, the plurality of prongs extend into the socket and presses radially outward on the interior of the socket.

In some embodiments according to any of the foregoing, the device may be a percussive massage device. The device may further comprise a motor and a shaft configured to reciprocate linearly in response to activation of the motor, wherein the shaft comprises the mount.

In some embodiments according to any of the foregoing, the attachment may comprise a massage head.

In some embodiments according to any of the foregoing, the second electrical connector may comprise a base. The plurality of prongs may extend substantially parallel to the central axis from the base to a free end, wherein the free end is the furthest point on the plurality of prongs from the base. The prongs among the plurality of prongs may each be resiliently biased toward a resting shape that tapers toward the central axis at the free end such that the plurality of prongs has a greatest collective diameter perpendicular to the central axis at an axial location between the free end and the base.

In some embodiments according to any of the foregoing, the socket may be configured with a contact depth at which the plurality of prongs contacts the interior of the socket when the attachment is coupled to the mount, and a contact span is a greatest distance across the interior of the socket at the contact depth. The greatest collective diameter of the plurality of prongs in a resting shape may be greater than the contact span of the socket.

In some embodiments according to any of the foregoing, the socket may define an opening through which the plurality of prongs are configured to be received when the attachment is coupled to the mount. The contact span may be at least as great as a diameter of the opening.

In some embodiments according to any of the foregoing, the socket may be circular in axial cross-section at the contact depth.

In some embodiments according to any of the foregoing, the prongs may be configured to deflect radially inward toward the central axis as the attachment is coupled to the mount.

In some embodiments according to any of the foregoing, the first electrical connector may comprise a trench that surrounds the socket. The trench may be bounded by an outer wall. The first electrical connector may also comprise a conductive band comprised by the outer wall. The second electrical connector may comprise a conductive fin located radially outward of the plurality of prongs. The conductive fin may be configured to extend into the trench and contact the conductive band when the attachment is coupled to the mount.

In some embodiments according to any of the foregoing, the trench may comprise a first trench, the inner wall may comprise a first inner wall, the outer wall may comprise a first outer wall, the conductive band may comprise a first conductive band, and the conductive fin may comprise a first conductive fin. The socket may comprise a second trench surrounded by the first trench, the second trench being bounded by a second outer wall. The socket may also comprise a second conductive band comprised by the second outer wall. The plurality of prongs may comprise a second conductive fin located radially inward of the first conductive fin, wherein the second conductive fin is configured to extend into the second trench and contact the second conductive band when the attachment is coupled to the mount.

In some embodiments according to any of the foregoing, the percussive therapy system may further comprise a first mechanical connector and a second mechanical connector. The mount may comprise either the first mechanical connector or the second mechanical connector and the attachment may comprise the other of the first mechanical connector or the second mechanical connector. The first mechanical connector may comprise radially extending posts, wherein radial is defined relative to the position of the central axis of the second electrical connector with respect to the first mechanical connector when the attachment is coupled to the mount. The second mechanical connector may comprise channels configured to guide the posts as the attachment is coupled to the mount such that the second mechanical connector is configured to engage the first mechanical connector when the attachment is coupled to the mount to releasably secure the attachment to the device.

In some embodiments according to any of the foregoing, the channels of the second mechanical connector may each comprise an opening configured to receive a respective one of the posts of the first mechanical connector as the attachment is coupled to the mount. The channels of the second mechanical connector may each also comprise a seat defining a terminal position reached by the respective one of the posts when the attachment is coupled to the mount. The channels of the second mechanical connector may each also comprise a non-linear portion extending from the opening to the seat.

In some embodiments according to any of the foregoing, each channel may further comprise a circumferential leg that ends at the seat of the same channel. The circumferential leg may extend circumferentially about the position of the central axis of the second electrical connector relative to the second mechanical connector when the attachment is coupled to the mount.

In some embodiments according to any of the foregoing, each channel may be configured and sized to create an interference fit between the respective one of the posts and an axial face of the seat when the attachment is coupled to the mount.

In some embodiments according to any of the foregoing, the socket may be configured with a contact depth sat which the plurality of prongs contacts the interior of the socket when the attachment is coupled to the mount, and a contact span is a greatest distance across the interior of the socket at the contact depth. The plurality of prongs may be resiliently biased have a collective external diameter at least as great as the contact span when the posts reach the seats.

In some embodiments, a therapeutic system may comprise a device. The device may comprise an electrical power source. The device may also comprise a mount. The therapeutic system may also comprise an attachment. The therapeutic system may also comprise a first electrical connector comprising an annular socket. The therapeutic system may also comprise a second electrical connector comprising an annular projection centered on a central axis. The attachment may comprise either the first electrical connector or the second electrical connector and the mount may comprise the other of the first electrical connector or the second electrical connector. The one of the first electrical connector or the second electrical connector comprised by the mount may be electrically connected to the power source. The attachment may be configured to removably couple to the mount such that the attachment can be transitioned from a locked position, wherein the attachment is axially immovable relative to the mount, and an unlocked position, wherein the attachment is axially removable from the mount, by rotation of the attachment relative to the mount about the central axis while the attachment remains in contact with the mount. When the attachment is in the locked position, the annular projection may extend into the annular socket.

In some embodiments according to any of the foregoing, the annular socket may define an interior and the annular projection is biased outward relative to the central axis such that the annular projection is configured to press radially outward on the interior of the socket when the attachment is in the locked position.

In some embodiments according to any of the foregoing, the annular projection may be defined collectively by a plurality of prongs.

In some embodiments according to any of the foregoing, each prong among the plurality of prongs may have a fin shape.

In some embodiments according to any of the foregoing, the second electrical connector may comprise a base. The annular projection may extend substantially parallel to the central axis from the base to a free end. The free end may be the furthest point on annular projection from the base. The annular projection may be resiliently biased toward a resting shape that tapers toward the central axis at the free end such that the annular projection has a greatest diameter relative to the central axis at an axial location between the free end and the base.

In some embodiments, a massage head for a percussive therapy device may comprise a base configured to connect a massage attachment to a reciprocating shaft of a percussive massage device. The massage head may also comprise an end portion comprising a heater. The massage head may also comprise a medial portion located between the base and the end portion. The medial portion may be configured to resiliently bias the end portion away from the base.

In some embodiments according to any of the foregoing, the massage head may comprise a flexible cover that extends across a distal side of the heater.

In some embodiments according to any of the foregoing, the end portion may further comprise a panel between the heater and the flexible cover. The panel may have a thermal conductivity of from about 90 to about 5000 watts per meter-kelvin.

In some embodiments according to any of the foregoing, the end portion may define a distal surface. An area of a distal side of the panel may be at least 90% of an area of the distal surface.

In some embodiments according to any of the foregoing, the panel may comprise metal.

In some embodiments according to any of the foregoing, the massage head may comprise a temperature sensor located in the distal portion and configured to measure a temperature of the heater. The massage head may also comprise a wire extending from the temperature sensor to the base.

In some embodiments according to any of the foregoing, the massage head may comprise a controller located in the base. The wire may be connected to the controller.

In some embodiments according to any of the foregoing, the end portion may comprise a rigid frame that retains the heater. The end portion may also comprise a compressible pad positioned proximally of the heater and between the heater and a portion of the rigid frame.

In some embodiments, a percussive massage system may comprise the massage head of any of the foregoing embodiments and a percussive massage device comprising a reciprocating shaft and a motor. The reciprocating shaft may be configured to reciprocate linearly along a reciprocation axis in response to activation of the motor. The medial portion may be configured to resiliently bias the end portion away from the base along a proximal-distal axis that is parallel to the reciprocation axis.

In some embodiments according to any of the foregoing, the base may be configured to releasably connect the massage head to the reciprocating shaft.

In some embodiments, a massage attachment for a percussive therapy device may comprise a base configured to connect the massage attachment to a reciprocating shaft of a percussive therapy device. The massage attachment may also comprise a heater. The massage attachment may also comprise a heat spreader positioned distally of the base and thermally coupled to the heater. The massage attachment may also comprise a cushion positioned between the base and the heat spreader and configured to resiliently bias the heat spreader away from the base.

In some embodiments according to any of the foregoing, the attachment may, comprise a flexible cover within which the cushion is disposed.

In some embodiments according to any of the foregoing, the heat spreader may be disposed within the flexible cover.

In some embodiments according to any of the foregoing, the heat spreader may be a panel disposed within the flexible cover distally of the heater, the panel having a thermal conductivity of from about 90 to about 5000 watts per meter-kelvin.

In some embodiments according to any of the foregoing, the attachment may comprise a controller mounted to the base and electrically connected to the heater through the cushion.

In some embodiments according to any of the foregoing, the attachment may comprise a rigid frame within which the heater is disposed, the rigid frame being positioned distally of the cushion.

In some embodiments according to any of the foregoing, the attachment may comprise a compressible pad located proximally of the heater and between the heater and a portion of the rigid frame.

In some embodiments according to any of the foregoing, the cushion may comprise a foam block.

In some embodiments, a temperature therapy module comprise a heat pump that comprises a first side and a second side. The module may also comprise a fan. The module may also comprise a housing that encloses the heat pump and the fan. The module may also comprise a panel thermally coupled to the first side of the heat pump, the panel defining a distal end of the housing. The module may also comprise a heat sink thermally coupled to the second side of the heat pump, wherein a portion of the heat sink defines a medial portion of housing that is proximal of the distal end of the housing.

In some embodiments according to any of the foregoing, the heat pump may be configured to transfer thermal energy from the first side to the second side.

In some embodiments according to any of the foregoing, a proximal-distal axis may be defined relative to the housing. The heat sink may comprise a platform to which the heat pump is thermally coupled and a plurality of fins extending proximally from the platform. Each fin of the plurality of fins may comprise a radially outer edge, and the radially outer edges may define a portion of an exterior of the medial portion of the housing.

In some embodiments according to any of the foregoing, the module may comprise a base configured to connect the module to a therapeutic device, wherein the base defines a proximal portion of the housing.

In some embodiments according to any of the foregoing, the module may further comprise lateral vents defined by spaces between adjacent fins of the plurality of fins. The module may also comprise proximal vents extending through the base.

In some embodiments according to any of the foregoing, the fan may be configured to draw air through the proximal vents and expel air through the lateral vents.

In some embodiments according to any of the foregoing, the heat sink may define a cavity surrounded by the fins and the fan may comprise an impeller disposed in the cavity.

In some embodiments according to any of the foregoing, the fan may comprise a motor disposed in the housing.

In some embodiments according to any of the foregoing, the housing may comprise a distal portion that comprises the panel. The distal portion of the housing and the medial portion of the housing may form a dome.

In some embodiments according to any of the foregoing, the housing may comprise a distal portion that comprises the panel and an insulator disposed between the panel and the heat sink.

In some embodiments, a percussive therapy system may comprise a percussive massage device comprising a motor, a reciprocation shaft configured to reciprocate along a reciprocation axis when the motor is active, and a controller. The percussive therapy system may also comprise a therapeutic attachment configured to be selectively attachable to a distal end of the reciprocation shaft. The controller may be configured to prevent activation of the motor when the therapeutic attachment is operatively connected to the distal end of the reciprocation shaft.

In some embodiments according to any of the foregoing, the therapeutic attachment may comprise electronic components and the percussive massage device may be configured to supply electrical power to the electronic components when the therapeutic attachment is operatively connected to the distal end of the reciprocation shaft.

In some embodiments according to any of the foregoing, the therapeutic attachment may comprise electronic components. The controller may have a data communication connection with the electronic components when the therapeutic attachment is operatively connected to the distal end of the reciprocation shaft.

In some embodiments according to any of the foregoing, the therapeutic attachment may comprise a cold therapy module.

In some embodiments according to any of the foregoing, the percussive therapy may comprise a heat therapy module configured to be selectively attachable to the distal end of the reciprocation shaft.

In some embodiments according to any of the foregoing, the controller may be configured to permit activation of the motor when the heat therapy module is operatively connected to the distal end of the reciprocation shaft.

In some embodiments, a percussive therapy system may comprise a percussive massage device comprising a motor and a reciprocation shaft configured to reciprocate along a reciprocation axis when the motor is active. The percussive therapy system may also comprise an attachment. The attachment may be configured to generate vibration independently of the reciprocation of the reciprocation shaft.

In some embodiments according to any of the foregoing, the motor may comprise a first motor and the attachment comprises a second motor and a weight coupled to the second motor, wherein the weight is configured to rotate eccentrically about a vibration axis when the second motor is active.

In some embodiments according to any of the foregoing, the vibration axis may be parallel to the reciprocation axis.

In some embodiments according to any of the foregoing, the percussive massage device may comprise a controller configured to prevent activation of the motor when the attachment is operatively connected to the reciprocation shaft.

In some embodiments according to any of the foregoing, the percussive massage device may comprise a controller configured to disable reciprocation of the shaft when the attachment is operatively connected to the reciprocation shaft.

In some embodiments according to any of the foregoing, the attachment may comprise a rigid housing and a flexible cover disposed over the rigid housing. The rigid housing may comprise a distal end and a depression defined in the distal end and the cover comprises an internal boss fitted into the depression.

In some embodiments, a percussive massage device may comprise a housing, the housing comprising a window. The percussive massage device may also comprise a motor contained in the housing. The percussive massage device may also comprise a reciprocation shaft coupled to the motor and configured to reciprocate when the motor is active. The percussive massage device may also comprise an infrared radiation emitter contained in the housing. The infrared emitter may be configured to direct infrared radiation through the window and outside the housing.

In some embodiments according to any of the foregoing, the therapeutic device may further comprise a fan and a heat sink to which the infrared emitter is mounted. The fan, heat sink, and window may cooperate to define an air flow path that extends across at least a portion of a surface of the window and through the fan.

In some embodiments according to any of the foregoing, a first opening may be defined through the heat sink. The fan may be configured to mobilize air along the air flow path. A first portion of the air flow path may extend from the window to the fan through the first opening.

In some embodiments according to any of the foregoing, the infrared radiation emitter may comprise an LED array comprising infrared LEDs and a board to which the infrared LEDs are mounted. The board may comprise a second opening aligned with the first opening defined through the heat sink such that the first portion of the air flow path extends through the board.

In some embodiments according to any of the foregoing, a second opening may be defined through the heat sink. A second portion of the air flow path may be defined through the second opening, and the fan and heat sink are respectively configured such that the second portion of the flow path is upstream of the first portion of the air flow path.

In some embodiments according to any of the foregoing, the heat sink may comprise a tray to which the infrared emitter is mounted and walls extending from the tray toward the housing such that the heat sink and window define an enclosed space within which the infrared radiation emitter is disposed.

In some embodiments according to any of the foregoing, the first opening may be defined through the tray and the second opening is defined through one of the walls.

In some embodiments according to any of the foregoing, the heat sink may comprise a first integrally formed piece that comprises the wall through which the second opening is defined and a frame that contacts the window. The heat sink may also comprise a second integrally formed piece that comprises the tray. The second integrally formed piece may be fastened to the first integrally formed piece.

In some embodiments, a percussive massage device may comprise a housing comprising an extension that comprises an edge defined on a distal facing side of the extension and extending along an edge axis. The percussive massage device may also comprise a motor contained in the housing. The percussive massage device may also comprise a reciprocation shaft coupled to the motor and configured to reciprocate along a proximal-distal axis when the motor is active. The reciprocation shaft may comprise a distal end configured for connection to a massage attachment. The percussive massage device may also comprise an infrared radiation emitter contained in the extension and configured to direct infrared radiation parallel to an infrared axis that intersects the proximal-distal axis and the edge of the extension, the infrared radiation emitter comprising an infrared array extending on an emitter plane that is normal to the infrared axis and intersects the edge axis.

In some embodiments according to any of the foregoing, the infrared array may comprise a plurality of infrared LEDs arrayed on the emitter plane.

In some embodiments according to any of the foregoing, the housing may comprise a window and the infrared axis passes through the window.

In some embodiments according to any of the foregoing, the extension of the housing may be a handle portion.

In some embodiments according to any of the foregoing, the infrared axis may intersect the edge with a non-zero angle of incidence.

In some embodiments according to any of the foregoing, the edge may be a first edge. The extension may comprise a second edge defined on a proximal facing side of the extension. The first and second edges may converge with increasing distance from the reciprocation shaft.

In some embodiments according to any of the foregoing, the extension may extend along an extension axis that intersects the infrared axis and the proximal-distal axis.

In some embodiments, a percussive massage device may comprise a housing comprising an extension that comprises an edge defined on a distal facing side of the extension and extending along an edge axis. The percussive massage device may also comprise a motor contained within the housing. The percussive massage device may also comprise a reciprocation shaft coupled to the motor and configured to reciprocate along a proximal-distal axis when the motor is active. The percussive massage device may also comprise an infrared radiation emitter configured to direct infrared radiation parallel to an infrared axis. A distal end of the reciprocation shaft may be configured for connection to a massage attachment. The proximal-distal axis, edge axis, and infrared axis may intersect one another to define a triangle. An interior angle of the triangle at an intersection of the edge axis and infrared axis may be greater than ninety degrees.

In some embodiments according to any of the foregoing, the housing may comprise a handle portion in which the infrared emitter is disposed.

In some embodiments according to any of the foregoing, the proximal-distal axis may intersect the infrared axis distally of a distal end of the reciprocation shaft.

In some embodiments according to any of the foregoing, the infrared array may be configured to emit infrared radiation at a power density of from about 25 to about 80 milliwatts per square centimeter in an area centered on the infrared axis at a distance of from about 8 to about 10 centimeters from the infrared array.

In some embodiments according to any of the foregoing, the area may be centered on the infrared axis and have a 10 centimeter diameter.

In some embodiments, a percussive massage device may comprise a housing, wherein the housing defines a handle portion and a corner where the handle portion meets another portion of the housing. The percussive massage device may also comprise a motor contained within the housing. The percussive massage device may also comprise a reciprocation shaft coupled to the motor and configured to reciprocate when the motor is active. The percussive massage device may also comprise a heart rate sensor located at the corner.

In some embodiments according to any of the foregoing, the handle portion may define a first straight edge. The housing may define a second straight edge. The corner may be a transition between the first straight edge and the second straight edge.

In some embodiments according to any of the foregoing, the transition may be a curvature on a first plane.

In some embodiments according to any of the foregoing, at the transition the housing may have a concave profile on the first plane and a convex profile on a second plane. The second plane may be perpendicular to the first plane.

In some embodiments according to any of the foregoing, the heart rate sensor may define a local recess in the housing behind the concave and convex profiles.

In some embodiments according to any of the foregoing, the heart rate sensor may define a local recess in the housing at an intersection between the first plane and the second plane.

In some embodiments according to any of the foregoing, the motor may comprise a reciprocation motor, the handle portion may comprise a first handle portion, the other portion of the housing may comprise a second handle portion, and the percussive massage device may further comprise a first vibration motor disposed in the first handle portion and a second vibration motor disposed in the second handle portion.

In some embodiments according to any of the foregoing, the motor may comprise a reciprocation motor and the percussive massage device further comprises a vibration motor. The device may be configured to activate the vibration motor according to a protocol that comprises a first stage having a duration between 0.4 and 30 seconds, wherein the vibration motor begins the first stage at a first operating frequency and ends the first stage at a second operating frequency, the first operating frequency being greater than zero and less than the second operating frequency, and the vibration motor operates between the first operating frequency and the second operating frequency for an entire time between a beginning and an ending of the first stage. The protocol ay also comprise a second stage having a duration between 0.4 and 30 seconds, wherein the vibration motor begins the second stage at a third operating frequency and ends the second stage at a fourth operating frequency, the fourth operating frequency being greater than zero and less than the third operating frequency, and the vibration motor operates between the third operating frequency and the fourth operating frequency for an entire time between a beginning and an ending the second stage.

In some embodiments according to any of the foregoing, the third operating frequency may be less than the second operating frequency.

In some embodiments according to any of the foregoing, the protocol may comprise a repeating cycle that comprises the first stage a first gap following the first stage, wherein the vibration motor is deactivated during the first gap, the second stage, wherein the second stage follows the first gap, and a second gap following the second stage, wherein the vibration motor is deactivated during the second gap. Each iteration of the cycle following the first instance of the cycle in the protocol may begin with the first stage following the second gap.

In some embodiments, a percussive massage device may comprise a housing, a reciprocation motor contained within the housing, and a reciprocation shaft coupled to the motor and configured to reciprocate when the motor is active, wherein the housing defines a first handle portion and a second handle portion, wherein the first handle portion extends transverse to the first handle portion. The percussive massage device may also comprise a heart rate sensor located on the housing. The percussive massage device may also comprise a first vibration motor located in the first handle portion and a second vibration motor located in the second handle portion.

In some embodiments according to any of the foregoing, the first vibration motor may be positioned against a wall of the first handle portion that faces away from the second handle portion and the second vibration motor may be positioned against a wall of the second handle portion that faces toward the first handle portion.

In some embodiments according to any of the foregoing, the second handle portion may be wider than the first handle portion.

In some embodiments according to any of the foregoing, the percussive massage device may be configured to vary an operating parameter of the first or second vibration motors in response to a heart rate measured by the heart rate sensor.

In some embodiments according to any of the foregoing, the operating parameter may be a pulse frequency.

In some embodiments according to any of the foregoing, the percussive massage device may be configured to vary the pulse frequency to be offset from the heart rate measured by the heart rate sensor by a predetermined magnitude.

In some embodiments according to any of the foregoing, the percussive massage device may be configured to vary the pulse frequency to be offset from the heart rate measured by the heart rate sensor by a predetermined proportion.

In some embodiments, a percussive massage device may comprise a housing, a reciprocation motor contained within the housing, and a reciprocation shaft coupled to the motor and configured to reciprocate when the motor is active, wherein the housing defines a first handle portion and a second handle portion, wherein the first handle portion extends transverse to the first handle portion. The percussive massage device may also comprise a heart rate sensor located on the housing. The percussive massage device may be configured to sense skin on the heart rate sensor. The percussive massage device may also be configured to detect a tap on the heart rate sensor from an absence of skin on the heart rate sensor followed by a presence of skin on the heart rate sensor. The percussive massage device may also be configured to execute a function upon detecting a predetermined sequence of at least two taps on the heart rate sensor.

In some embodiments according to any of the foregoing, the function may be to display a heart rate detected with the heart rate sensor.

In some embodiments according to any of the foregoing, the predetermined sequence of taps may be a predetermined quantity of taps within a predetermined amount of time.

Further features and advantages, as well as the structure and operation of various embodiments, are described in detail below with reference to the accompanying drawings. It is noted that the specific embodiments described herein are not intended to be limiting. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

FIG. 6F is a chart showing steps of a heart rate control protocol in accordance with a method of performing a therapy routine with a percussive massage device, according to an embodiment of the present disclosure.

FIG. 6G is a chart showing steps of a second rate heart control protocol in accordance with a method of performing a therapy routine with a percussive massage device, according to an embodiment of the present disclosure.

FIG. 6H is a chart showing steps of a third heart rate control protocol in accordance with a method of performing a therapy routine with a percussive massage device, according to an embodiment of the present disclosure Embodiments of the present disclosure will be described with reference to the accompanying drawings.

DETAILED DESCRIPTION

Figure 1A:
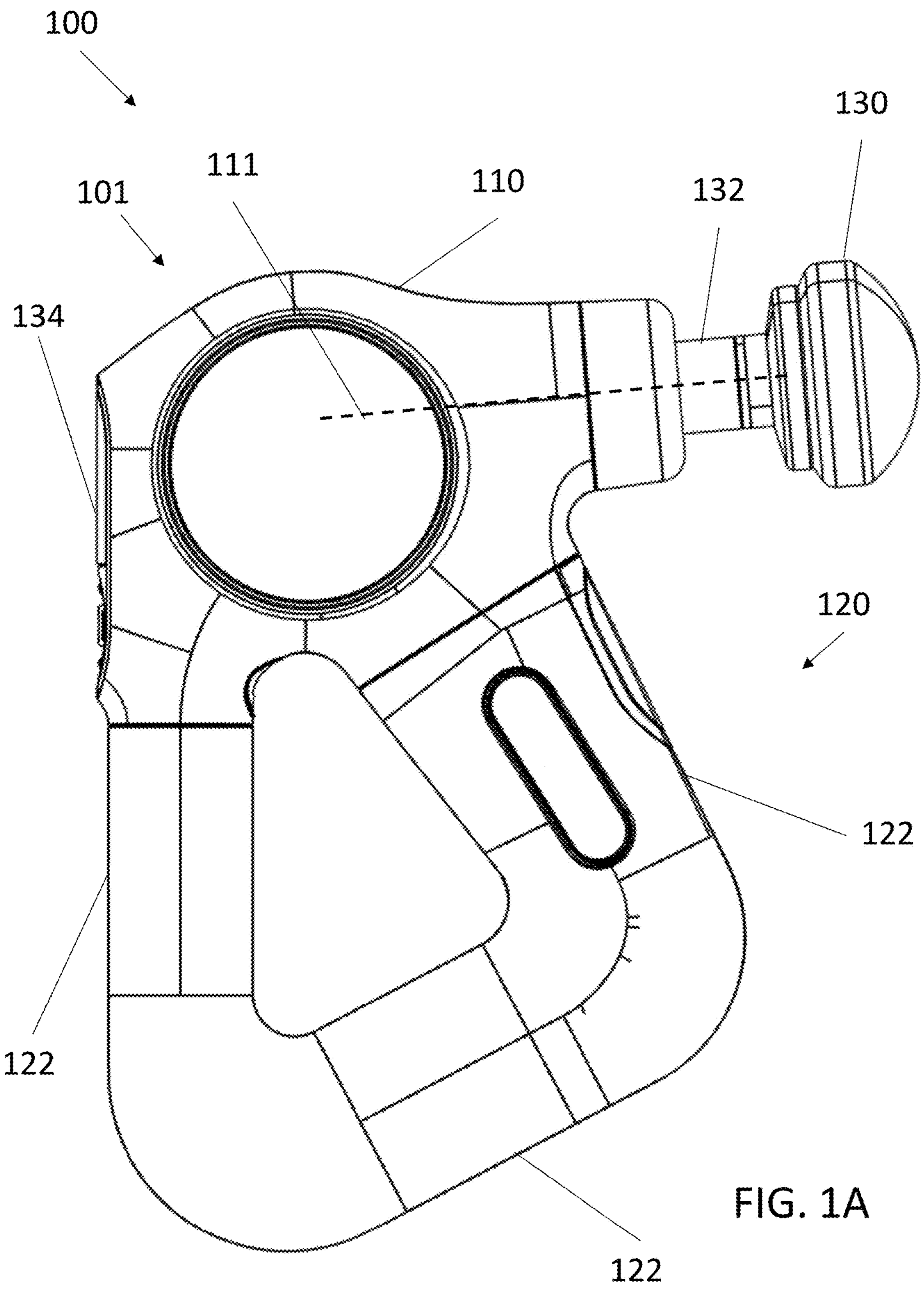
FIG. 1A is a side elevation view of a therapeutic system according to some aspects of the present disclosure.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment might not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this disclosure, the term "module" may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

FIG. 1A illustrates a therapeutic system 100 comprising a percussive massage device 101 and a massage attachment 130. Therapeutic system 100 is similar in some respects to the systems disclosed in U.S. patent application Ser. No. 18/176,399, filed Feb. 28, 2023, hereinafter "the '399 application," the entirety of which is hereby incorporated by reference. Accordingly, in some examples, therapeutic system 100 can be alike to any of the embodiments disclosed in the '399 application in any details that do not conflict with the features of therapeutic system 100 as described or illustrated herein. Massage attachment 130 is mounted to a distal end of a shaft 132 comprised by percussive massage device 101. Percussive massage device 101 comprises a head portion 110, from which shaft 132 extends. Percussive massage device 101 further comprises a handle 120 that also extends from head portion 110. Handle 120 of the illustrated example comprises three handle portions 122 in a co-planar, triangular arrangement, though in other examples other types of handles may be used. In further examples, handle 120 can have any shape enabling a user to grasp device 101 and use device 101 to apply percussive massage with massage attachment 130.

Figure 1B:
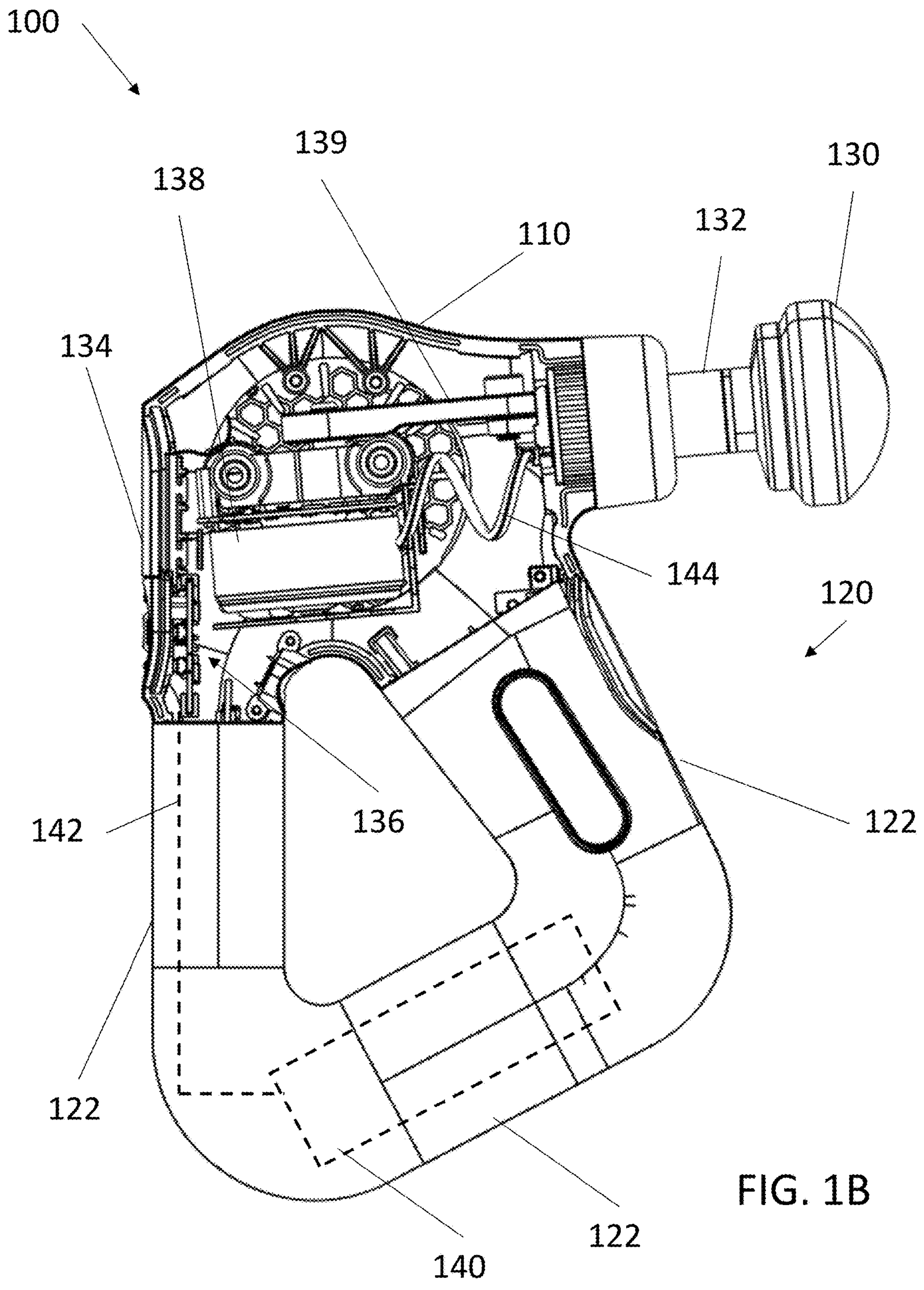
FIG. 1B is a side elevation view of the therapeutic system of FIG. 1A in a partially disassembled state.

Turning to FIG. 1B, with continued reference to FIG. 1A, device 101 comprises a motor 138. Shaft 132 is configured to reciprocate linearly along a reciprocation axis 111 when a motor 138 of massage device 101 is active. Thus, when the motor 138 is active, device 101 may be used for percussive massage by applying massage attachment 130 to tissue while shaft 132 reciprocates. Massage device 101 comprises a push rod 139 connecting motor 138 to shaft 132 and a cable 144 that conveys electrical power to shaft 132 and establishes electronic communication between shaft 132 and controller 136. Push rod 139 and cable 144 of the illustrated example are alike to the push rod 1722 and cable assembly 1726, 1728 of the '399 application. However, in other examples, any other structures can be used to connect shaft 132 mechanically to motor 138, provide power to shaft 132, and establish electronic communication between shaft 132 and controller 136. Further, though the concepts of the present disclosure are illustrated and described in connection with a percussive massage device 101, they can also be applied to devices without percussive functionality wherein shaft 132 is not motorized.

Percussive massage device 101 further comprises a control panel 134 comprising a switch configured to activate the motor 138 that drives shaft 132. Control panel 134 of the illustrated example is positioned on a proximally facing side of head portion 110. Device 101 further comprises a controller 136 in electronic communication with control panel 134 such that controller 136 can receive and act on user's manual inputs to control panel 134. Device 101 further comprises an electrical power source 140, such as, for example, an onboard battery, and a power line 142 connecting source 140 to controller 136. Controller 136 can be configured to govern distribution of electrical power from source 140 to various components of device 101. In further examples, control panel 134 can be positioned anywhere accessible by a user. In still further examples, percussive massage device 101 can be operable by remote control, such as, for example, through a smart device in wireless communication with controller 136, and can lack a control panel 134.

Figure 1C:
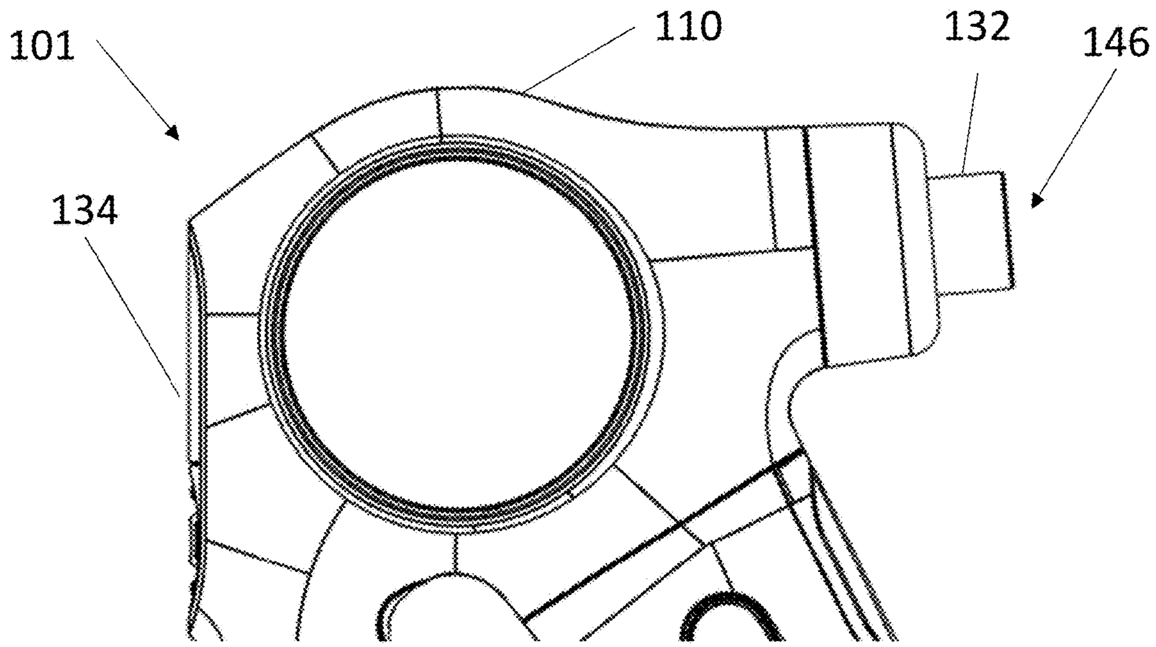
FIG. 1C is a side elevation view of a portion of a percussive massage device of the therapeutic system of FIG. 1A.
Figure 1D:
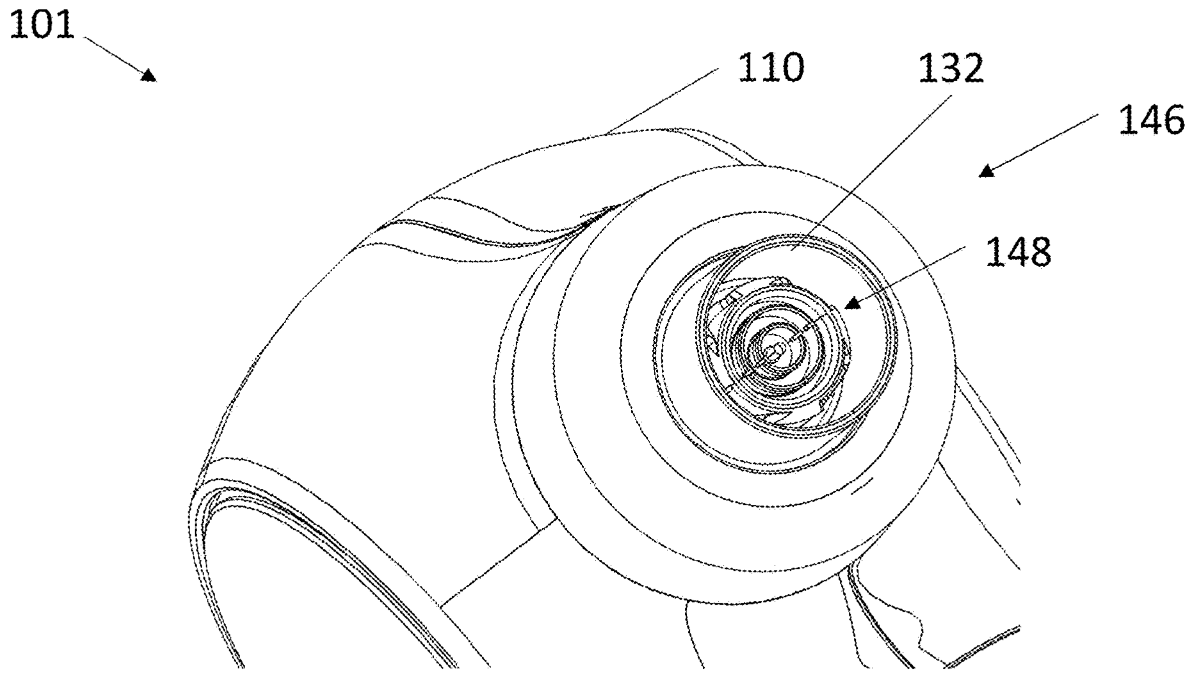
FIG. 1D is an oblique perspective view of the portion of the percussive massage device of FIG. 1C.
Figure 1E:
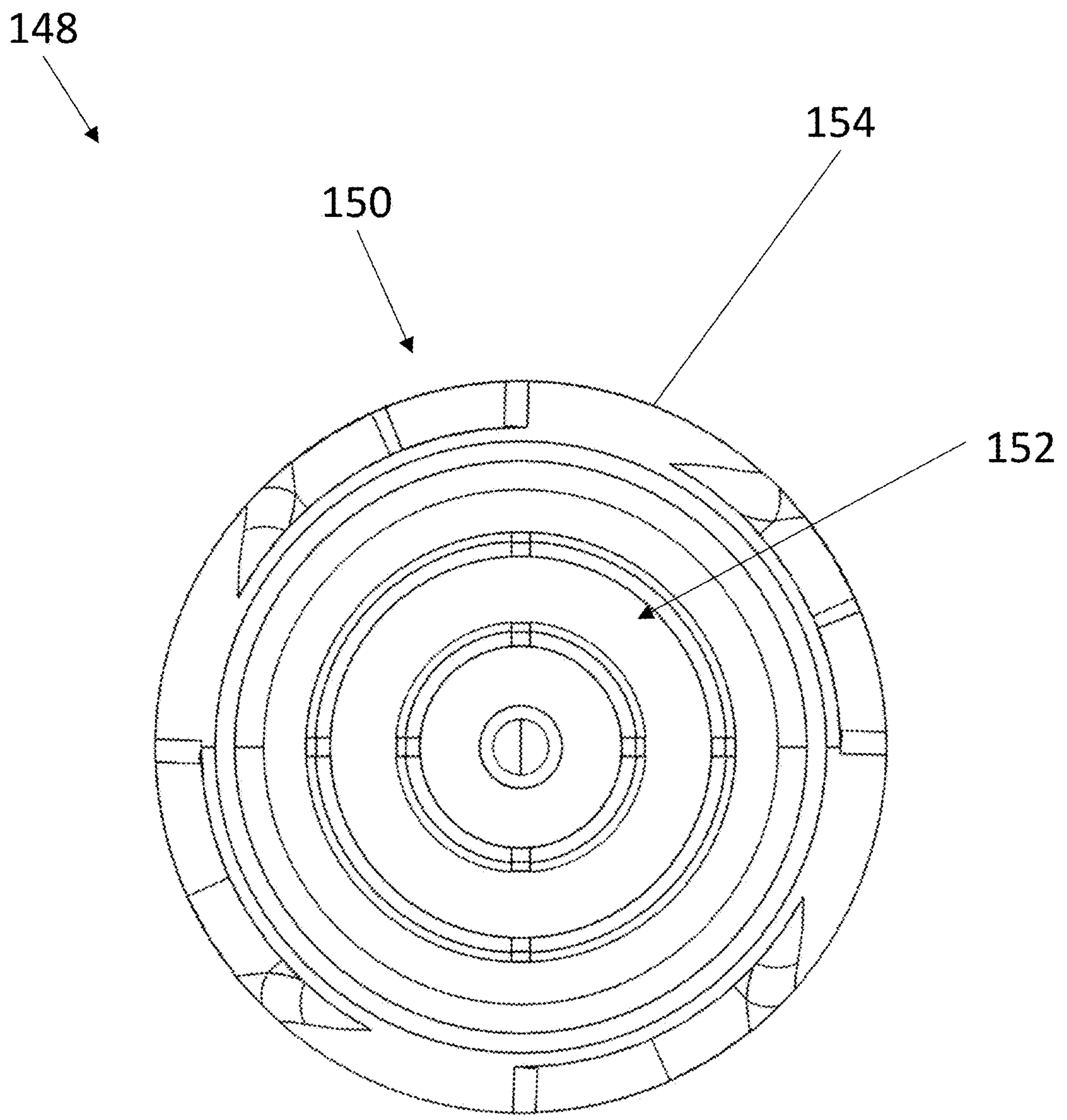
FIG. 1E is an end plan view of a mount of the percussive massage device of FIG. 1C.

Turning to FIGS. 1C-1E, shaft 132 comprises a mount 146 located at the distal end of shaft 132. Mount 146 of the illustrated example comprises an opening at the distal end of shaft 132 that massage attachment 130 can be plugged into to removably couple massage attachment 130 to mount 146.

Mount 146 comprises a shaft connector 148 disposed within the opening. Shaft connector 148 in turn comprises a shaft mechanical connector 150 and a shaft electrical connector 152. Shaft mechanical connector 150 comprises a barrel 154, and shaft electrical connector 152 is disposed within barrel 154.

Figure 1F:
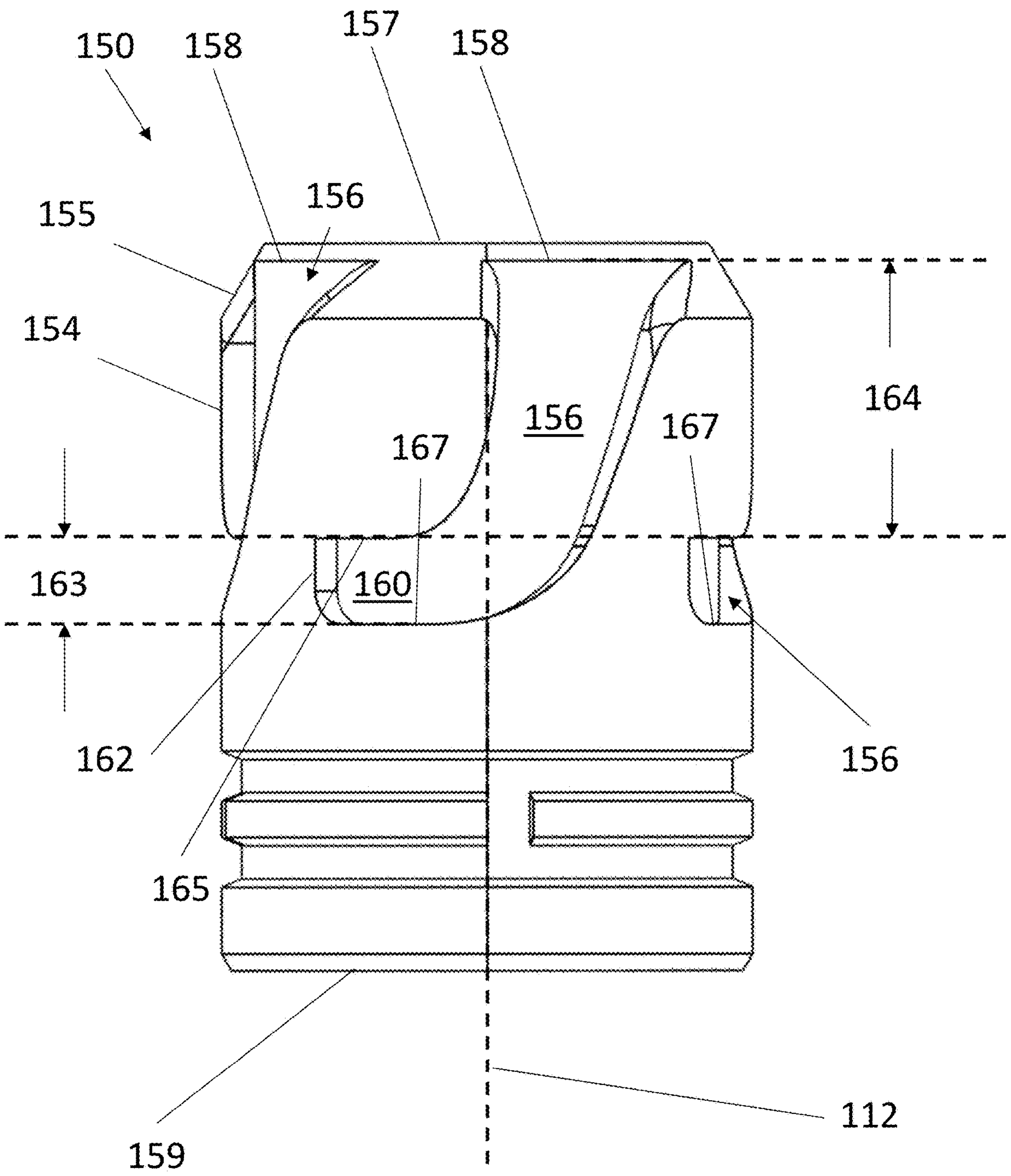
FIG. 1F is a side elevation view of a mechanical connector of the mount of FIG. 1E.

As shown in FIG. 1F, shaft mechanical connector 150 comprises a barrel 154. Barrel 154 extends along a mount connection axis 112 that is aligned with an attachment connection axis 114, defined relative to massage attachment 130 as described below with regard to FIGS. 1J and 1K, when massage attachment 130 is attached to shaft 132 at mount 146. Mount connection axis 112 of the illustrated example is coaxial with reciprocation axis 111 such that attachment connection axis 114 also becomes coaxial with reciprocation axis 111 when massage attachment 130 is connected to shaft 132 at mount 146. However in other examples, mount connection axis 112 can be parallel to reciprocation axis 111 without being coaxial with reciprocation axis 111. In still other examples, mount connection axis 112 can be transverse to reciprocation axis 111.

Barrel 154 comprises channels 156 that extend proximally from a distal end 157 of barrel 154 toward a proximal end 159 of barrel 154. Each channel 156 comprises an opening 158 defining a distal end of the channel 156. Each channel further comprises a circumferential leg 160. Each circumferential leg 160 extends circumferentially on a portion of barrel 154 about mount connection axis 112. Each circumferential leg 160 of the illustrated example is spaced proximally from the opening 158 of the same channel 156. In some further examples, such as wherein channels 156 have a hook shape, circumferential legs 160 can be at a same axial location as openings 158 or circumferential legs 160 can be omitted.

Each circumferential leg 160 terminates at a seat 162. Each seat 162 defines a circumferential end of the circumferential leg 160 and further comprises a distal axial face 165 and a proximal axial face 167. Axial faces 165, 167 of each seat 162 define axial limits of the seat 162 relative to mount connection axis 112. Axial faces 165, 167 of each seat 162 are spaced apart by a first height 163 defined as an axial distance, relative to mount connection axis 112, between distal axial face 165 and proximal axial face 167. Distal axial face 165 of each seat 162 is spaced from opening 158 of the same channel 156 by a second height 164 defined as an axial distance, relative to mount connection axis 112, between distal axial face 165 and opening 158.

Thus, in the illustrated example, shaft mechanical connector 150 comprises channels 156 configured to guide posts 180, discussed further below, as attachment 130 is coupled to mount 146 such that shaft mechanical connector 150 is configured to engage attachment mechanical connector 172 when attachment 130 is coupled to mount 146 to releasably secure attachment 130 to device 101. Each channel 156 comprises an opening 158 configured to receive a respective one of the posts 180 of attachment mechanical connector 174 as attachment 130 is coupled to mount 146. Each channel 156 further comprises a seat 162 defining a terminal position reached by the respective one of the posts 180 when attachment 130 is coupled to mount 146. Each channel 156 further comprises a non-linear portion extending from opening 158 to seat 162. The non-linear portion of the illustrated example is shaped similarly to the letter "J" as shown in FIG. 1F, though channels 156 of other examples can have other non-linear shapes. The inclusion of a non-linear portion between each opening 158 and seat 162 enables a user to lock attachment mechanical connector 174 to shaft mechanical connector 150 by guiding posts 180 to seat 162. Because of the non-linear portion of channel 156 between seat 162 and opening 158, posts 180 are inhibited from simply backing out of channels 156 during use, which reduces a likelihood of unintended disconnection of attachment 130 from mount 146.

Further according to the illustrated example, each channel 156 further comprises a circumferential leg 160 that ends at seat 162 of the same channel. Each circumferential leg 160 extends circumferentially about the position of the central axis of shaft electrical connector 152 relative to shaft mechanical connector 150 when attachment 130 is coupled to mount 146. In the illustrated example, the central axis of shaft electrical connector 152 is mount connection axis 112, but as explained further below the features of mechanical connectors 150, 174 and electrical connectors 152, 178 are reversible between mount 146 and attachment connector 172. Thus, even in some other examples wherein the features of shaft electrical connector 152 are relocated to attachment connector 172 and made to center on attachment connection axis 114, circumferential legs 160 can extend circumferentially about the central axis of those features when attachment 130 is coupled to mount 146 because mount connection axis 112 and attachment connection axis 114 become coaxial when attachment 130 is coupled to mount 146. The positioning of legs 160 to extend circumferentially about the respective central axes of both electrical connectors 152, 178 as shown in the illustrated example guides connection of attachment 130 to mount 146 in a motion wherein electrical connectors 152, 178 rotate relative to one another but remain coaxial.

Barrel 154 can comprise one or more sloped shoulders 155 extending both radially and proximally away from distal end 157 of barrel 154 and encircling mount connection axis 112. Shoulders 155 can assist a user with aligning attachment mechanical connector 174 relative to shaft 132 as attachment 130 while the user couples attachment 130 to mount 146. In some examples, attachment 130 can be configured to bear on shoulders 155 such that some or all load between attachment 130 and shaft 132 is applied to shoulders 155. In such examples, shoulders 155 can partially deflect the load between attachment 130 and shaft 132 such that the barrel 154 and attachment 130 receive the load as combined axial and radial load relative to mount connection axis 112, rather than purely axial load. Shoulders 155 can thereby contribute to longevity of barrel 154 and attachment 130 and reduce noise produced at the interface of mount 146 and massage attachment 130 when therapeutic system 100 is in use. However, shoulders 155 are optional, and can be omitted in other examples.

Figure 1G:
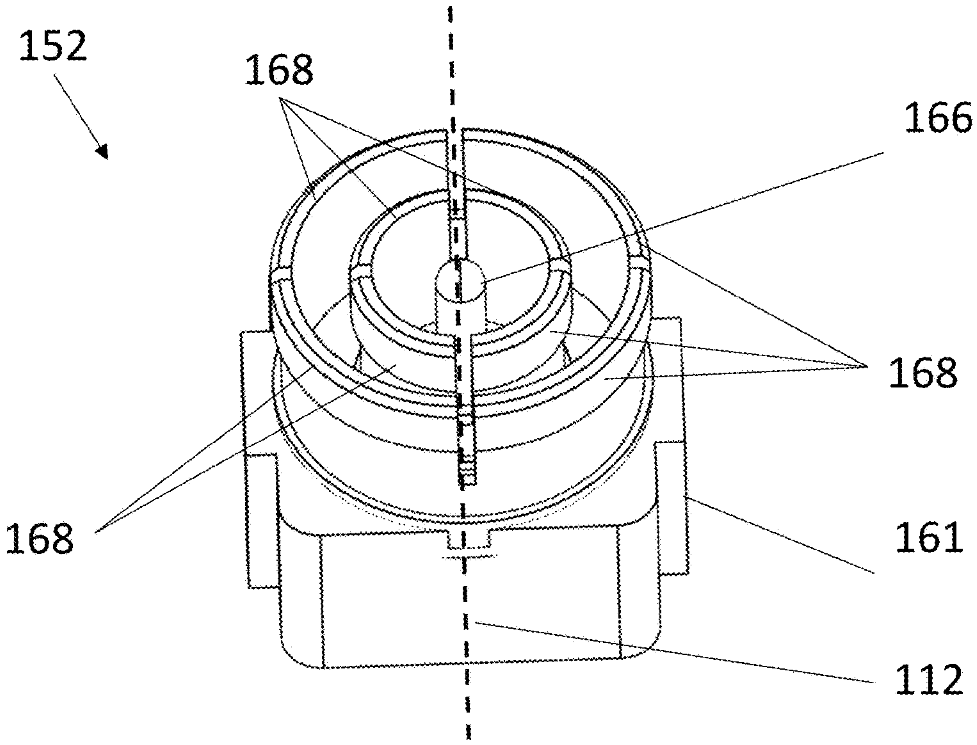
FIG. 1G is an oblique perspective view of an electrical connector of the mount of FIG. 1E.
Figure 1H:
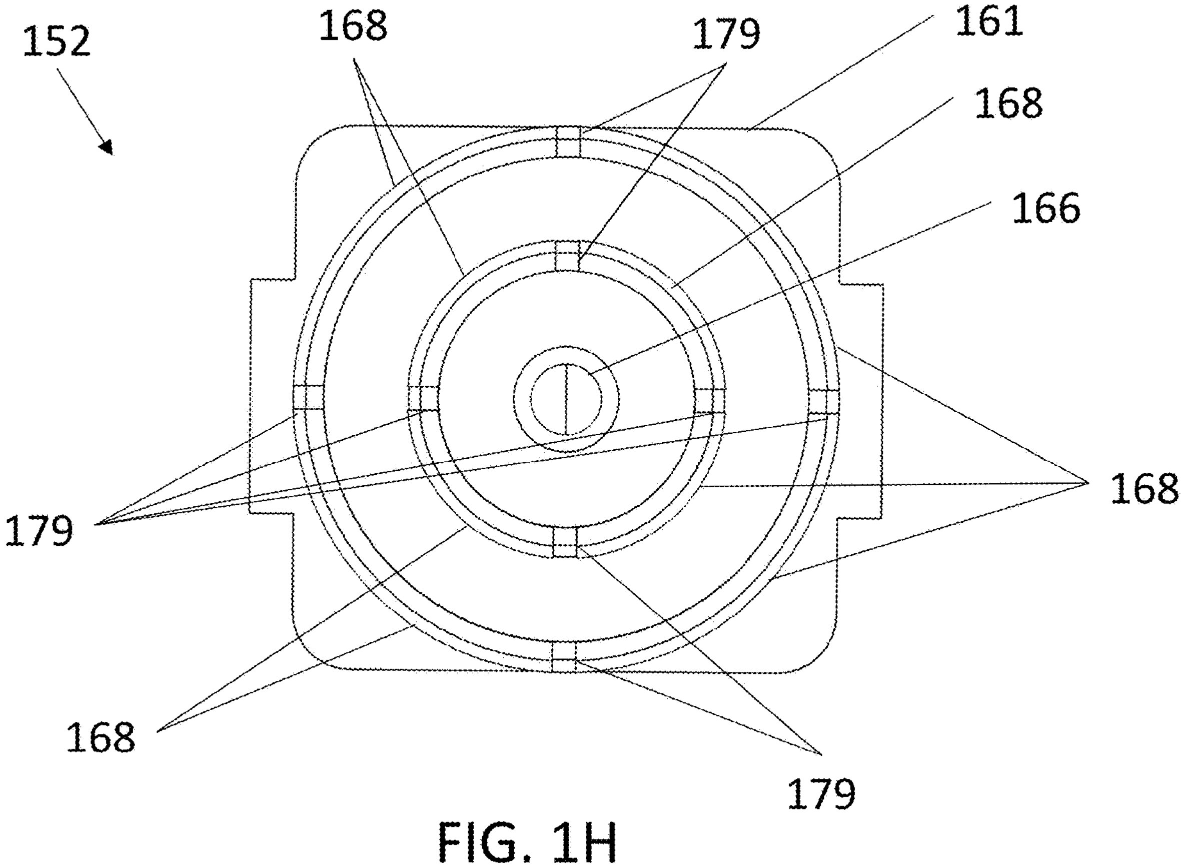
FIG. 1H is an end plan view of the electrical connector of FIG. 1G.
Figure 1I:
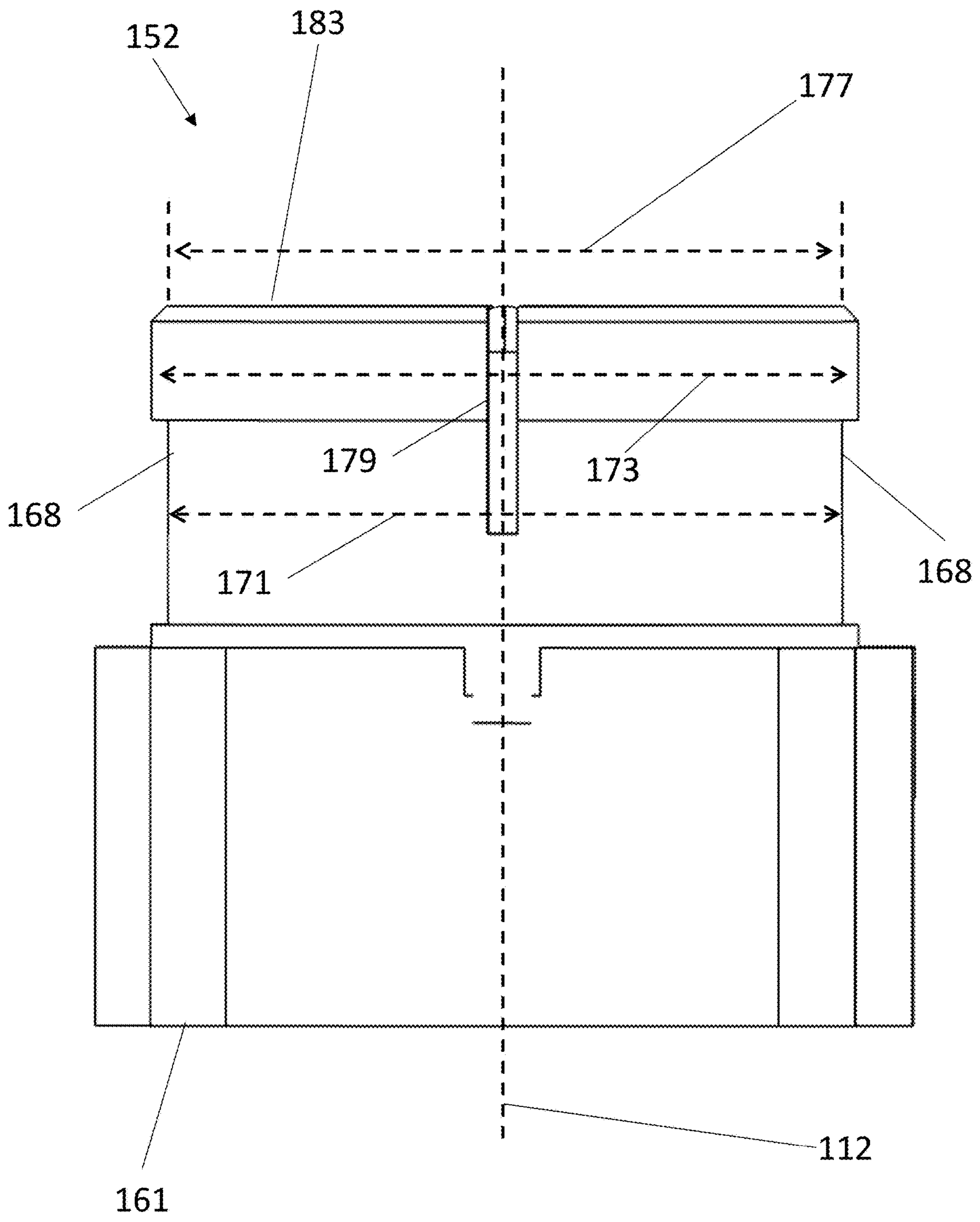
FIG. 1I is a side elevation view of the electrical connector of FIG. 1G.

As shown in FIGS. 1G, 1H, and 1I, shaft electrical connector 152 comprises electrically conductive prongs 166, 168. Prongs 166, 168, can be constructed of any suitably electrically conductive material, such as, for example, metals and metal alloys such as copper or brass. Prongs 166, 168 are in electrical communication with cable 144 through shaft 132. Prongs 166, 168 thus provide electrical contacts of shaft 132 for establishing electrical power and electronic data connection between shaft 132 and massage attachment 130. Shaft electrical connector 152 can further comprise a base 161 from which prongs 166, 168 extend.

One of the prongs 166, 168 comprised by shaft electrical connector 152 is a center prong 166 centered on mount connection axis 112. Center prong 166 is in the form of a post extending along mount connection axis 112. Further prongs 168 are arranged about mount connection axis 112 and center prong 166. Each prong 168 is in the form of an arcuate fin. The arcuate fin shape of each prong 168 comprises a portion of a circle centered on mount connection axis 112. Prongs 168 of the illustrated example are arranged in concentric circles about mount connection axis 112. In particular, shaft electrical connector 152 of the illustrated example comprises two concentric circles or rings of fin-shaped prongs 168, with each circle being centered on mount connection axis 112. As shown, each ring of fin-shaped prongs 168 collectively defines an annular projection centered on mount connection axis 112. The electrical contacts of the illustrated example of shaft electrical connector 152 thus comprise a post and two concentric annular projections centered on mount connection axis 112. Because of the inherent resilient bias of fin-shaped prongs 168 to the resting shape shown in FIGS. 1G, 1H, and 1I, the projections provided by the rings of fin-shaped prongs 168 are biased outward relative to mount connection axis 112 such that each annular projection is configured to press radially outward on the interior of a corresponding socket 184 when attachment 130 is in a locked position on mount 146, described further below. In other examples, shaft electrical connector 152 can comprise more or fewer circles of fin-shaped prongs 168, such as three concentric circles of fin-shaped prongs 168 or only one circle of fin-shaped prongs 168. In some examples, shaft electrical connector 152 can lack a post-shaped central prong 166 and can instead comprise a further circle of fin-shaped prongs 168. Though each circle of fin-shaped prongs 168 in the illustrated example comprises four such fin-shaped prongs 168, other examples can comprise more or fewer fin-shaped prongs 168 in each circle. In further examples wherein shaft electrical connector 152 comprises multiple circles of fin-shaped prongs 168, shaft electrical connector 152 can comprise different amounts of fin-shaped prongs 168 in different circles.

Referring specifically to FIG. 1I, shaft electrical connector 152 comprises a base 161. The plurality of fin-shaped prongs 168 extends substantially parallel to mount connection axis 112 to a free end 183. As used herein with respect to prongs 166, 168, extending substantially parallel to mount connection axis 112 from base 161 to free end 183 means that an axial distance between base 161 and free end 183 exceeds a radial distance between free end 183 and the portion of the prong 168 to which free end 183 belongs that is nearest base 161. Free end 183 is a furthest point on the plurality of prongs 168 from base 161.

Prongs 168 collectively have a first diameter 171 centered on and perpendicular to mount connection axis 112 at a first axial location near base 161. Prongs 168 collectively have a second collective diameter 173 centered on and perpendicular to mount connection axis 112 at a second axial location further from base 161 than the first axial location where prongs 168 collectively have first diameter 171. Prongs 168 collectively have a third diameter 177 centered on and perpendicular to mount connection axis 112 at free end 183. As shown, free end 183 is further from base 161 along mount connection axis 112 than the first axial location where prongs 168 collectively have first diameter 171 and the second axial location where prongs 168 collectively have second diameter 173.

Prongs 168 are resiliently flexible. In particular, because prongs 168 are separated by axially extending gaps 179 spaced angularly about mount connection axis 112, prongs 168 can flex radially inward toward mount connection axis 112 such that free end can have a smaller collective diameter than third diameter 177. FIG. 1I shows the outer circle of prongs 168 at a resting shape to which the outer circle of prongs 168 are biased by their own resilience to return in the absence of external forces on prongs 168. In the illustrated resting shape, third diameter 177 is less than second diameter 173. Further, second diameter 173 is a greatest diameter collectively defined by the outer circle of prongs 168 visible in FIG. 1I, and an exterior profile of prongs 168 tapers inward from second diameter 173 to third diameter 177. Thus, the prongs 168 of the plurality of prongs 168 are each resiliently biased toward a resting shape that tapers toward mount connection axis 112 at free end 183 such that the plurality of prongs 168 has a greatest collective diameter perpendicular to mount connection axis 112 at an axial location between free end 183 and base 161. This tapered shape facilitates pressing prongs 168 into a socket having an internal diameter between second diameter 173 and third diameter 177. Further, because first diameter 171 is less than second diameter 173, the resting shape has a portion with a collective diameter perpendicular to mount connection axis less than the greatest collective diameter at an axial location proximal of the portion between base 161 and the portion of the resting shape that has the greatest collective diameter. This profile places the widest portion of the circle of prongs 168 away from the axial location wherein prongs 168 are connected to base, facilitating contact between prongs 168 and an interior of a receiving socket at an intended depth.

Returning to FIGS. 1G and 1H, shaft electrical connector 152 of the illustrated example comprises two concentric circles or rings of fin-shaped prongs 168. The characteristics described above with regard to the multiple diameters of the external profile of the outer ring of prongs 168 shown in FIG. 1I can also be true for the inner ring of prongs 168. Moreover, in further examples with three or more rings of prongs 168, each additional ring of prongs 168 can have a similar external profile with different diameters at different axial locations to facilitate pressing each ring into a respective socket and establishing reliable contact at an intended depth therein.

Figure 1J:
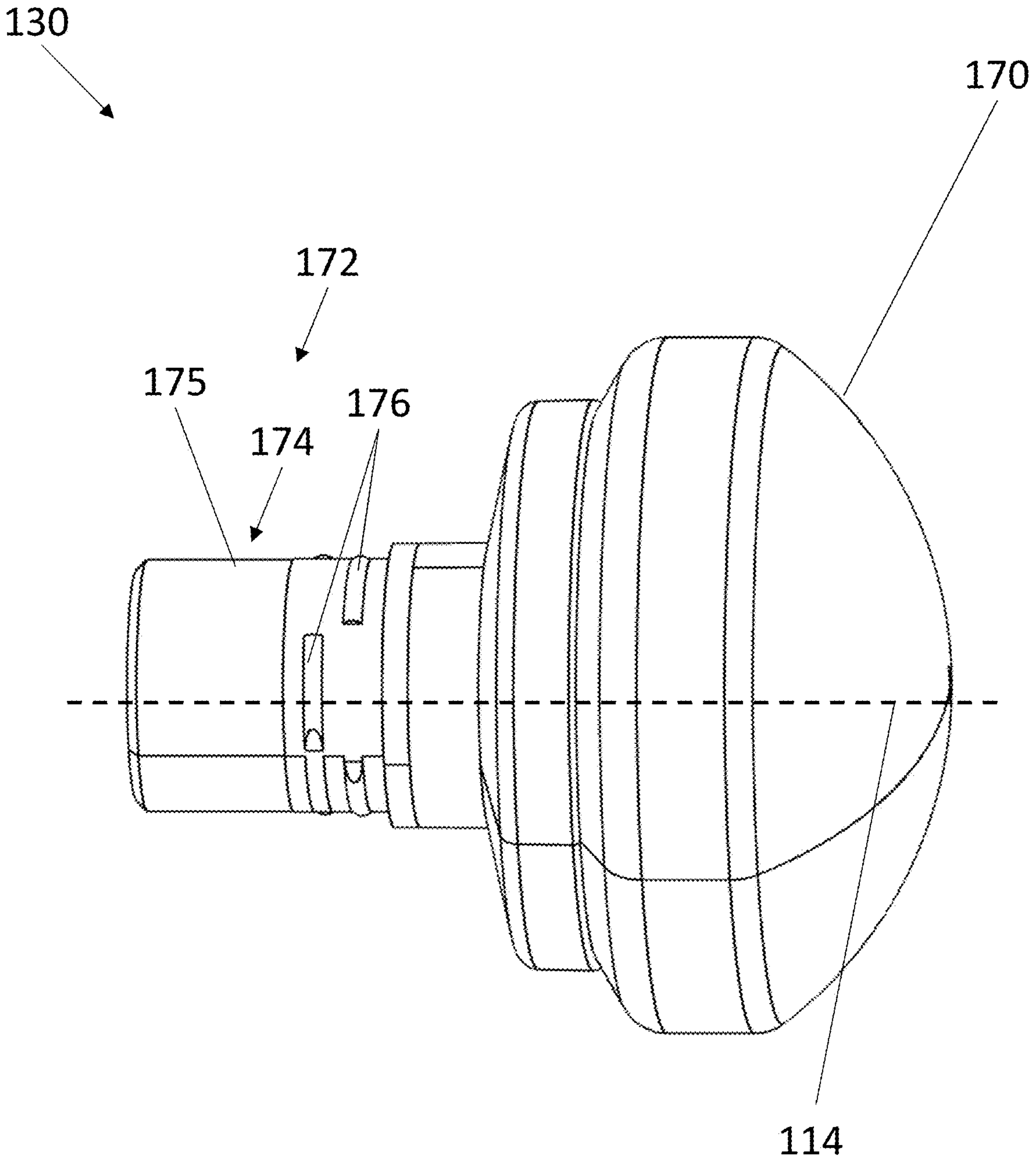
FIG. 1J is a side elevation view of a massage attachment of the therapeutic system of FIG. 1A.

As shown in FIG. 1J, massage attachment 130 comprises a massage end 170 and an attachment connector 172. Massage end 170 comprises features that create a therapeutic effect when massage end 170 is applied to tissue. Attachment connector 172 extends from massage end 170 along attachment connection axis 114 in a direction along which massage attachment 130 connects to mount 146. Thus, when massage attachment 130 is connected to mount 146, attachment connection axis 114 becomes coaxial with mount connection axis 112.

Figure 1K:
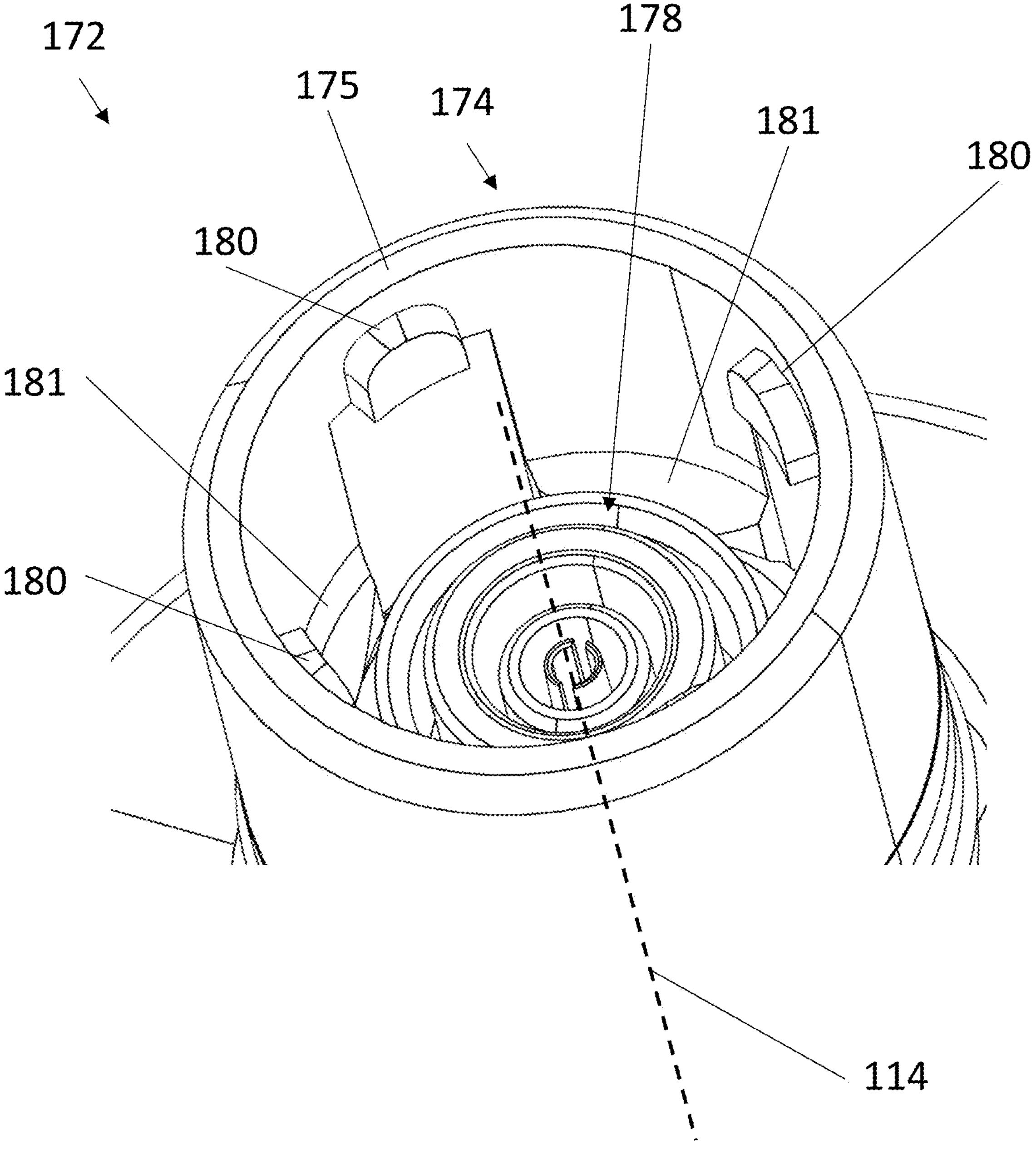
FIG. 1K is an oblique perspective view of a connector of the attachment of FIG. 1J.

Turning to FIG. 1K, with continued reference to FIG. 1J, attachment connector 172 comprises an attachment mechanical connector 174 and an attachment electrical connector 178. Attachment mechanical connector 174 of the illustrated example comprises a tube 175 having friction elements 176 positioned to engage mount 146 when massage attachment 130 is coupled to mount 146. Friction elements 176 can be radial protrusions or bands of a material, such as, for example, rubber, or another polymer material with similar properties. Friction element 176 are optional, but can contribute to a secure connection of attachment 130 to mount 146 while reducing vibration of attachment 130 relative to shaft 132 during use. Friction elements 176 can therefore contribute to longevity of shaft 132 and attachment 130 and enable therapeutic system 100 to operate quietly.

Attachment mechanical connector 174 further comprises posts 180. Posts 180 protrude radially from tube 175 of attachment mechanical connector 174. Posts 180 are positioned to be insertable into channels 156 to connect attachment mechanical connector 174 to shaft mechanical connector 150 when mount connection axis 112 and attachment connection axis 114 are coaxial. Thus, a process for coupling massage attachment 130 to mount 146 of shaft 132 can comprise aligning attachment connection axis 114 with mount connection axis 112 while attachment 130 is positioned distally of shaft 132 and massage end 170 faces distally, then translating massage attachment 130 proximally so that posts 180 of attachment mechanical connector 174 enter openings 158 of channels 156 of shaft mechanical connector 150. The process for coupling massage attachment 130 to mount 146 can further comprise, after posts 180 enter openings 158, advancing and turning attachment along mount connection axis 112 and attachment connection axis 114 so that posts 180 follow channels 156 until posts 180 reach seats 162.

According to the foregoing process for coupling massage attachment 130 to mount 146, attachment 130 is configured to removably couple to mount 146 such that attachment 130 can be transitioned from a locked position, wherein attachment 130 is axially immovable relative to mount 146, and an unlocked position, wherein attachment 130 is axially removable from mount 146, by rotation of attachment 130 relative to mount 146 about mount connection axis 112 and attachment connection axis 114 while attachment 130 remains in contact with mount 146. When attachment 130 is in the locked position, the annular projection defined by each ring of fin-shaped prongs 168 of shaft electrical connector 152 extends into a respective annular socket 184.

Posts 180 are shown in FIG. 1K to extend radially relative to attachment connection axis 114. Posts 180 also extend radially relative to mount connection axis 112 when attachment 130 is coupled to mount 146 because mount connection axis 112 and attachment connection axis 114 become coaxial when attachment 130 is coupled to mount. Posts 180 thus also extend radially relative to respective central axes, defined by mount connection axis 112, and attachment connection axis 114, of both electrical connectors 152, 178 when attachment 130 is coupled to mount 146. Thus, the angular and axial movement of mechanical connectors 150, 174 caused by posts 180 being guided by channels 156 as described herein also causes electrical connectors 152, 178 to move angularly and axially relative to one another while mechanical connectors 150, 174 and electrical connectors 152, 178 remain angularly aligned. Prongs 166, 168 of shaft electrical connector 152 therefore rotate within respective sockets 182, 184 of attachment electrical connector 178 as mechanical connectors 150, 174 are rotatably engaged or disengaged.

Posts 180 can have an axial height relative to attachment connection axis 114 equal to first height 163, introduced above with regard to FIG. 1F. Posts 180 can therefore have a tight fit within seat 162 between distal axial face 165 and proximal axial face 167. In further examples, posts 180 can have an axial height slightly larger than first height 163, such as by up to 1% of first height 163, up to 2% of first height 163, or up to 5% of first height 163, to create an interference fit between posts 180 and seats 162. The fit between post 180 and distal axial face 165 in particular depends on a length and shape of channels 156. Each channel 156 can thus be sized and configured to create an interference fit between a respective one of the posts 180 and an axial face of seat 162 when attachment 130 is coupled to mount 146. The above described tight fit or interference fit between posts 180 and seats 162 can reduce or prevent both axial and rotational movement of attachment 130 relative to shaft 132. Longevity of attachment 130 and shaft 132 can be improved and noise at the interface of attachment 130 and mount 146 can be reduced by reducing axial movement of attachment 130 relative to shaft 132. Unintended loosening or decoupling of attachment 130 from mount 146 can be avoided by preventing rotational movement of attachment 130 relative to shaft 132.

Attachment mechanical connector 174 further comprises one or more shoulders 181 that protrude from a side of tube 175 as posts 180 and encircling attachment connection axis 114. Shoulders 181 can extend both radially away from the side of tube 175 and distally, as shown in the illustrated example. In other examples, shoulders 181 can extend purely radially away from the side of tube 175. Shoulders 181 are spaced distally from posts 180 by an amount relative to second height 164, introduced above with regard to FIG. 1F, such that shoulders 181 bear upon barrel 154 when posts 180 are received in seats 162. In the illustrated example, shoulders 181 are sloped and positioned to engage shoulders 155 of barrel 154 when posts 180 are received in seats 162. In further examples, shoulders 181 can be positioned to additionally or alternatively bear upon distal end 157 of barrel 154 when posts 180 are received in seats 162. Shoulders 181 can be spaced distally from posts 180 by an amount relative to second height 164 that creates a tight or interference fit of a portion of barrel 154 between posts 180 and shoulders 181 when posts 180 are received in seats 162. Thus, shoulders 181 can be positioned relative to posts 180 such that posts 180 bear upon distal axial faces 165 with a tight or interference fit and shoulders 181 bear upon shoulders 155 or distal end 157 with the tight or interference fit when posts 180 are received in seats 162. The tight or interference fit between posts 180, shoulders 181, and barrel 154 can prevent or reduce movement of attachment 130 relative to shaft 132 when attachment 130 is coupled to mount, thereby improving longevity of attachment 130 and shaft 132, reducing noise at an interface between mount 146 and attachment 130, and reducing a likelihood of unintentional decoupling of attachment 130 and mount 146. Further, where shoulders 181 are sloped to extend distally as well as radially, as in the illustrated example, shoulders 181 can deflect some or all load between shaft 132 and attachment 130 such that the shaft mechanical connector 150 and attachment mechanical connector 174 receive the load as combined axial and radial load, relative to attachment connection axis 114, instead of purely axial load. Such deflection of load can further improve longevity of shaft 132 and attachment and reduce noise at the interface between mount 146 and attachment 130.

As described above, attachment mechanical connector 174 is configured relative to first axial height 163 and second axial height 164 of barrel 154 to create tight or interference axial fits for posts 180 within seats 162 and for portions of barrel 154 received between posts 180 and shoulders 181. These axial fits cooperate to advance part longevity, reduce noise, and avoid unintended decoupling of attachment 130 from mount 146. However, in other examples, posts 180 can be shorter along attachment connection axis 114 than first height 163 while shoulders 181 remain spaced relative to posts 180 so as to create a tight or fiction fit on a portion of barrel 154 between posts 180 and shoulders 181 when attachment 130 is coupled to mount 146. In still other examples, shoulders 181 can be omitted or spaced distally from posts 180 by more than second height 164 while posts 180 are sized to have an interference fit within seat 162 between distal axial face 165 and proximal axial face 167.

In the illustrated example, barrel 154 comprises four channels 156 equally angularly spaced about mount connection axis 112. Similarly, attachment mechanical connector 174 comprises four posts 180 equally angularly spaced about mount connection axis 112. Channels 156 are therefore symmetrically distributed about mount connection axis 112 while an equal number of posts 180 are symmetrically distributed about attachment connection axis 114. Thus, posts 180 can all be simultaneously received in channels 156 when mount connection axis 112 and attachment connection axis 114 are made coaxial. Accordingly, when posts 180 are received as channels 156 and mount connection axis 112 is coaxial with attachment connection axis 114, such as during the above described process for coupling massage attachment 130 to mount 146, each post 180 is located at a same position within a respective channel 156 as each other post 180 is located within another channel 156.

In the illustrated example, shaft mechanical connector 150 is a male connector while attachment mechanical connector 174 is a female connector. Thus, barrel 154 is configured to be received in tube 175, channels 156 are defined on a radial exterior of barrel 154, and posts 180 protrude radially inward from tube 175 to engage channels 156. However, in other examples, shaft mechanical connector 150 can be a female mechanical connector while attachment mechanical connector 174 is a male mechanical connector. In some such other examples, shaft mechanical connector 150 can comprise a tube with channels 156 defined on a radial interior of the tube, attachment mechanical connector 174 can comprise a barrel configured to be received in the tube of shaft mechanical connector 150, and attachment mechanical connector 174 can further comprise posts 180 protruding radially outward from the barrel to engage channels 156.

Figure 1L:
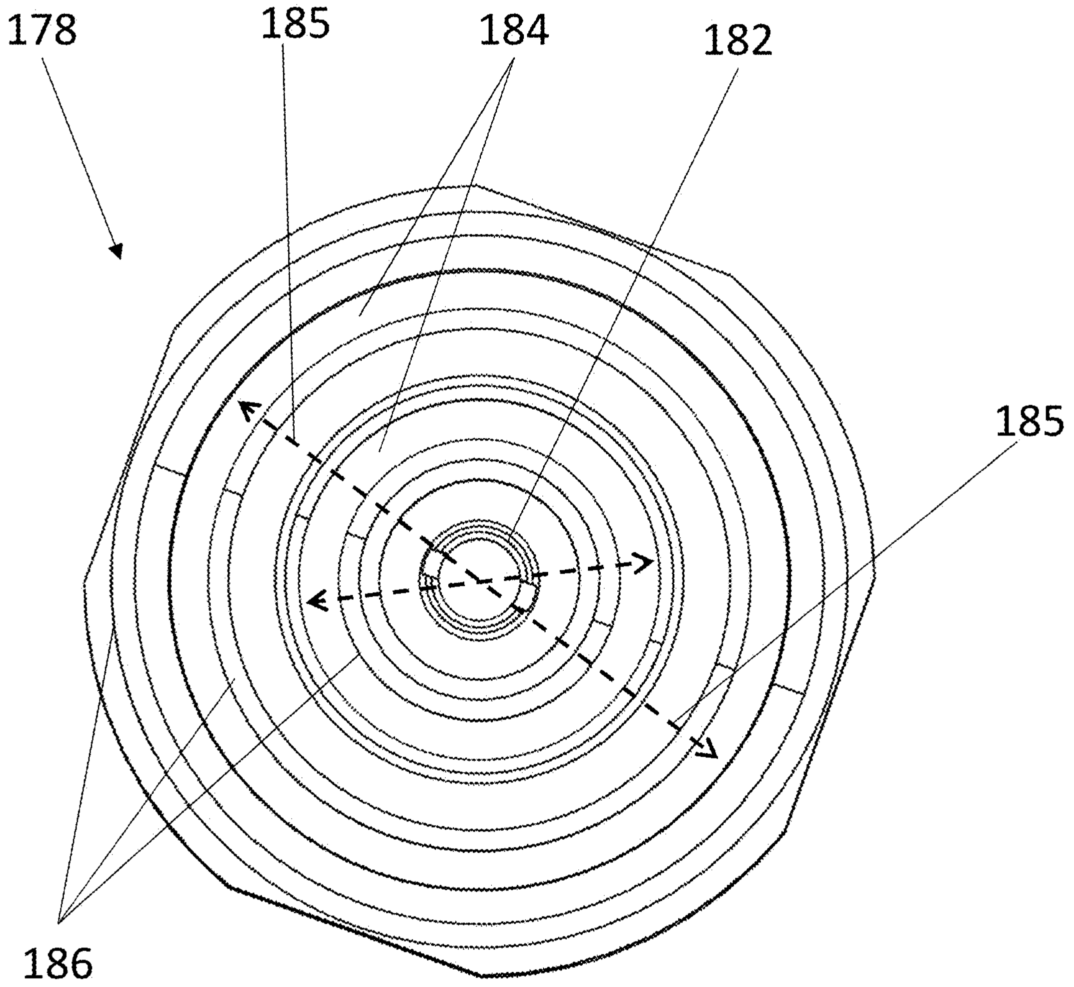
FIG. 1L is an end plan view of an electrical connector of the connector of FIG. 1K.

Turning to FIG. 1L, with continued reference to FIG. 1K, attachment electrical connector 178 comprises a central socket 182 aligned on attachment connection axis 114. Central socket 182 is configured to receive central prong 166 when attachment 130 is coupled to mount 146. Central socket 182 comprises an electrical contact to establish an electrical connection between central prong 166 and components within attachment 130 when central prong 166 is received in central socket 182. Central socket 182 is surrounded by additional annular sockets 184 in the form of trenches defined between walls 186. Walls 186 of the illustrated example are in the form of concentric rings centered on attachment connection axis 114. The trenches that define annular sockets 184 are configured to receive fin-shaped prongs 168 when attachment 130 is coupled to mount 146.

Each wall 186 comprises a conductive band on its radially inner side that acts as an electrical contact to establish an electrical connection between prongs 168 and components within attachment 130 when prongs 168 are received in the trenches that define annular sockets 184. The conductive band on the radially inner side of each wall 186 extends to a contact depth where prongs 168 will contact wall 186 when attachment 130 is coupled to mount 146. In the illustrated example, the contact depth of each annular socket 184 is the depth at which the portion of the corresponding ring of prongs 168 defining the greatest diameter perpendicular to mount connection axis 112, such as second diameter 173, will contact wall 186 when attachment 130 is coupled to mount 146. Each annular socket 184 has a contact span 185 defined as a diameter of the annular socket 184 perpendicular to attachment connection axis 114 at the contact depth of the annular socket 184. Annular sockets 184 of the illustrated example have constant diameters perpendicular to attachment connection axis 114 for their entire depth, meaning each contact span 185 is also a diameter of an opening of the same annular socket 184. However, annular sockets 184 according to other examples can have different diameters perpendicular to attachment connection axis 114 at different depths or angles relative to attachment connection axis 114.

The radially inner surface of each wall 186 that defines the radial exterior of an annular socket 184 defines an interior of that socket 184 and comprises a conductive band that acts as an electrical contact for the socket 184. In some examples, the conductive band can be the wall 186 itself. Thus, in the illustrated example, each annular socket 184 is configured with a contact depth at which the corresponding plurality of prongs 168 contacts the interior of the interior of the socket 184 when attachment 130 is coupled to mount 146. For each annular socket 184, contact span 185 is a greatest distance across the interior of the socket 184 at the contact depth. Each circle of prongs 168 making up a plurality of prongs 168 to be received in an annular socket 184 can, when in a resting shape such as that shown in FIG. 1I, have a greatest collective diameter, such as second diameter 173, that is greater than contact span 185 of that annular socket 184 to ensure that prongs 168 press into contact with the conductive band of the corresponding wall 186 when posts 180 reach seats 162. Further, in the illustrated example, each annular socket 184 defines an opening through which a plurality of prongs 168 are configured to be received when attachment 130 is coupled to mount 146, and the contact span 185 of each annular socket is at least as great as a diameter of the opening. Further according to the illustrated example, because second diameter 173 exceeds contact span 185, the prongs 168 are configured to deflect radially inward toward mount connection axis 112 as attachment 130 is being coupled to mount 146. Placing the electrical contacts of sockets 182, 184 in the walls that define sockets 182, 184 rather than, or in addition to, the axial ends of sockets 182, 184 facilitates consistent electrical contact between prongs 166 and sockets 182, 184 despite relative axial movement between electrical connectors 152, 178 that may occur during axial reciprocation of shaft 132 and attachment 130.

Further according to the illustrated example, attachment electrical connector 178 comprises an inner annular socket 184 and another trench that surrounds the inner annular socket 184, providing an outer annular socket 184. Both annular sockets 184 are bounded by a respective outer wall 186 comprising a respective conductive band. Accordingly, attachment electrical connector 178 comprises a first trench defining an outer annular socket 184 bounded by a first, outermost wall 186 and a second trench surrounded by the first trench and defining an inner annular socket 184 bounded by a second wall 186 surrounded by the first wall 186. Shaft electrical connector 152 comprises a first, outermost ring of prongs 168 and a second, inner ring of prongs 168 surrounded by the first ring of prongs 168. Each ring of prongs 168 comprises at least one conductive fin configured to be received in a respective one of the annular sockets 184 and to travel angularly therein. Thus, the outer ring of prongs 168 comprises at least a first conductive fin configured to extend into the first annular socket 184 and contact the conductive band of the first wall 186 when attachment 130 is coupled to mount 146. Moreover, the inner ring of prongs 168 comprises at least a conductive fin that is located radially inward of the first conductive fin and configured to extend into the second annular socket 184 and contact the conductive band of the second wall 186 when attachment 130 is coupled to mount 146. This fin-and-trench arrangement allows multiple independent electrical connections to be made at different distances from the respective central axes, defined as mount connection axis 112 and attachment connection axis 114, of electrical connectors 152, 178 while permitting electrical connectors 152, 178 to rotate freely relative to one another as mechanical connectors 150, 174 are engaged or disengaged.

Shaft electrical connector 152 and attachment electrical connector 178 can be respectively configured to provide either or both of an electrical power connection, whereby power can be supplied from device 101 to attachment 130, and an electronic data connection, whereby data and control signals can be communicated between device 101 and attachment 130. Shaft electrical connector 152 and attachment electrical connector 178 can therefore allow therapeutic system 100 to have electronic attachments 130 for providing controllable therapeutic effects in addition to percussion. Accordingly, when attachment 130 has electronic components, device 101 can be configured to supply electrical power to the electronic components when attachment 130 is operatively connected to the distal end of shaft 132 at mount 146. Further, controller 136 can have a data connection with the electronic components when attachment 130 is operatively connected to the distal end of shaft 132 at mount 146. In some examples, controller 136 can be configured to send instructions to attachment 130 through the electronic data connection provided by shaft electrical connector 152 and attachment electrical connector 178. In some such examples, controller 136 can further be configured to enable user control of electronic functions of attachment 130 by manual inputs to a user interface of control panel 134. In some examples, controller 136 can be configured to identify a type of attachment 130 connected to mount 146 from information communicated through the electronic data connection provided by shaft electrical connector 152 and attachment electrical connector 178. In some such examples, controller 136 can be configured to disable motor 138 when controller 136 determines that a certain type of attachment 130 is connected to mount 146. In further examples, attachment 130 can have an integrated battery or other power source, and shaft electrical connector 152 and attachment electrical connector 178 can be respectively configured to establish an electronic data connection between device 101 and attachment 130 without otherwise conveying power from device 101 to attachment 130.

The above described mechanical connectors 150, 174 and electrical connectors 152, 178 are independently reversible between shaft connector 148 and attachment connector 172. That is, in alternative examples, shaft connector 148 can have mechanical connecting features like those described above with regard to attachment mechanical connector 174 instead of the features of shaft mechanical connector 150 while attachment connector 172 has complementary mechanical connecting features like those described above with regard to shaft mechanical connector 150 instead of the features of attachment mechanical connector 174. Thus, the mechanical connectors 150, 174 can be reversed between shaft connector 148 and attachment connector 172 without affecting electrical connectors 152, 178. Similarly, in other alternative examples, shaft connector 148 can have electrical connecting features like those described above with regard to attachment electrical connector 178 instead of the features of shaft electrical connector 152 while attachment connector 172 has complementary electrical connecting features like those described above with regard to shaft electrical connector 152 instead of the features of attachment electrical connector 178. Thus, the electrical connectors 152, 178 can be reversed between shaft connector 148 and attachment connector 172 without affecting mechanical connectors 150, 174. In further examples, shaft connector 148 can have the features described above with regard to both attachment mechanical connector 174 and attachment electrical connector 178 instead of shaft mechanical connector 150 and shaft electrical connector 152 while attachment connector 172 has the complementary features described above with regard to both shaft mechanical connector 150 and shaft electrical connector 152 instead of attachment mechanical connector 174 and attachment electrical connector 178. Where the features of mechanical connectors 150, 174 or electrical connectors 152, 178 are reversed as described above, the features of shaft mechanical connector 150 and shaft electrical connector 152 can be arranged relative to attachment connection axis 114 the way they are arranged relative to mount connection axis 112 in the illustrated example, while the features of attachment mechanical connector 174 and attachment electrical connector 178 can be arranged relative to mount connection axis 112 the way they are arranged relative to attachment connection axis 114 in the illustrated example.

In accordance with the above described reversibility of the features of shaft connector 148 and attachment connector 172, the use of the terms "shaft mechanical connector 150," "shaft electrical connector 152," "attachment mechanical connector 172," and "attachment electrical connector 178" pertain to the illustrated example without limiting the locations of where the features described by those terms may be present in other examples. Thus, in further examples, therapeutic system 100 comprises a first mechanical connector 172, a first electrical connector 178, a second mechanical connector 150, and a second electrical connector 152. In such further examples, shaft connector 148 comprises either first mechanical connector 172 or second mechanical connector 150 while attachment connector 172 comprises the other of first mechanical connector 172 or second mechanical connector 150. In such further examples, shaft connector 148 also comprises either first electrical connector 178 or second electrical connector 152 while attachment connector 172 also comprises the other of first electrical connector 178 or second electrical connector 178.

Thus, therapeutic system 100 of the illustrated example comprises a device 101, an attachment 130, a first electrical connector 178, and a second electrical connector 152. Device 101 comprises an electrical power source 140 and a mount 146. Attachment 130 is configured to removably couple to mount 146. First electrical connector 178 comprises at least one socket 184 that defines an interior, and second electrical connector 152 comprises a plurality of prongs 168 arranged around a central axis, such as mount connection axis 112. Attachment 130 comprises either first electrical connector 178 or second electrical connector 152 and mount 146 comprises the other of first electrical connector 178 or second electrical connector 152. The one of first electrical connector 178 or second electrical connector 152 comprised by mount 146 is electrically connected to power source 140. Prongs 168 among the plurality of prongs 168 are biased outward relative to the central axis, which can be mount connection axis 112, and are configured such that when attachment 130 is coupled to mount 146, the plurality of prongs 168 extend into socket 184 and press radially outward on the interior of socket 184. Device 101 is a percussive massage device comprising a motor 138 and a shaft 132 configured to reciprocate linearly in response to activation of motor 138, and shaft 132 comprises mount 146. Attachment 130 comprises a massage head.

FIGS. 2A-2E illustrate a massage head 200. As used herein, a massage attachment is an article comprising a massage head that can be removably coupled to a massage device to form a therapeutic system. Accordingly, massage head 200 according to various examples can be either removably couplable to a mount of a massage device or permanently connected to a massage device. In some examples, massage head 200 can be massage attachment 130 described above.

Massage head 200 is a heating massage head. Massage head 200 comprises a massage end 210 and a base 212 extending from massage end 210. Base 212 comprises a connector 215 configured to connect massage head 200 to a massage device. Accordingly, connector 215 of some examples can be attachment connector 172 described above with regard to massage attachment 130. Accordingly, a percussive massage system can comprise massage head 200 and a percussive massage device comprising a reciprocating shaft and a motor, wherein the reciprocating shaft is configured to reciprocate linearly along a reciprocation axis in response to activation of the motor. The massage head 200 can further comprise a medial portion 230 and an end portion 232, described further below with regard to FIG. 2E, wherein medial portion 230 is configured to resiliently bias the end portion 232 away from base 212 along a proximal-distal axis 211 that is parallel to reciprocation axis 111. Base 212 can optionally be configured to releasably connect massage head 200 to shaft 132.

Massage head 200 of the illustrated example both provides heat to treated tissue and compresses along a proximal-distal axis 211, making massage head 200 suitable for simultaneous application of heat therapy and percussive massage. In particular, massage head 200 can comprise relatively rigid or inflexible elements responsible for providing an advantageous distribution of heat across a distal surface of massage head 200. Those rigid elements can be located near the distal surface of massage head 200, and massage head 200 can further comprise a resiliently compressible element between base 212 and the rigid elements. The compressible element can resiliently bias the rigid elements away from base 212, allowing the rigid elements to provide effective heat therapy while softening the impact of the distal end of massage head 200 upon treated tissue to a magnitude suitable for percussive massage.

Figure 2A:
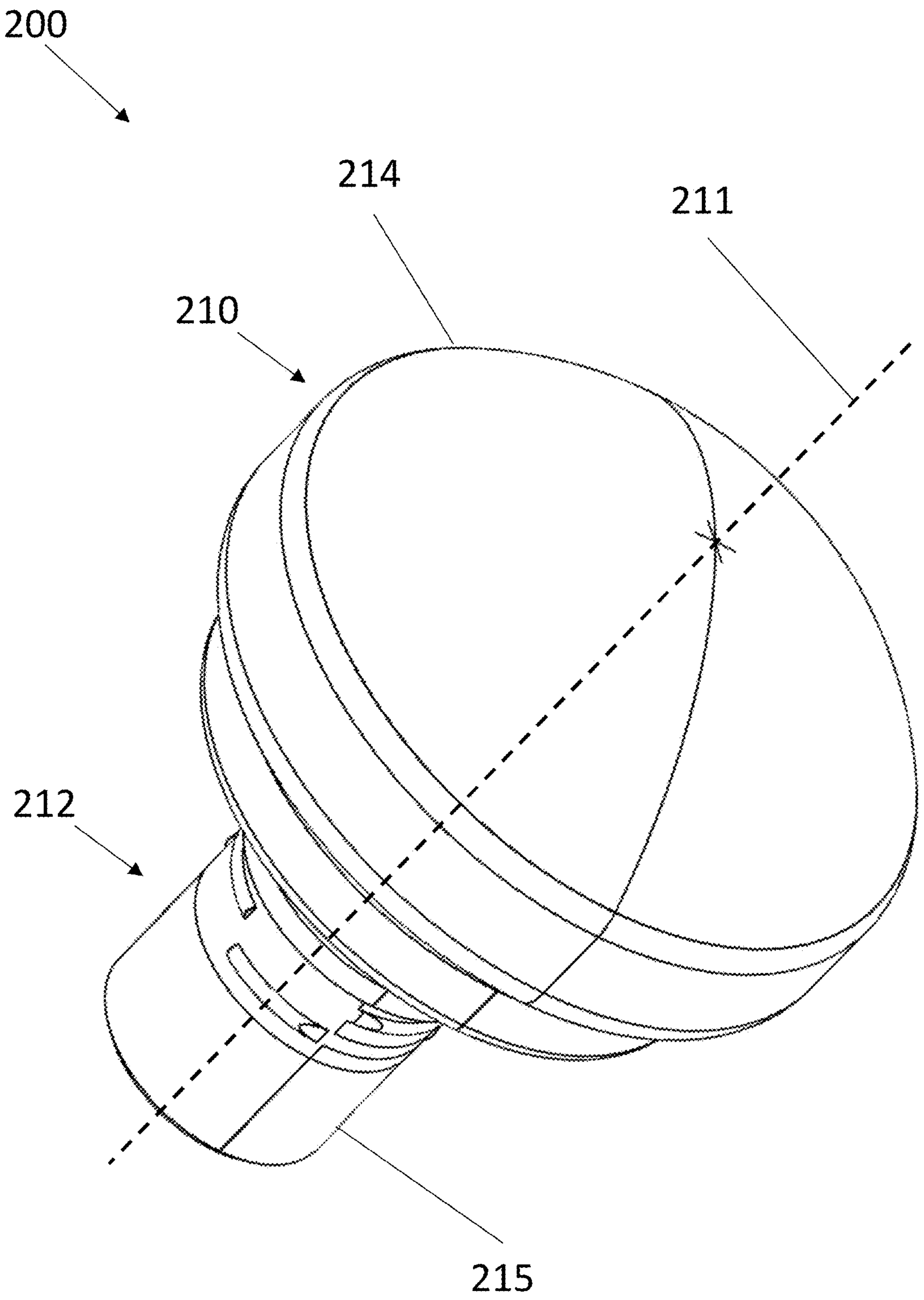
FIG. 2A is an oblique perspective view of a massage head according to further aspects of the present disclosure.

As shown specifically in FIG. 2A, massage head 200 comprises a cover 214.

Massage end 210 of the illustrated embodiment comprises at least part of cover 214. Cover 214 is constructed of a flexible material suitable for applying percussive massage to a skin of a user, such as, for example, foam, plastic, rubber, or other similarly flexible and biocompatible materials.

Figure 2B:
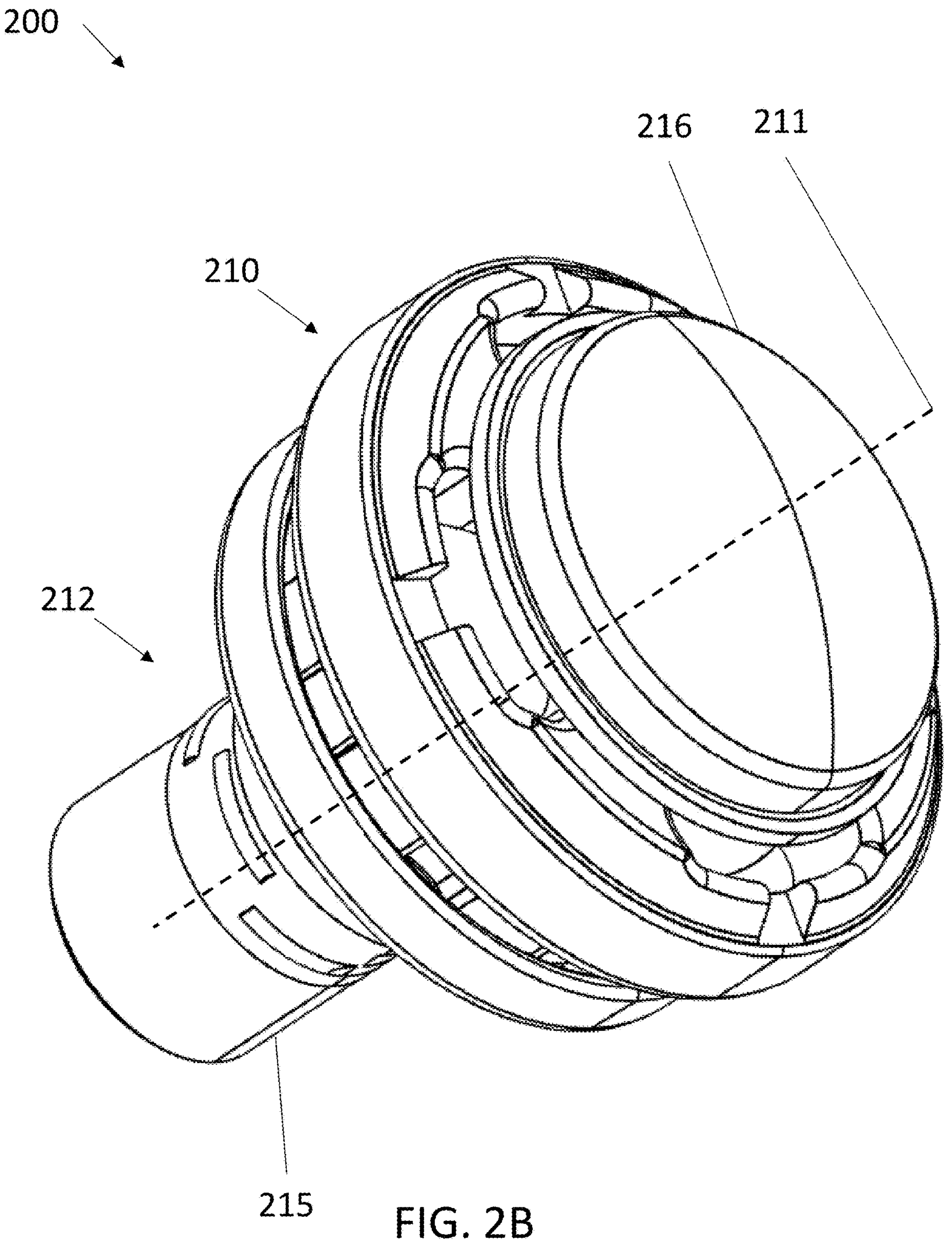
FIG. 2B is an oblique perspective view of the massage head of FIG. 2A in a partially disassembled state.

FIG. 2B shows massage head 200 without cover 214. As shown in FIG. 2B, massage head 200 comprises a panel 216 within massage end 210 under cover 214. Panel 216 can be disposed within cover 214 distally of a heater 218, described further below. Panel 216 is made of thermally conductive material, such as, for example, metal, carbon, or any other material both durable and conductive enough to act as a heat spreader for a head of a percussive massage device. Panel 216 can have a thermal conductivity of, for example, from about 90 to about 5000 watts per meter-kelvin. In further examples, the lower bound can be about 150, about 300, about 500, or about 1000 watts per meter-kelvin while the upper bound remains 5000 watts per meter-kelvin. "About," in this instance, encompasses values within 10% of the stated number, and the stated number itself is explicitly contemplated. Panel 216 is positioned against, or at least adjacent to, an interior side of cover 214. In the illustrated example, panel 216 is located between a heater 218, described further below, and cover 214. Panel 216 can extend across a majority of an intended contact surface of massage head 200. For example, an end portion 232, described further below with regard to FIG. 2E, of massage head 200, can define a distal surface intended for contact with treated tissue, and a distal side of panel 216 can have an area that is from 90% to 100% of a total area of the distal surface of end portion 232.

Figure 2C:
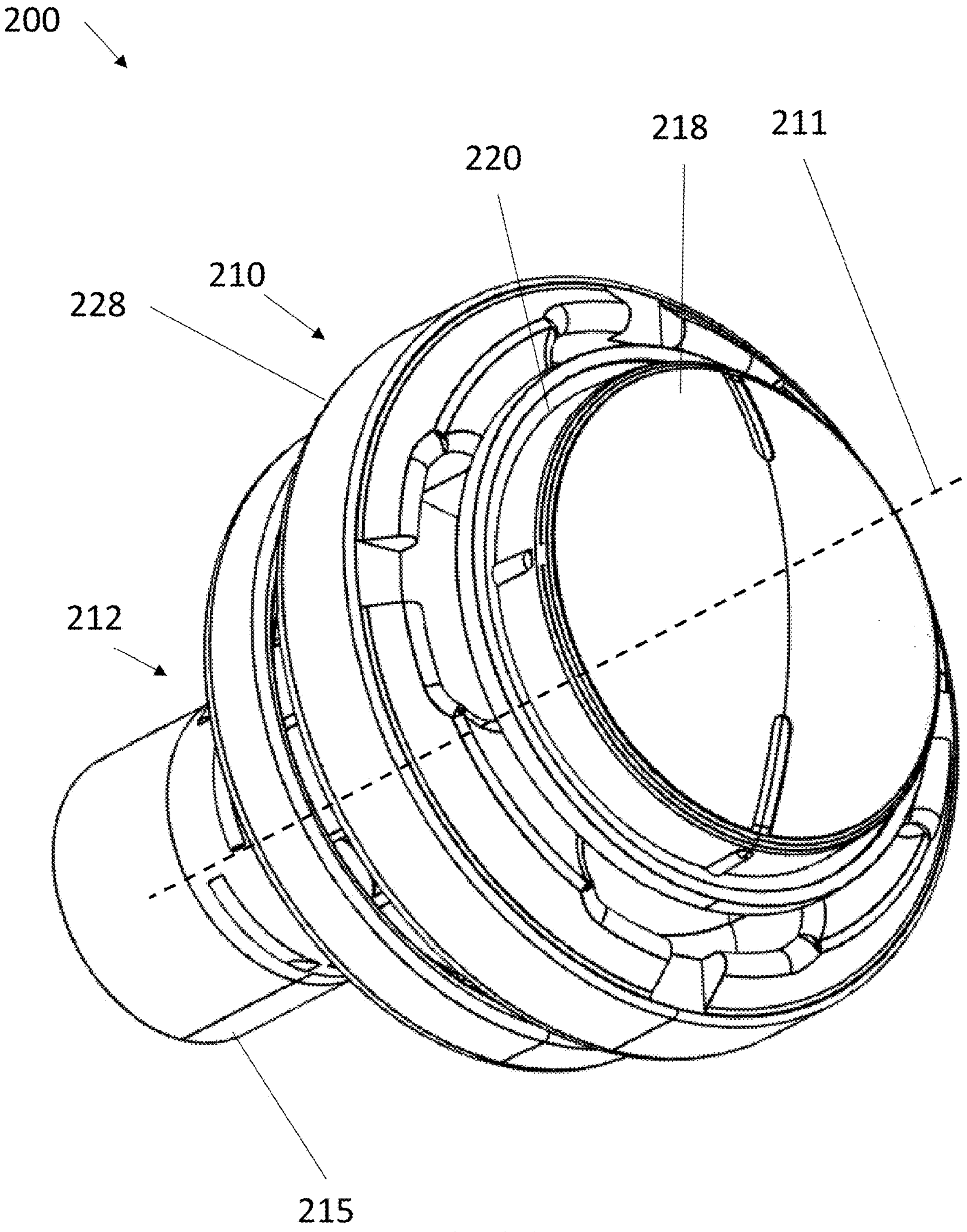
FIG. 2C is an oblique perspective view of the massage head of FIG. 2A in a further disassembled state.

FIG. 2C shows massage head 200 without either cover 214 or panel 216. Heater 218 can be, for example, a resistive heater, a carbon fiber heater, or any other type of heater controllable to heat to therapeutic temperatures within the interior of massage head 200. As shown in FIG. 2C, massage head 200 further comprises a heater 218 within massage end 210. Heater 218 is positioned against panel 216 such that, when active, heater 218 heats panel 216. In some examples, heater 218 can be thermally coupled to panel 216, meaning heater 218 can be in direct contact with panel 216 or heater 218 can be placed in thermal communication with panel 216 by a bridging portion of thermally conductive material, such as thermal paste, carbon fiber, or metal. Because panel 216 is constructed of thermally conductive material, panel 216 can act as a heat spreader by rising to a relatively uniform elevated temperature across its surface when heated by heater 218. This elevated temperature is then communicated from panel 216 to cover 214, resulting in even heating of a portion of cover 214 that extends a distal side of heater 218 and forms a distal side of massage end 210. Thus, activation of heater 218 results in even heating across a distal side of massage end 210. When the distal side of massage end 210 is heated in this manner, massage head 200 can be applied to tissue to provide heat therapy. When massage head 200 is further connected to a percussive massage device with an active motor causing massage head 200 to reciprocate linearly along reciprocation axis, relative to which the proximal and distal directions are defined, massage head 200 can be used to provide simultaneous heat therapy and percussive massage. Some varieties of heat therapy are associated with benefits including improving blood flow to a treated area and causing muscle relaxation, which can augment the effects of percussive massage.

Figure 2D:
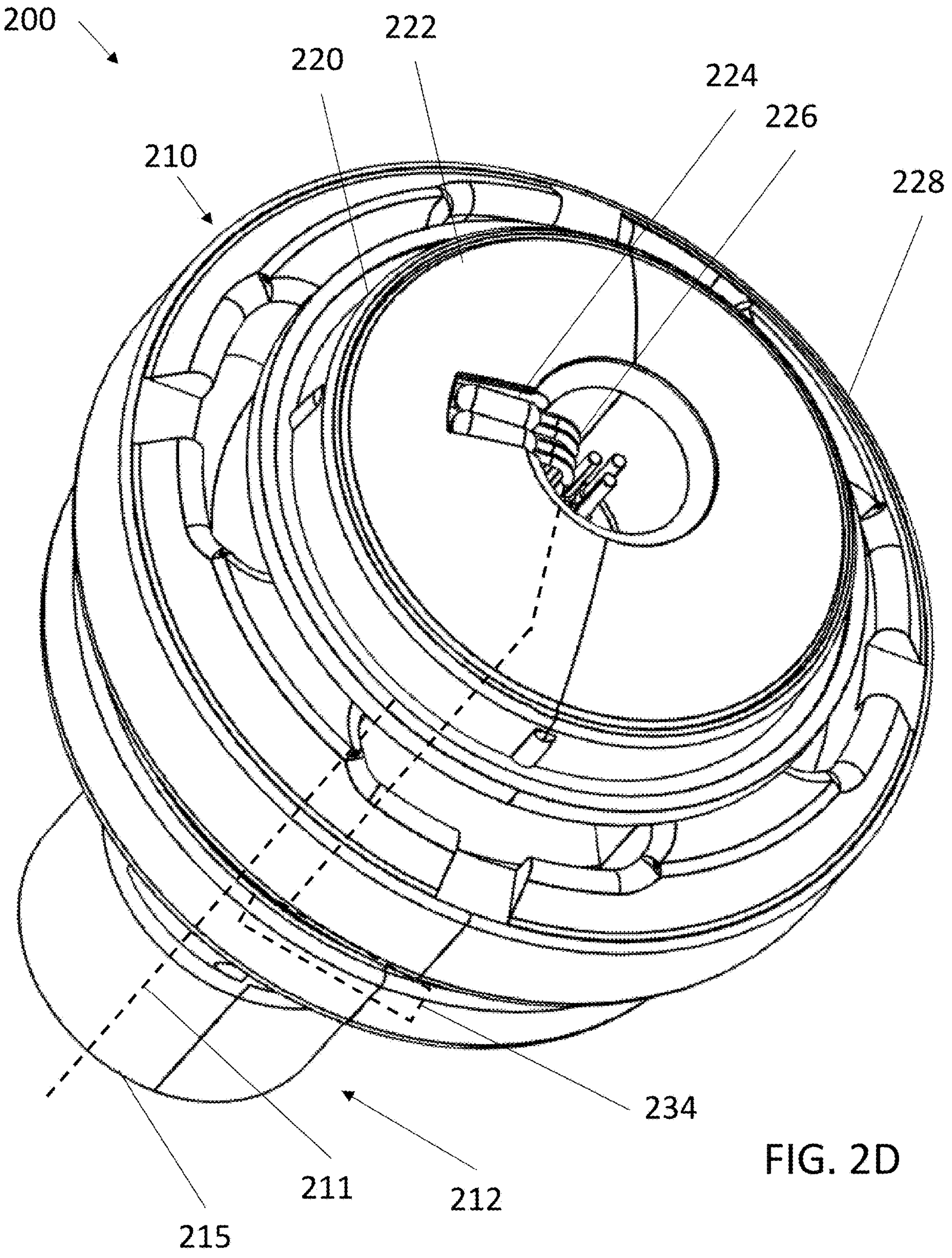
FIG. 2D is an oblique perspective view of the massage head of FIG. 2A in a still further disassembled state.

FIG. 2D shows massage head 200 without cover 214, panel 216, or heater 218. As shown in FIG. 2D, wires 226 extend from a controller 234 toward the location where heater 218 is shown in FIG. 2C. Wires 226 extend from controller 234 to heater 218 and establish communication therebetween. Heater 218 receives electrical power and control signals from controller 234 through wires 226. Massage head 200 of the illustrated example further comprises temperature sensors 224 located within massage end 210 and configured to measure temperature of heater 218. Temperature sensors 224 are also connected to controller 234 by wires 226. Temperature sensors 224 receive power from controller 234 and communicate temperature measurements to controller 234. Massage head 200 of the illustrated example thus comprises a controller 234 located in base 212 and a wire 226 extending from temperature sensors 224 to base 212 and connected to controller 234. Further according to the illustrated example, controller 234 is mounted to base 212 and electrically connected to heater 218 through cushion 228. However, controller 234 can be located in massage head 200 other than within base 212 in other examples.

In other examples, massage head 200 can alternatively or additionally comprise wires extending from heater 218, temperature sensors 224, or both, to a connection with the massage device, such that heater 218, temperature sensors 224, or both, can receive power directly from the massage device, be in electronic communication with a controller of the massage device, or both. In some such examples, massage head 200 can lack controller 234. In some examples, massage head 200 can receive power and control signals from a therapeutic device to which massage head 200 is connected through connector 215. In further examples wherein massage head 200 comprises controller 234, some or all of the power and control signals received through connector 215 can reach controller 234, which can relay power and signals to other elements of massage head 200.

Referring to both FIGS. 2C and 2D, massage end 210 of the illustrated example of massage head 200 comprises a frame 220 that retains heater 218 and temperature sensors 224. In the illustrated example, massage head 200 also comprises a pad 222 retained by frame 220. Pad 222 is located between heater 218 and at least a portion of frame 220. Frame can be made of a more rigid material than pad 222. Pad 222 can therefore protect heater 218 from impacting or rattling against frame 220 when massage head 300 is used for percussive massage. Frame 220 of the illustrated example is positioned distally of cushion 228, described further below. Thus, an end portion 232 of the illustrated example, shown in FIG. 2E, comprises a rigid frame 220 that retains heater 218 and a pad 222 positioned proximally of heater 218, between heater 218 and a portion of rigid frame 220. Frame 220 and pad 222 are both optional and can be located elsewhere or omitted in other examples of massage head 200.

Massage head 200 further comprises a cushion 228. Cushion 228 supports frame 220, heater 218, temperature sensors 226, and panel 216 relative to base 212. Cushion 228 can be disposed within cover 214. Cushion 228 is made of a compressible material, such as foam. In further examples, cushion 228 can be replaced by a metal coil spring or another similarly resilient material or structure. Thus, cushion 228 can be positioned between base 212 and panel 216 and configured to resiliently bias panel 216 away from base 212. In further examples, cushion 228 can be an assembly of multiple components. In some such examples, cushion 228 can be an assembly of a foam block and an axially compressible frame constructed of a different material than the foam block. In some further such examples, cushion 228 can be an assembly of a polyurethane foam block and an axially compressible frame of polycarbonate. Thus, in some examples, cushion 228 can be a foam block. Because cushion 228 is compressible and relatively inflexible elements located within massage end 210 of massage head 200, such as panel 216 and heater 218, are located on an opposite side of cushion 228 from base 212, massage head 200 can compress, allowing panel 216 and heater 218 to move nearer to base 212 along reciprocation axis 211.

Figure 2E:
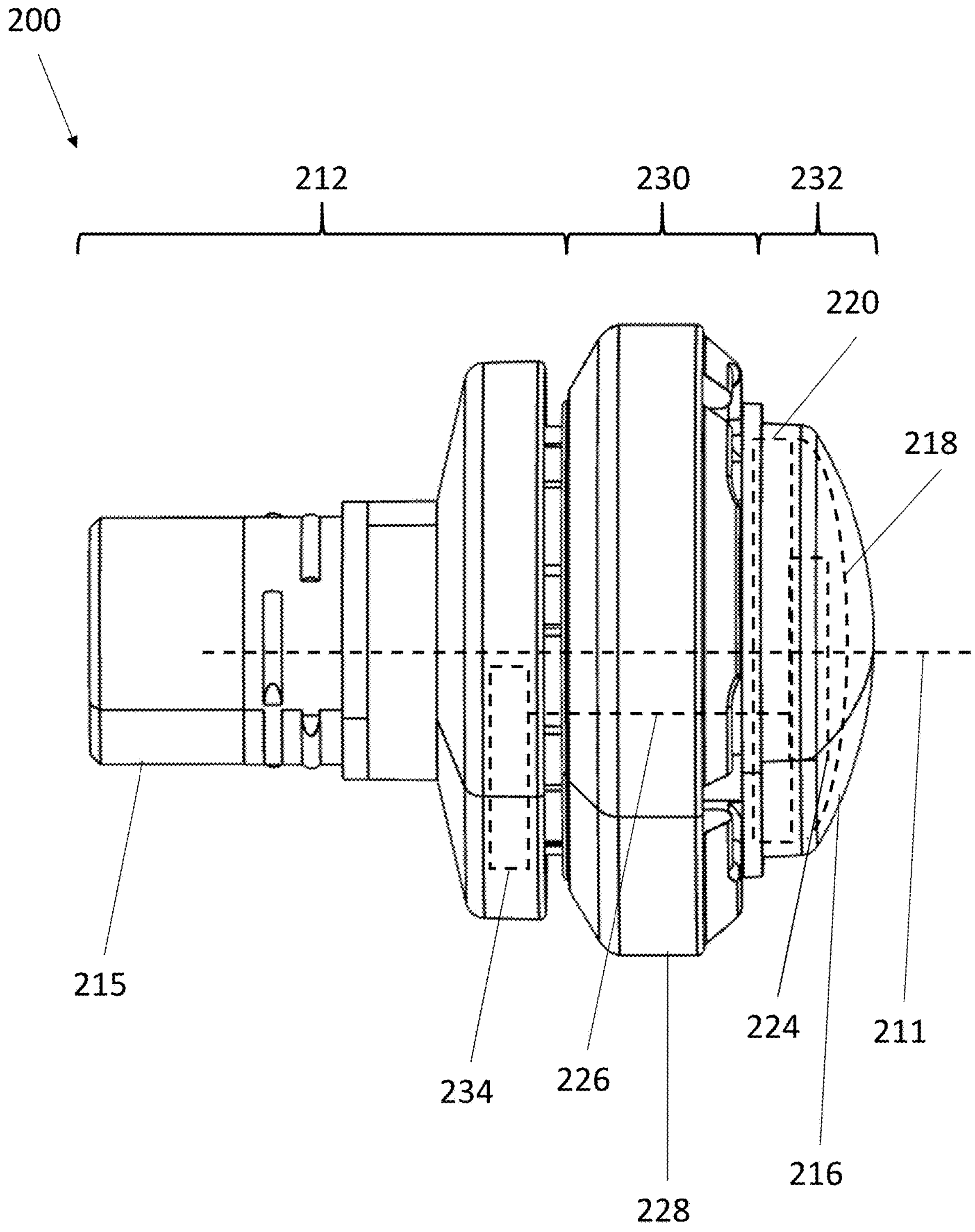
FIG. 2E is a side elevation view of the massage head of FIG. 2A in the partially disassembled state of FIG. 2B.

As shown in FIG. 2E, massage head 200 comprises a distal portion 232 and a medial portion 230 located between distal portion 232 and base 212. Distal portion 232 comprises panel 216, heater 218, and frame 220. Medial portion 230 comprises at least a portion of cushion 228. Medial portion 230 also comprises a portion of wires 226 extending between distal portion 232 and base 212. Because cushion 228 is compressible and wires 226 are flexible, medial portion 230 can compress axially relative to reciprocation axis 211. Thus, when massage head 200 is used for percussive massage such that the distal side of massage head 200 impacts the treated site, massage head 200 can compress axially. The axial compression enabled by the presence of medial portion 230 comprising compressible or flexible components allows use of relatively rigid elements in distal portion 232 without making massage head 200 inflexible overall. As a result, a relatively inflexible panel 216 or heater 218 can be used in distal portion 232 to achieve desired heat transfer effects between massage head 200 and the treated tissue while preserving mechanical yield in massage head 200 such that massage head 200 provides an appropriate amount of force to the treated tissue.

Cover 214, which is omitted from FIG. 2E, extends into distal portion 232 and medial portion 230 in the illustrated example, though in other examples cover 214 can be limited to distal portion 232. Because cover 214 is also flexible, the presence of cover 214 in medial portion 230 does not interfere with axial compression of medial portion 230.

In other examples, controller 234 can be located in distal portion 232 of massage head 200, and an additional wire or additional wires can extend from controller 234 through medial portion 230 into base 212. In some such further examples, the wire or wires extending from controller 234 to base 212 are also flexible such that medial portion 230 is compressible as described above.

FIGS. 3A-3I illustrate a massage head 300 according to another example. Massage head 300 is a temperature therapy module, such as a cold therapy module. Massage head 300 of the illustrated example comprises a tissue contacting element in the form of panel 316 and a heat pump 324 for bringing panel 316 toward an intended temperature. Massage head 300 of the illustrated example further comprises a housing 310 and is configured to distribute a thermal load from heat pump 324 across housing 310. Massage head 300 is further configured to use a fan to force air across housing 310, thereby using housing 310 both as a structural element and as a heat sink for dissipating the thermal load of heat pump 324 to ambient air.

Figure 3A:
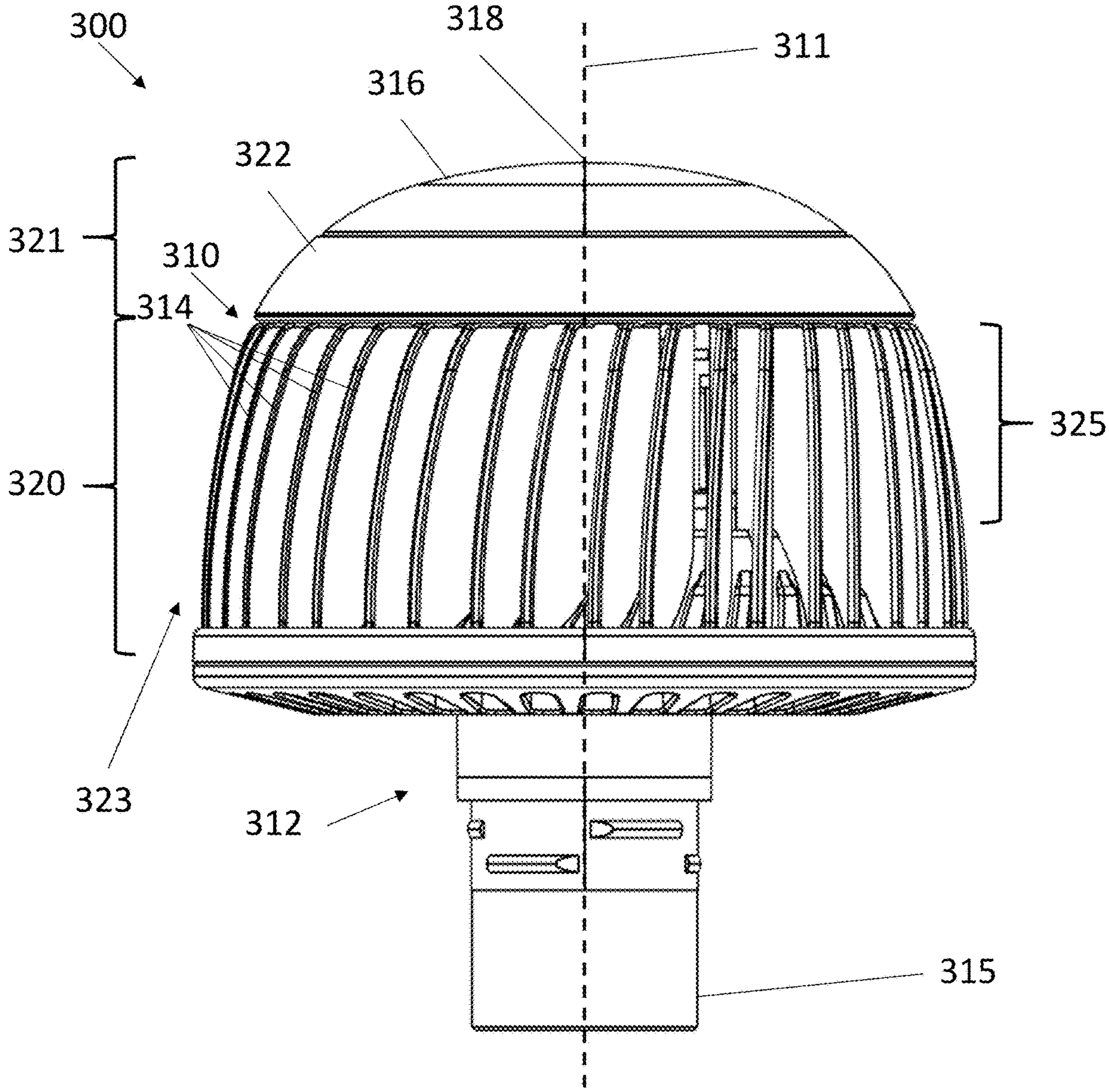
FIG. 3A is a side elevation view of a massage head according to further aspects of the present disclosure.
Figure 3B:
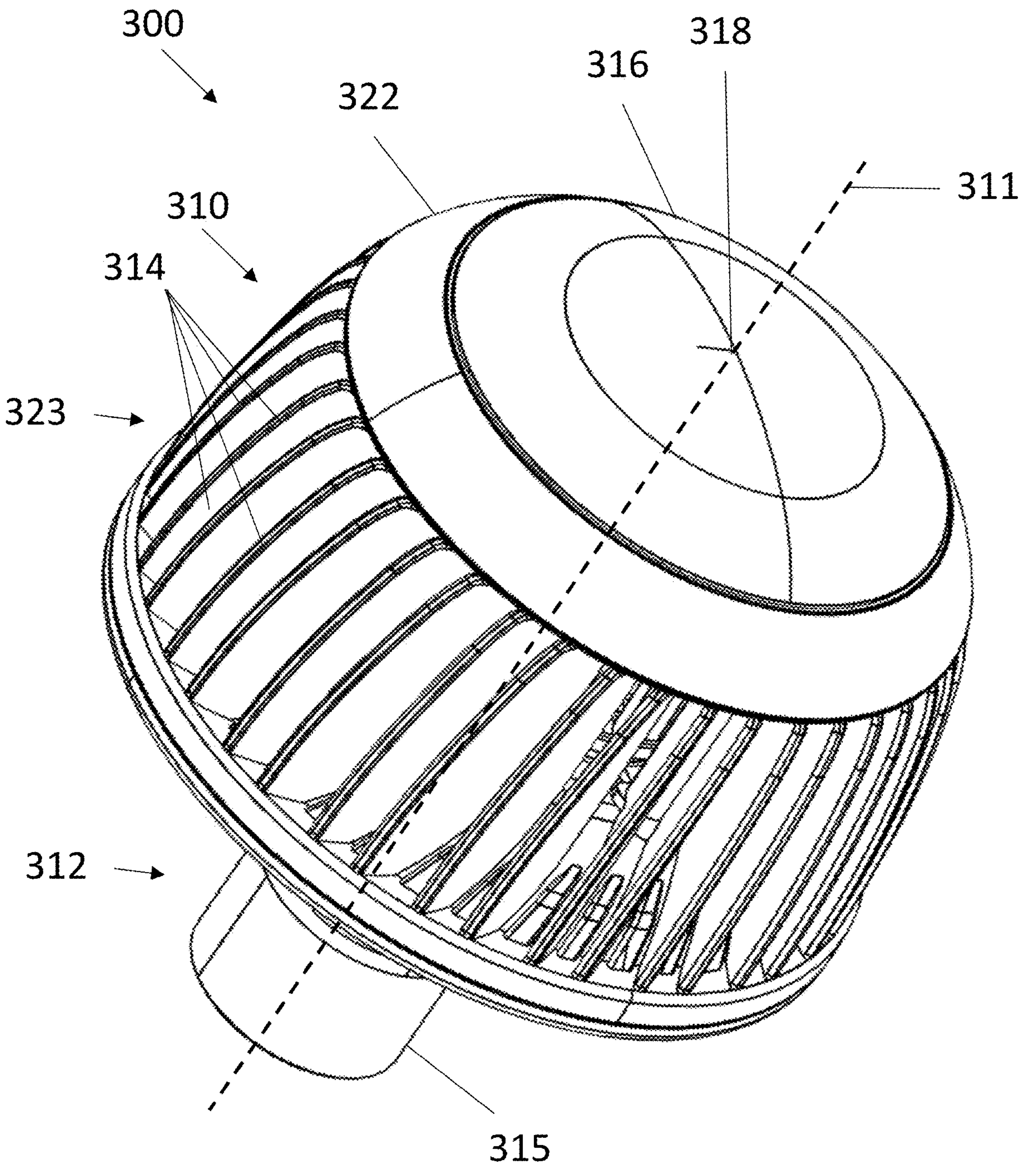
FIG. 3B is an oblique perspective view of the massage head of FIG. 3A.

FIGS. 3A and 3B show massage head 300 in an assembled state. Massage head 300 can be a cooling or heating massage head. In further examples, massage head 300 can be a cooling or heating attachment.

Massage head 300 comprises housing 310. A proximal-distal axis 311 is defined relative to housing 310. A base 312 defines a proximal portion of housing 310 and extends proximally along proximal-distal axis 311. Housing 310 can be centered on proximal-distal axis 311 as shown in the illustrated example or off-center relative to proximal-distal axis 311 in other examples. Base 312 comprises a connector 315 configured to connect massage head 300 to a massage device. Accordingly, connector 315 of some examples can be attachment connector 172 described above with regard to massage attachment 130.

Massage head 300 can therefore be a therapeutic attachment in a percussive therapy system, such as therapeutic system 100 described above, comprising a percussive massage device that in turn comprises a motor, a reciprocation shaft configured to reciprocate along a reciprocation axis when the motor is active, and a controller, wherein massage head 300 is configured to be selectively attachable to a distal end of the reciprocation shaft. The controller can optionally be configured to prevent activation of the motor when the therapeutic attachment is operatively connected to the distal end of reciprocation shaft. For example, massage head 300 can be configured to provide a type of temperature therapy that does not benefit from simultaneous application of percussive massage, so the controller of the percussive massage device 101 can be configured to detect when massage head 300 is connected to mount 146 and to deactivate the motor when connection of massage head 300 to mount 146 is detected. In further examples, the therapeutic system can further comprise a distinct heat therapy module, such as heating massage head 200 described above, that is also configured to be selectively attachable to the distal end of the reciprocation shaft. The controller can be configured to permit activation of the motor when the heat therapy module is connected to the distal end of the reciprocation shaft.

Housing 310 in turn comprises a medial portion 320 and a distal portion 321. Distal portion 321 comprises a panel 316 configured to act as a thermal spreader to apply a temperature effect to treated tissue. Distal portion 321 further comprises an insulator 322. Insulator 322 is disposed between panel 316 and heat sink 323. Insulator 322 is constructed of a less thermally conductive material than panel 316 and heat sink 323. Insulator 322 can be constructed of, for example, metal, such as any metal having a lower thermal conductivity than the panel 316, carbon or carbon fiber, polymer, plastic, such as polycarbonate/acrylonitrile butadiene styrene (PC-ABS), ceramic, or any other substance having lower thermal conductivity than panel 316. In some examples, insulator 322 can contain a cavity, which can contain, for example, air or a vacuum, to provide additional thermal insulation between panel 316 and heat sink 323. In the illustrated example, distal portion 321 and medial portion 320 together form a dome. However, housing 310 can have other shapes in other examples. A portion of panel 316 defines distal end 318 of housing 310 and massage head 300.

Housing 310 comprises a heat sink 323 enabling massage head 300 to bring panel 316 to a target temperature more efficiently. A portion of heat sink 323 defines medial portion 320 of housing 310, which is proximal of distal end 318. Heat sink 323 comprises fins 314. Fins 314 extend proximally from a platform 326 of heat sink 323, described below with regard to FIG. 3D. Each fin 314 comprises a radially outer edge, and the radially outer edges define a portion of an exterior of medial portion 320 of housing 310. Massage head 300 is configured to distribute a thermal load across fins 314 to be dissipated to ambient air. Medial portion 320 of housing 310 also comprises the fins 314. Panel 316 is separated from fins 314 by insulator 322 that reduces unintended heat transfer directly between panel 316 and fins 314, thereby enabling a larger temperature differential between panel 316 and fins 314.

In the illustrated example, an outlet portion 325 of housing 310 defined between two points along proximal-distal axis 311 consists only of portions of fins 314. Thus, distal portion 321 of housing 310 is supported relative to base 312 by fins 314. In particular, in some examples, fins 314 can be the only portion of housing 310 that extends from distal portion 321, which comprises panel 316, to base 312. In the illustrated example, proximal-distal axis 311 is coaxial with a fan axis 317, described further below. Outlet portion 325 is therefore also a portion of housing 310 defined between two points along fan axis 317. However, in other examples wherein proximal-distal axis 311 and fan axis 317 are not parallel, outlet portion 325 can be a portion of housing 310 defined between points along proximal-distal axis 311 without being defined between two points along fan axis 317 or outlet portion 325 can be a portion of housing defined between two points along fan axis 317 without being defined between two points along proximal-distal axis 311. In further examples, housing 310 can lack any such outlet portion 325 consisting only of portions of fins 314. Thus, housing 310 according to some other examples can comprise additional structures connecting distal portion 321 to base 312. However, by using fins 314 as structural members, housing 310 of the illustrated example achieves a large heat dissipation capacity at a relatively low weight.

Figure 3C:
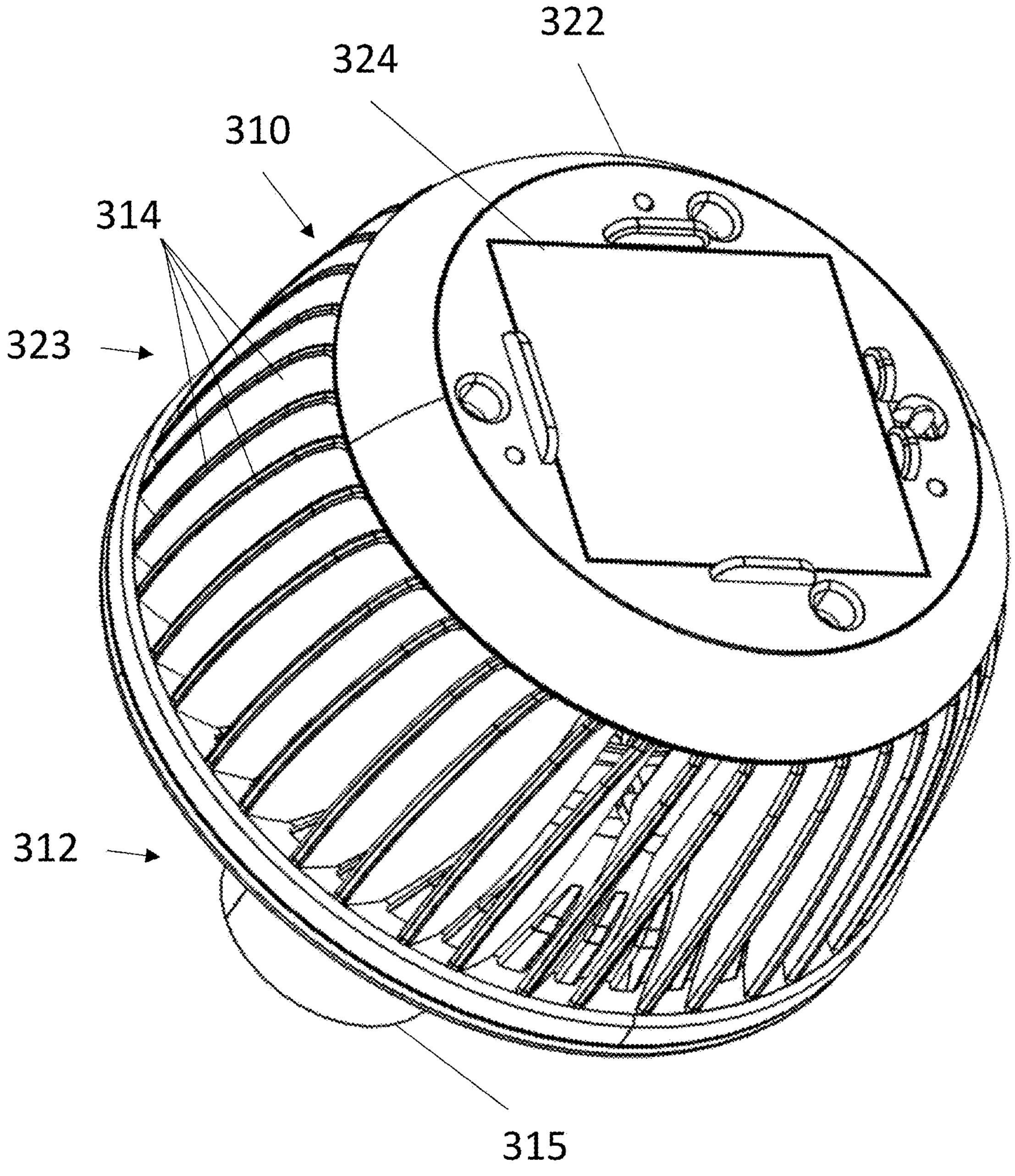
FIG. 3C is an oblique perspective view of the massage head of FIG. 3A in a partially disassembled state.

FIG. 3C illustrates massage head 300 without panel 316. As shown in FIG. 3C, massage head 300 comprises a heat pump 324. Heat pump 324 can be, for example, a Peltier module. Heat pump 324 can further be a Peltier module configured to pump heat from a distal side to a proximal side. Further, heat pump 324 can comprise a first side and a second side, and can be configured to transfer thermal energy from the first side to the second side. Thus, heat pump 324 can be configured to pump heat proximally from panel 316 to heat sink 323. In further examples, heat pump 324 can be any other type of heat pump configured to cool panel 316 and convey the thermal energy drawn from panel 316 to heat sink 323.

Heat pump 324 can be positioned within massage head 300 such that a distal side of heat pump 324 is in contact with a proximal side of panel 316. In further examples, a distal side of heat pump 324 can be thermally coupled to the proximal side of panel 316. As previously noted, thermally coupled as used herein can refer to direct contact or being placed in thermal communication by a thermally conductive medium. The position of insulator 322 around heat pump 324 and between panel 316 and heat sink 323 in the illustrated example limits heat transfer between panel 316 and heat sink 323 except through heat pump 324. Thus, when heat pump 324 pumps thermal energy from panel 316 to heat sink 323, insulator 322 limits conduction of thermal energy back from heat sink 323 to panel 316. Insulator 322 can therefore enable larger temperature differentials between panel 316 and heat sink 323 and contribute to efficient operation of massage head 300.

Figure 3D:
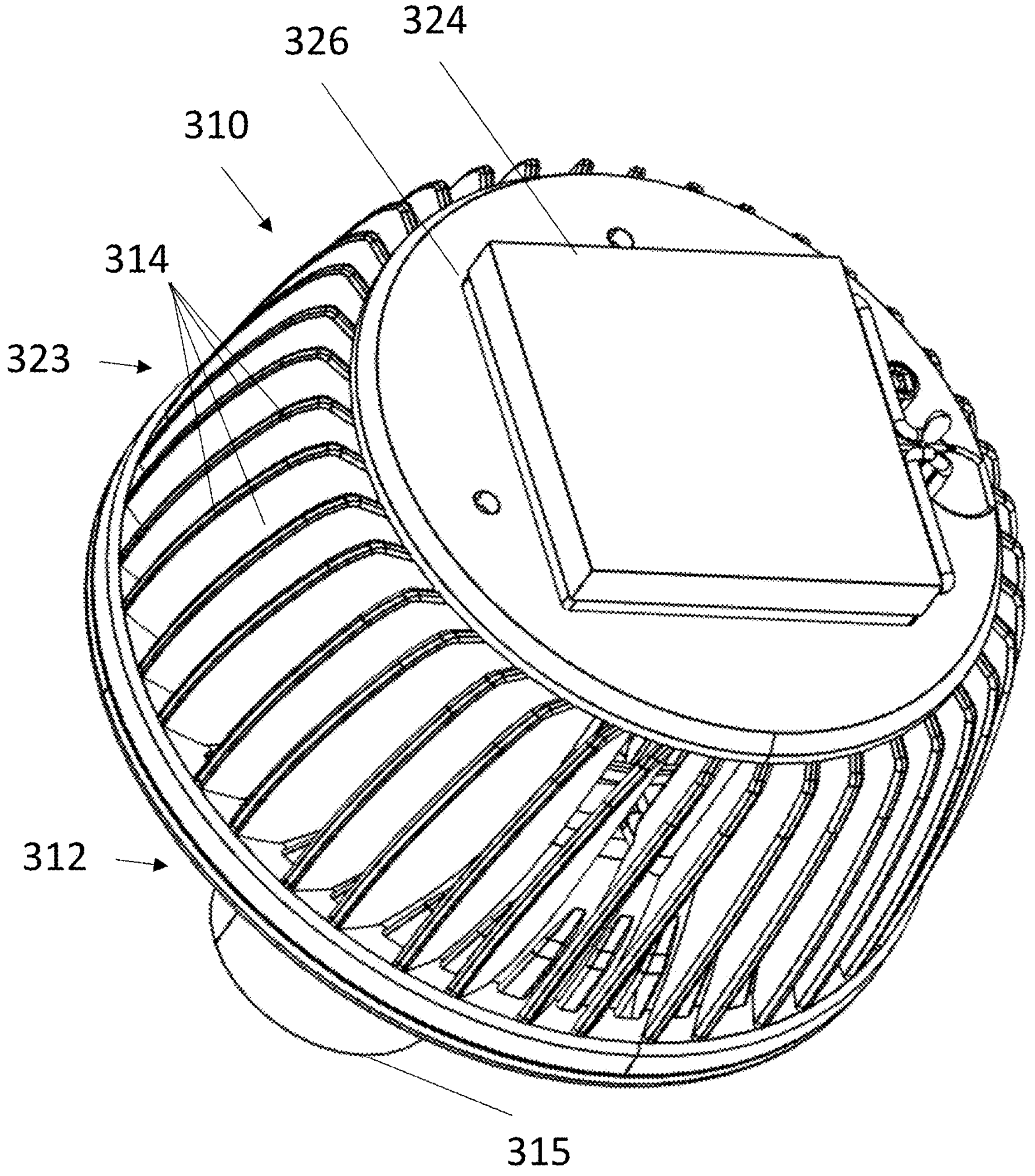
FIG. 3D is an oblique perspective view of the massage head of FIG. 3A in a further disassembled state.

FIG. 3D illustrates massage head 300 without panel 316 or insulator 322. As shown in FIG. 3D, heat sink 323 comprises a platform 326. Heat sink 323 can be positioned such that a proximal side of heat pump 324 is in contact with platform 326. In further examples, a proximal side of heat pump 324 can be thermally coupled to the distal side of platform 326.

Platform 326 is configured to conduct heat to fins 314. Thus, thermal energy pumped from the distal side of heat pump 324 to the proximal side of heat pump 324 is conducted through platform 326 to fins 314. Because the distal side of heat pump 324 is in contact with or thermally coupled to panel 316, heat pump 324 can therefore be used to pump thermal energy from panel 316 to fins 314 through platform 326. In the illustrated example, platform 326 is integrally formed with fins 314, and platform and fins 314 are both formed of a thermally conductive material. Thermally conductive materials for this purpose include, for example, metal, carbon fiber, and similarly conductive materials. In further examples, platform 326 can be separately formed from fins 314, but thermally coupled to fins 314.

Figure 3E:
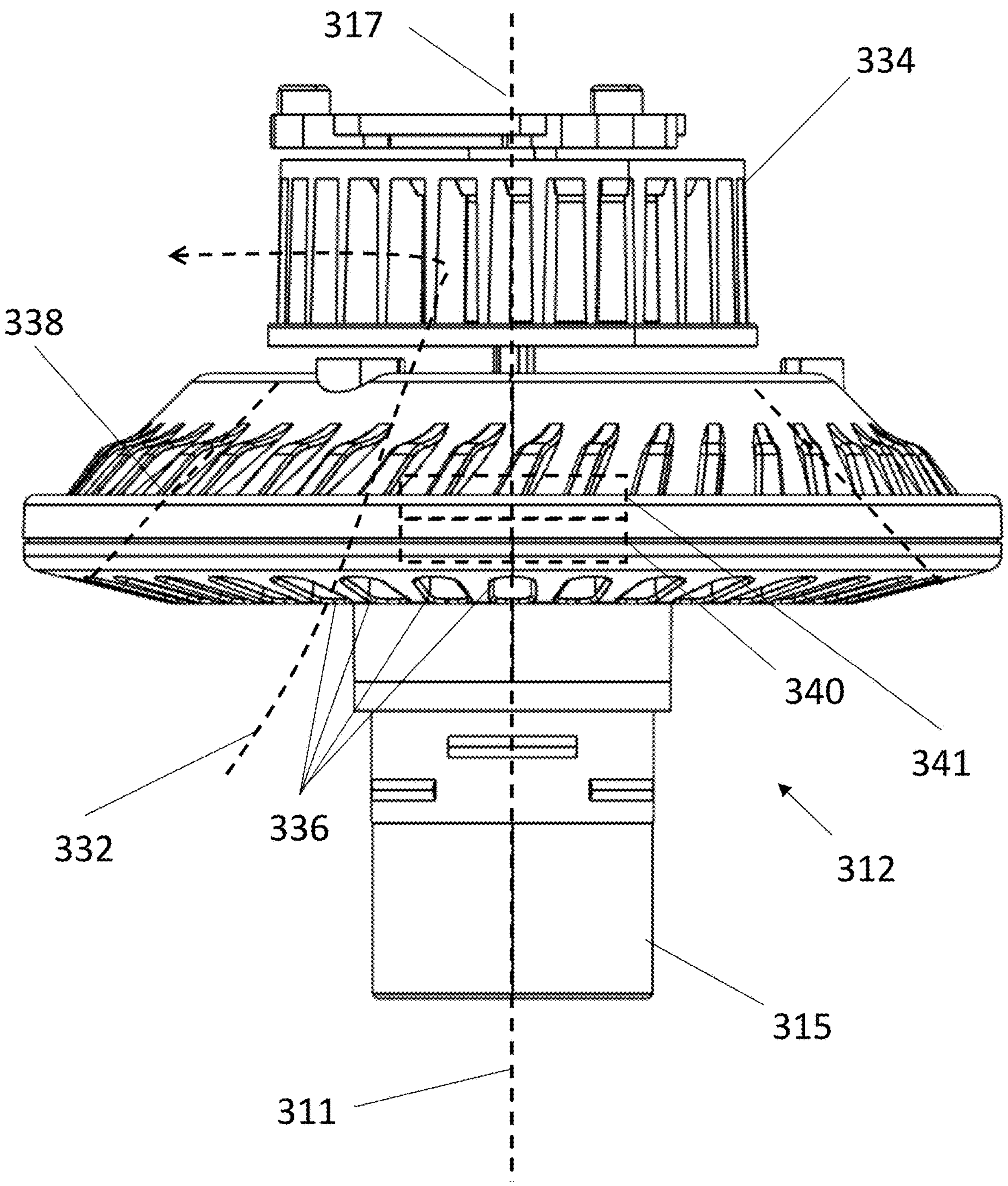
FIG. 3E is a side elevation view of the massage head of FIG. 3A in a still further disassembled state.
Figure 3F:
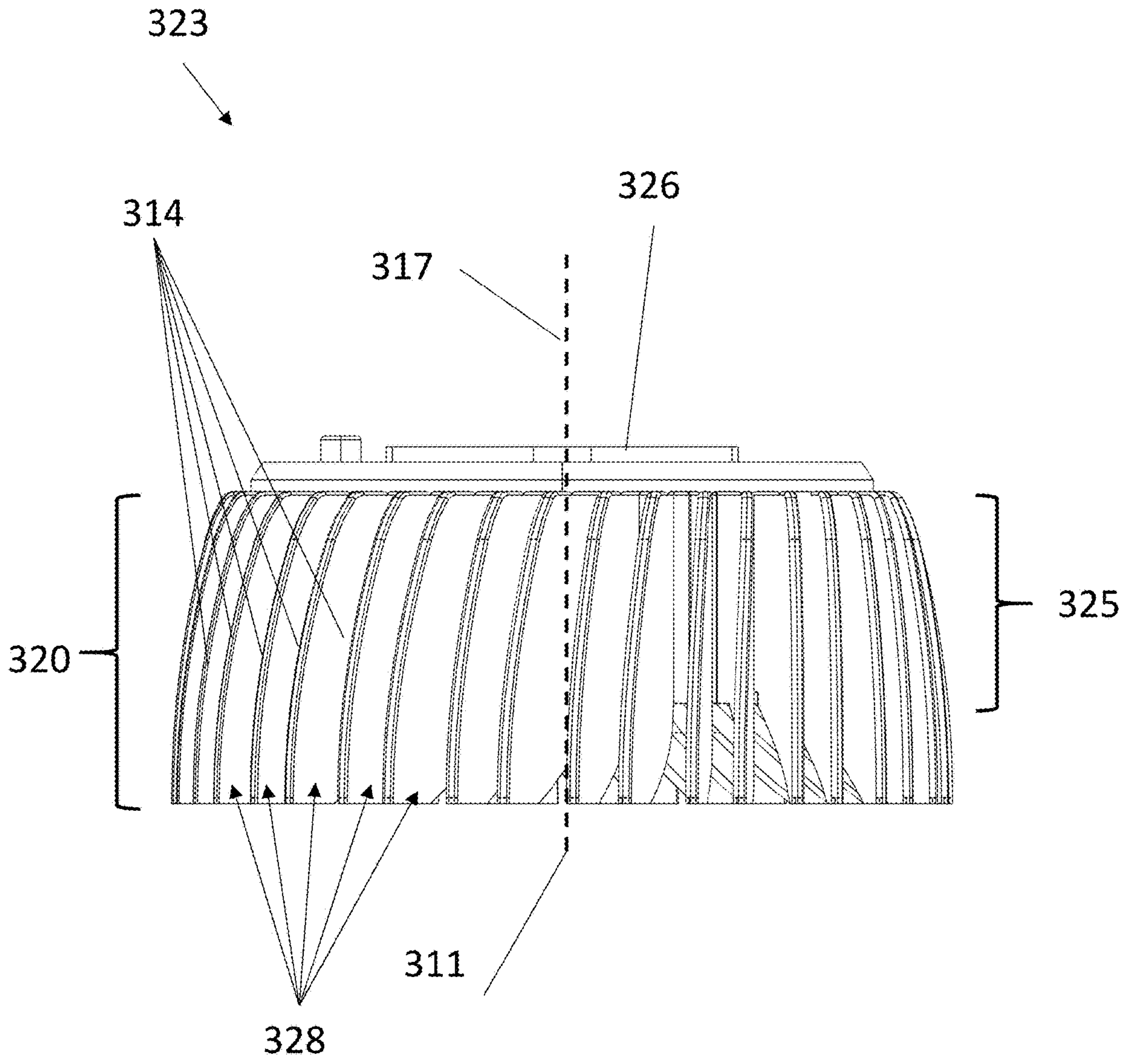
FIG. 3F is a side elevation view of a heat sink of the massage head of FIG. 3A.
Figure 3G:
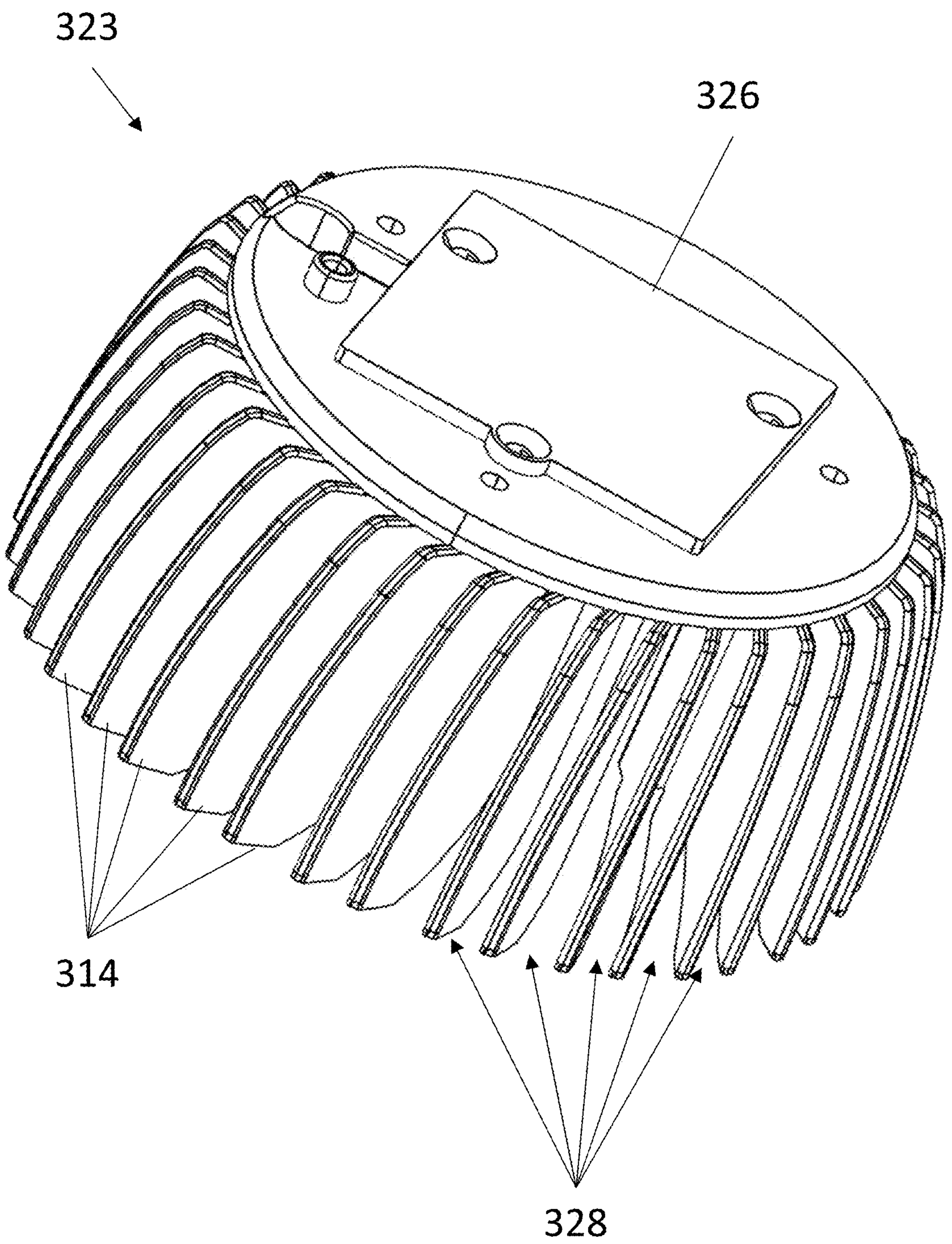
FIG. 3G is an oblique perspective view of the heat sink of FIG. 3F.

FIG. 3E illustrates base 312 and an impeller 334 of massage head 300. Massage head 300 further comprises a motor 341 configured to drive impeller 334 to rotate about a fan axis 317. Impeller 334 and motor 341 thus cooperate to form a fan within massage head 300. Accordingly, massage head 300 comprises a fan. The fan comprises a motor 341 disposed in housing 310. The fan further comprises an impeller 334 disposed in a cavity 330, described further below with regard to FIGS. 3H and 3I. Impeller 334 of the illustrated example is a centrifugal impeller 334, making the fan within massage head 300 a centrifugal fan configured to draw air in axially and expel air radially relative to fan axis 317. However, massage head 300 according to other examples can comprise fans of other types. Further, while fan axis 317 of the illustrated example is coaxial with proximal-distal axis 311, fan axis 317 of other examples can be transverse to proximal-distal axis.

An air flow path 332 according to the illustrated example enters massage head 300 through base 312 and exits massage head 300 through heat sink 323 as will be described further below. Base 312 comprises proximal vents 336 through which air flow path 332 enters massage head 300. Base 312 further comprises one or more inlet ducts 338 extending from proximal vents 336 into a cavity 330, which is defined by heat sink 323 and discussed further below with regard to FIGS. 3F-3I. Impeller 334 is disposed within cavity 330, so inlet duct 338 provides a portion of flow path 332 between proximal vents 336 and impeller 334. Thus, air flow path 332 extends axially from proximal vents 336 to impeller 334 through inlet duct 338. One portion of air flow path 332 is shown extending through one proximal vent 336 and leaving impeller 334 in one direction for clarity, but massage head 300 of the illustrated example is configured to draw air in through all proximal vents 336 and drive air from impeller 334 in all radial directions.

Motor 341 of the illustrated example is located in base 312. Massage head 300 of the illustrated example further comprises a controller 340. Controller 340 is also located in base 312. Controller 340 can be configured to govern motor 341, such as by activating motor 341, deactivating motor 341, and changing a speed of motor 341. Controller 340 can further be configured to govern heat pump 324, such as by activating heat pump 324, deactivating heat pump 324, changing a magnitude of a temperature differential created by heat pump 324, and, in some further examples, changing a direction of a temperature differential created by heat pump 324. Massage head 300 according to some examples can further comprise temperature sensors configured to measure a temperature of either side of heat pump 324, panel 316, or both. Controller 340 can receive measurements from the temperature sensors and be used to establish a feedback loop with heat pump 324 to achieve an intended temperature of panel. Though controller 340 and motor 341 of the illustrated example are both positioned in base 312, controller 340, motor 341, or both controller 340 and motor 341 can be located elsewhere in massage head 300 in other examples. In further examples, massage head 300 can lack a controller 340. In some examples, massage head 300 can receive power and control signals from a therapeutic device to which massage head 300 is connected through connector 315. In further examples wherein massage head 300 comprises controller 340, some or all of the power and control signals received through connector 315 can reach controller 340, which can relay power and signals to other elements of massage head 300.

FIGS. 3F-3I illustrate heat sink 323 is isolation. As shown, fins 314 surround a cavity 330. Thus, a perimeter of cavity 330 is defined by radially internal ends of fins 314 collectively. Moreover, heat sink 323 defines cavity surrounded by fins 314. Impeller 334, described above and illustrated in FIG. 3E, is disposed within cavity 330 when massage head 300 is fully assembled. In the illustrated example, cavity 330 is centered on proximal-distal axis 311 and fan axis 317 while fins 314 are arranged radially about cavity 330 relative to proximal-distal axis 311 and fan axis 317. However, in other examples, cavity 330 can be located elsewhere within massage head 300, such as at an off-axis location. In the illustrated example, proximal-distal axis 311 and fan axis 317 are coaxial, so the terms "axial," "radial," "circumferential," and the like, refer to directions relative to both proximal-distal axis 311 and fan axis 317 unless specified otherwise. However, in some other examples, proximal-distal axis 311 and fan axis 317 are not coaxial. In such other examples, features of massage head 300 described herein with respect to axial, radial, and circumferential directions may be so related to axial, radial, and circumferential directions defined relative to either proximal-distal axis 311 or fan axis 317 unless specified otherwise.

Figure 3H:
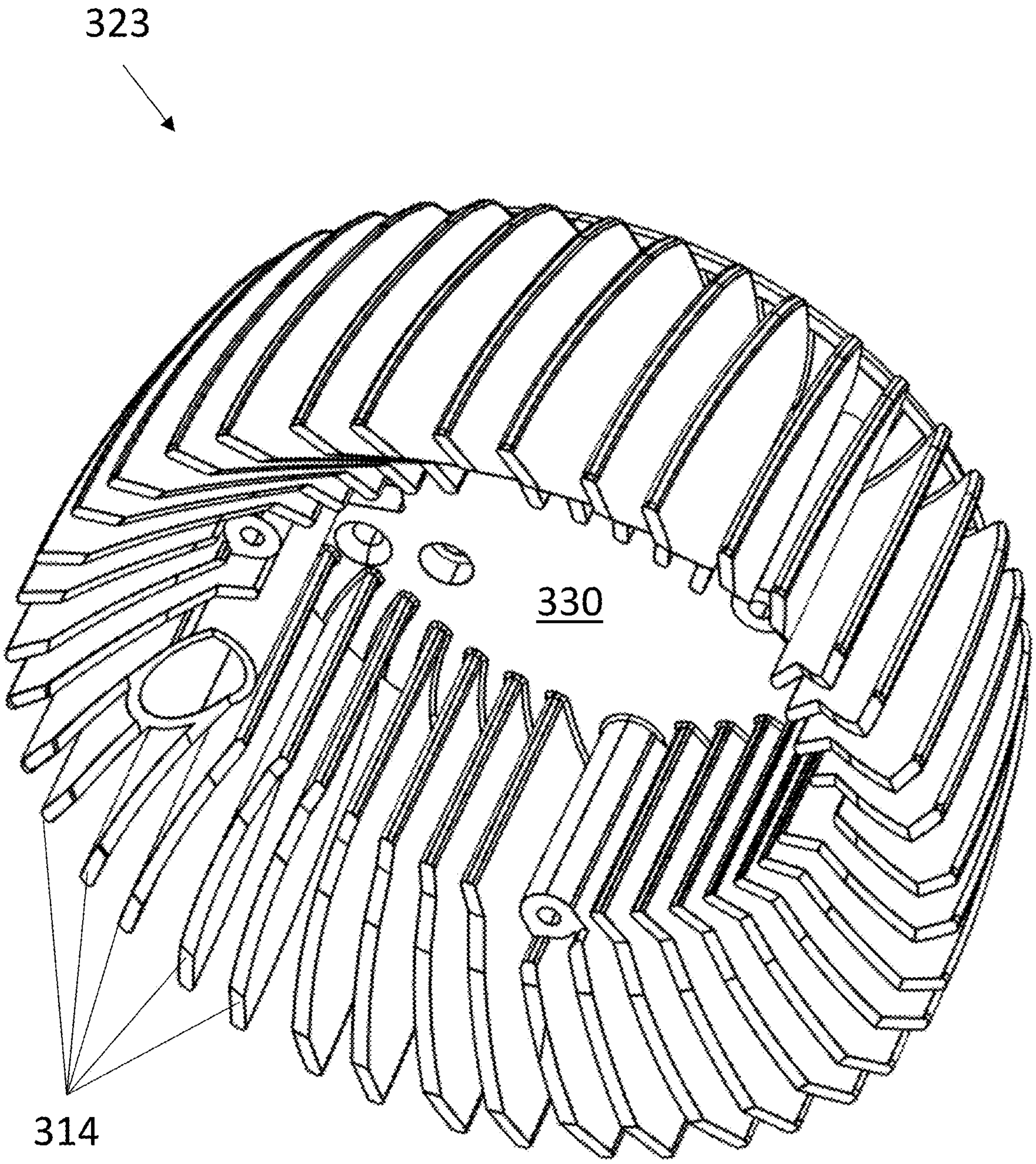
FIG. 3H is a second oblique perspective view of the heat sink of FIG. 3F.
Figure 3I:
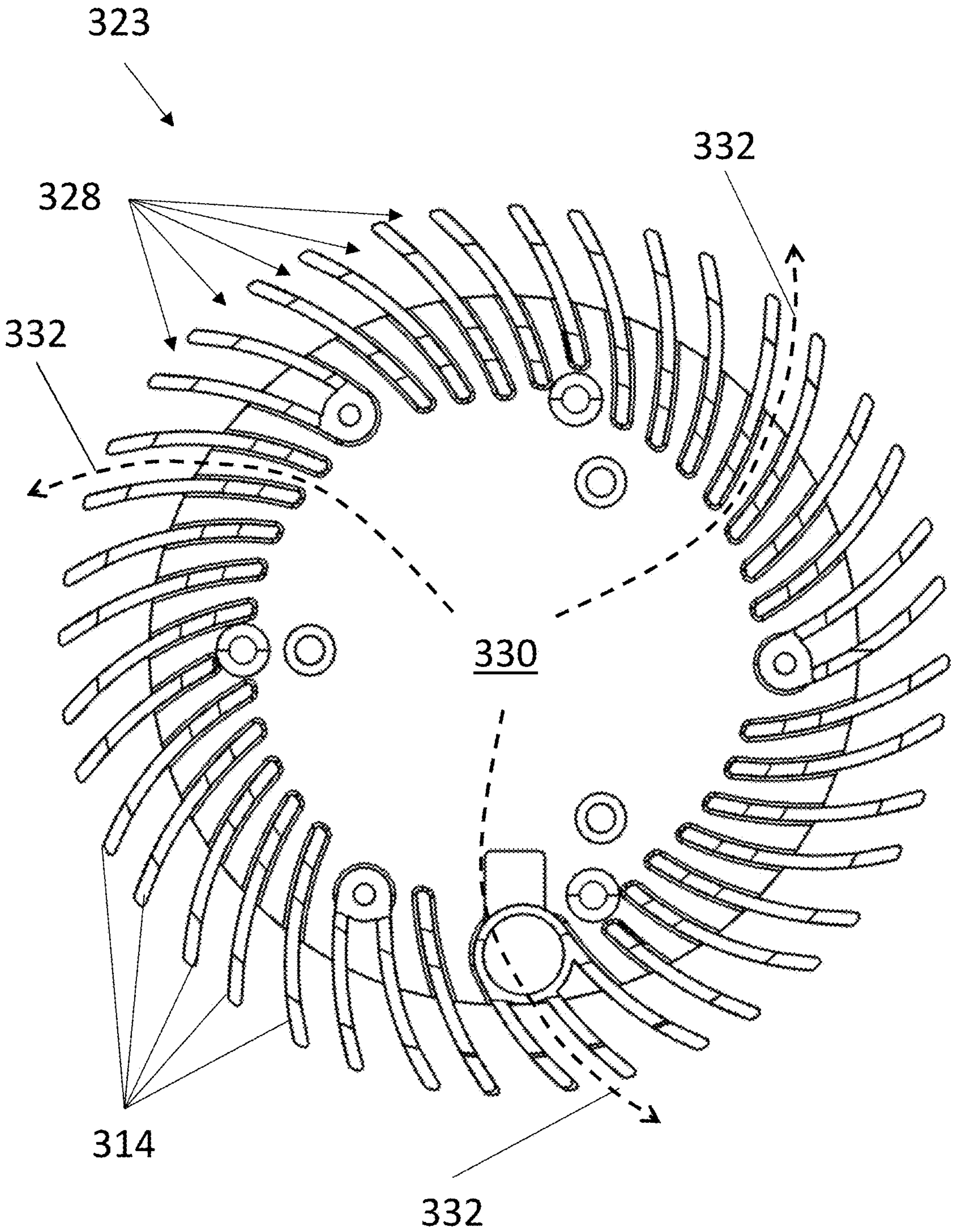
FIG. 3I is a bottom plan view of the heat sink of FIG. 3F.

Fins 314 define lateral vents 328 through which air can exit cavity 330 radially. Lateral vents 328 are defined by spaces between adjacent fins 314. In particular, a lateral vent 328 is defined between each adjacent pair of fins 314. Thus, fins 314 define portions of air flow paths 332 as shown in FIG. 3H along which air can exit cavity 330 radially through lateral vents 328. In the illustrated example, fins 314 do not extend strictly radially away from impeller axis 317. Instead, each fin 314 extends in a direction with both a radial and circumferential component relative to impeller axis 317. Thus, fins 314 redirect air driven radially away from impeller 334 to impart a circumferential component as the air exits housing 310 through lateral vents 328, as shown by the portions of flow paths 332 illustrated in FIG. 3I. This redirection is created as exiting air is impinged upon portions of fins 314 transverse to the exiting air's flow direction. The impingement increases heat transfer between fins 314 and the impinged air, thereby increasing convection from fins 314 to the air driven out of massage head 300. Thus, where heat pump 324 is configured to cool panel 316 and drive thermal load to heat sink 323, the illustrated arrangement of fins 314 to redirect air as the air exits housing 310 can increase convective cooling of heat sink 323 and thereby improve the efficiency of heat pump 324 in cooling panel 316.

Thus, massage head 300 of the illustrated example comprises lateral vents 328 defined by spaces between adjacent fins 314 and proximal vents 336 extending through base 312. Proximal vents 336 are discontinuous from lateral vents 328. Proximal vents 336 can be angularly aligned with lateral vents 328 about proximal-distal axis 311, though in other examples, proximal vents 336 can differ in quantity, spacing, and angular location from lateral vents 328.

Each fin 314 of the illustrated example also curves from extending in a direction with a relatively small circumferential component relative to impeller axis 317 at a radially inner end to a relatively large circumferential component relative to impeller axis 317 at a radially outer end. Lateral vents 328 are therefore also curved. As a result, air in each lateral vent 328 is continually redirected to have greater circumferential velocity relative to radial velocity as it exits housing 310. Thus, air continually impinges upon fins 314 as it exits housing 310, further contributing to efficient convection from heat sink 323 to the exiting air. The illustrated configuration of fins 314 therefore enables efficient convective heat transfer between heat sink 323 and air driven by impeller 334, contributing to efficient operation of heat pump 324. In some examples, the convective heat transfer can be convective cooling of heat sink 323. However, in other examples, fins 314 can be straight rather than curved. In some further examples, fins 314 can be straight and can extend relative to fan axis 317 in directions with both radial and circumferential components or in purely radial directions.

FIGS. 4A-4F show a massage head 400 according to another example. Massage head 400 can be a vibrating massage head. Massage head 400 comprises a massage end 410. A base 412 extends from massage end 410 proximally along a proximal-distal axis 411. Base 412 is configured to connect massage head 400 to a massage device. Accordingly, base 412 of some examples can be attachment connector 172 described above with regard to massage attachment 130.

Thus, massage head 400 can be an attachment comprised by a percussive therapy system, such as system 100 described above, that also comprises a percussive massage device, such as device 101. The percussive massage device of the percussive therapy system comprising massage head 400 can further comprise a motor and a reciprocation shaft configured to reciprocate along a reciprocation axis when the motor is active. Massage head 400 can be configured to generate vibration independently of the reciprocation of the reciprocation shaft. The percussive massage device can further comprise a controller, and the controller can optionally be configured to prevent activation of the motor when the massage head 400 is operatively connected to the distal end of reciprocation shaft. For example, massage head 400 can be configured to provide a type of vibration therapy that is more effective with prolonged contact between massage head 400 and the treated tissue, so the controller of the percussive massage device 101 can be configured to detect when massage head 400 is connected to mount 146 and to deactivate the motor when connection of massage head 400 to mount 146 is detected. In further examples, the therapeutic system can further comprise other therapeutic modules or massage heads, such as heating massage head 200 or cooling massage head 300 described above, or both, that are also configured to be selectively attachable to the distal end of the reciprocation shaft. The controller can be configured to permit activation of the motor when certain other massage heads, such as heating massage head 200, are connected to the distal end of the reciprocation shaft. Accordingly, heating massage head 200, cooling massage heat 300, and vibrating massage head 400 can each be provided as replaceable attachments in a kit that further comprises percussive massage device 101.

Figure 4A:
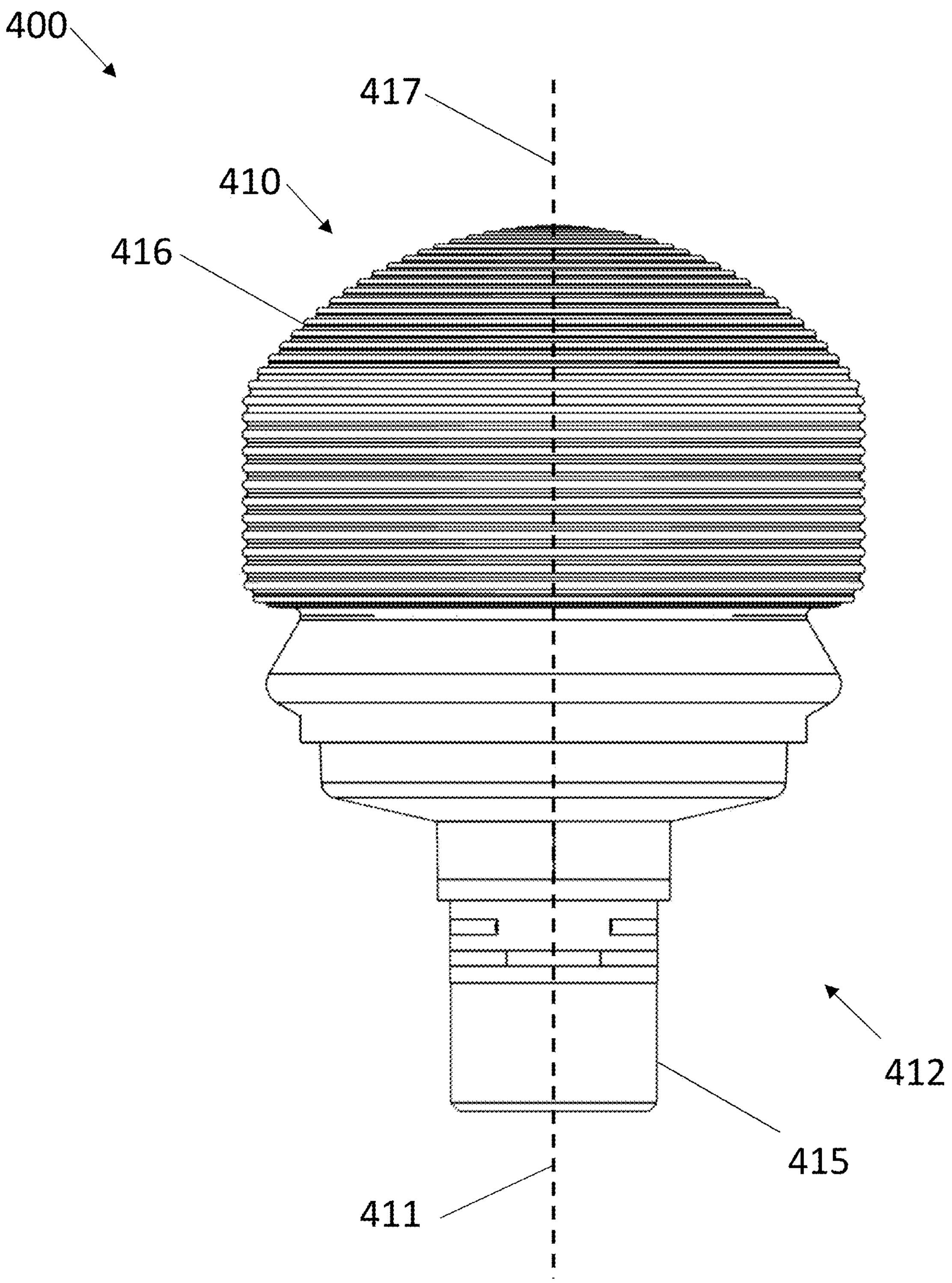
FIG. 4A is a side elevation view of a massage head according to further aspects of the present disclosure.
Figure 4B:
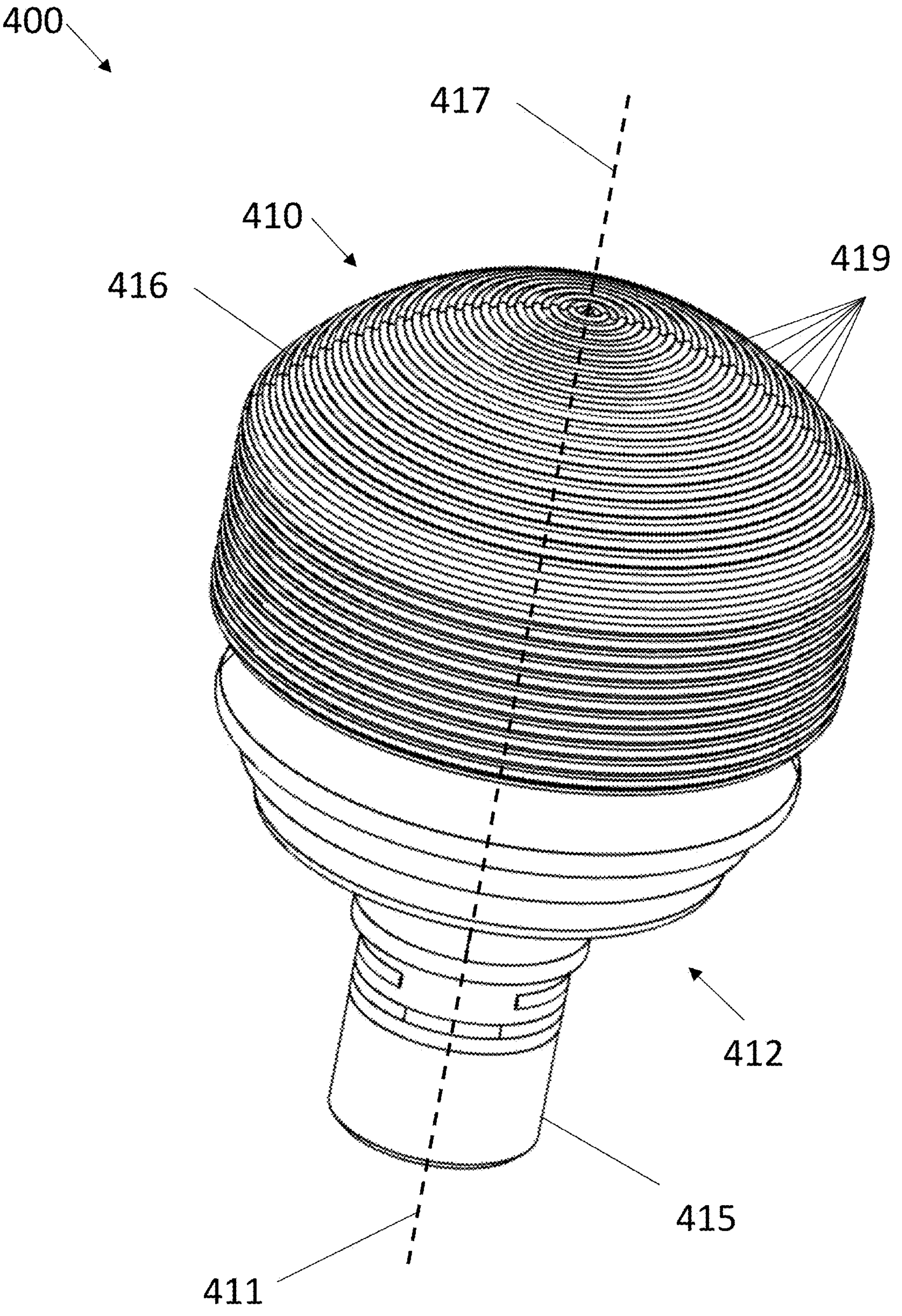
FIG. 4B is an oblique perspective view of the massage head of FIG. 4A.

As shown in FIGS. 4A and 4B, massage end 410 comprises a cover 416. An exterior surface of cover 416 can be provided with a texture to enhance a therapeutic effect of the vibration of massage head 400 upon tissue. In the illustrated example, the texture is provided by ridges 419 arranged on the exterior of cover 416. Ridges 419 can engage a surface of the treated tissue, such as skin, and thereby increase an effective coefficient of friction between the surface of the treated tissue and massage head 400. By increasing the effective coefficient of friction between the surface of the treated tissue and massage head 400, the texture of cover 416 can increase an extent to which the surface of the treated tissue moves with massage head 400 as massage head 400 vibrates. By causing the surface of the treated tissue to move, massage head 400 according to some examples can provide therapeutic effects to the treated tissue, such as relieving tension or promoting blood flow. Ridges 419 of the illustrated example are arranged in concentric rings about vibration axis 417, which can contribute to effective engagement of the surface of the tissue being treated as the vibration of massage head 400 causes massage head 400 to move in any direction transverse to vibration axis 417. In further examples, the texture of the exterior of cover 416 can be provided by any other features, such as ribs in arrangements other than concentric rings about vibration axis 417, bumps, nodules, or any other feature capable of enhancing a therapeutic effect of massage head 400 as massage head 400 vibrates upon tissue.

Figure 4C:
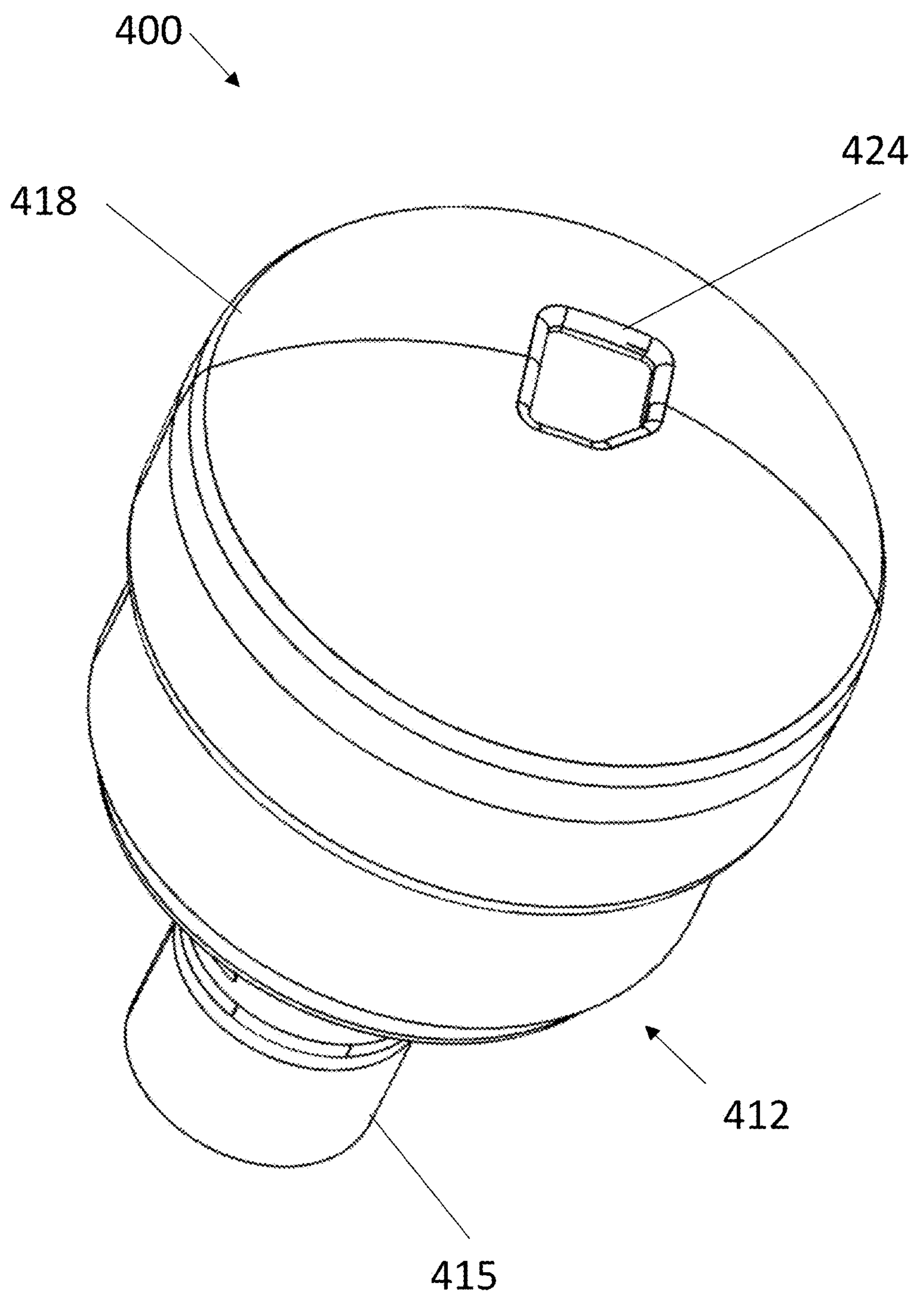
FIG. 4C is an oblique perspective view of the massage head of FIG. 4A in a partially disassembled state.

As further shown in FIG. 4C, massage head further comprises a case 418 under cover 416. When massage head 400 is assembled as shown in FIGS. 4A and 4B, cover 416 can be disposed over case 418. Cover 416 can be made of a more flexible material than case 418. For example, cover 416 can be made of foam, flexible plastic, rubber, or fabric. Case 418 can be made of, for example, metal or rigid plastic. Thus, cover 416 can be a flexible cover for case 418, and case 418 can be a rigid housing for the elements enclosed within case 418 and described below with regard to FIG. 4D. By acting as a rigid housing, case 418 can prevent external interference with the moving elements enclosed therein.

Figure 4D:
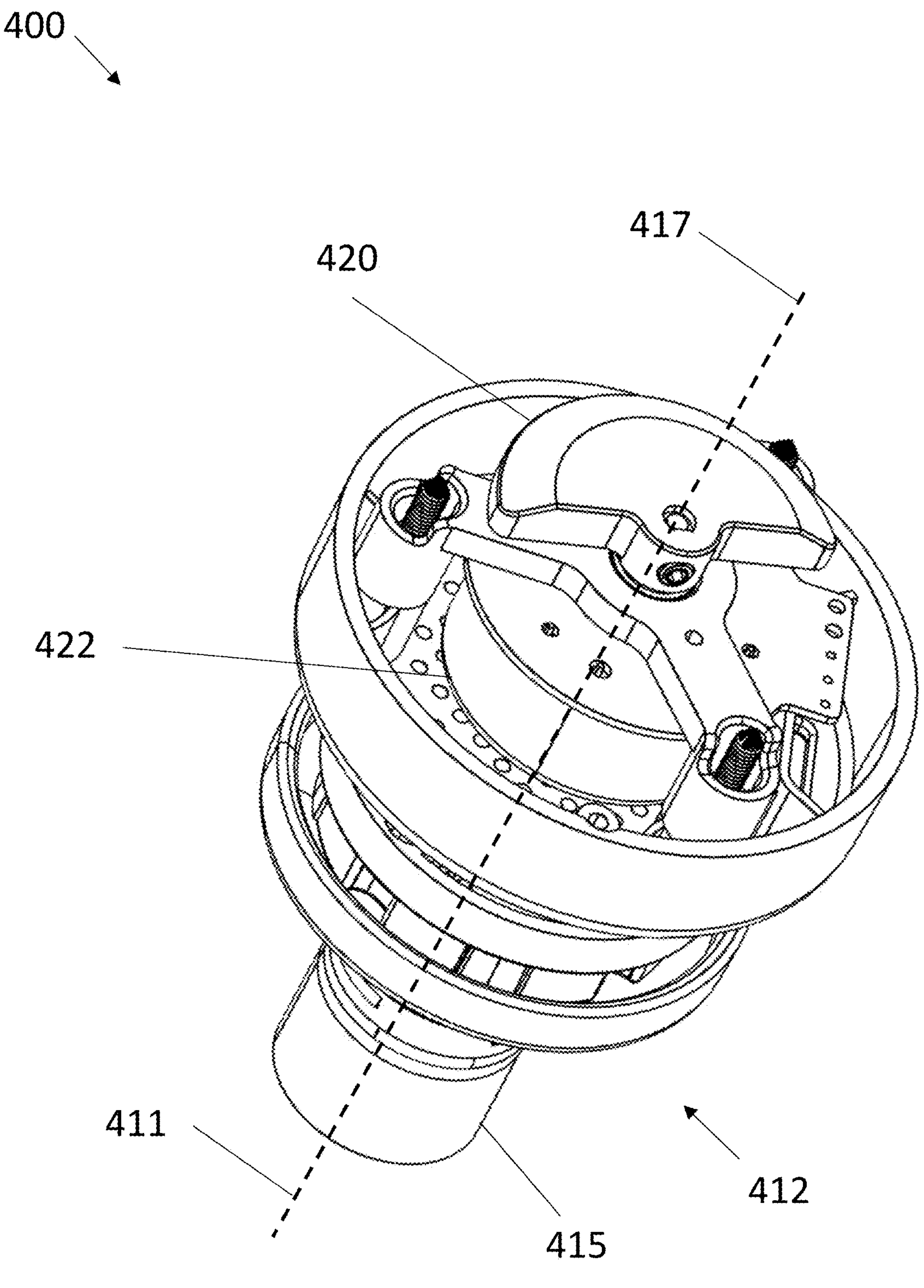
FIG. 4D is an oblique perspective view of the massage head of FIG. 4A in a further disassembled state

As shown in FIG. 4D, massage head 400 further comprises a motor 422 and a weight 420 coupled to motor 422. Motor 422 and weight 420 are enclosed within case 418. Motor 422 is configured to cause weight 420 to rotate eccentrically about vibration axis 417 to cause massage head 400 to vibrate. Where massage head 400 is comprised by a percussive therapy system that also comprises a percussive massage device, the motor of the percussive massage device can be a first motor of the system and motor 422 can be a second motor of the system. Further, where massage head 400 is comprised by a percussive therapy system, vibration axis 417 can optionally be parallel to the reciprocation axis of the percussive therapy system. In further examples, vibration axis 417 can optionally be coaxial with the reciprocation axis of the percussive therapy system. Motor 422 of the illustrated example is located in massage end 410, though in other examples motor 422 can be located elsewhere within massage head 400, such as in base 412. Case 418 provides a housing for motor 422 to prevent external interference with movement of motor 422 and weight 420 when motor 422 is active. Vibration axis 417 is coaxial with proximal-distal axis 411 in the illustrated example, but in other examples, vibration axis 417 can be spaced from proximal-distal axis 411, transverse to proximal-distal axis 411, or both.

Figure 4E:
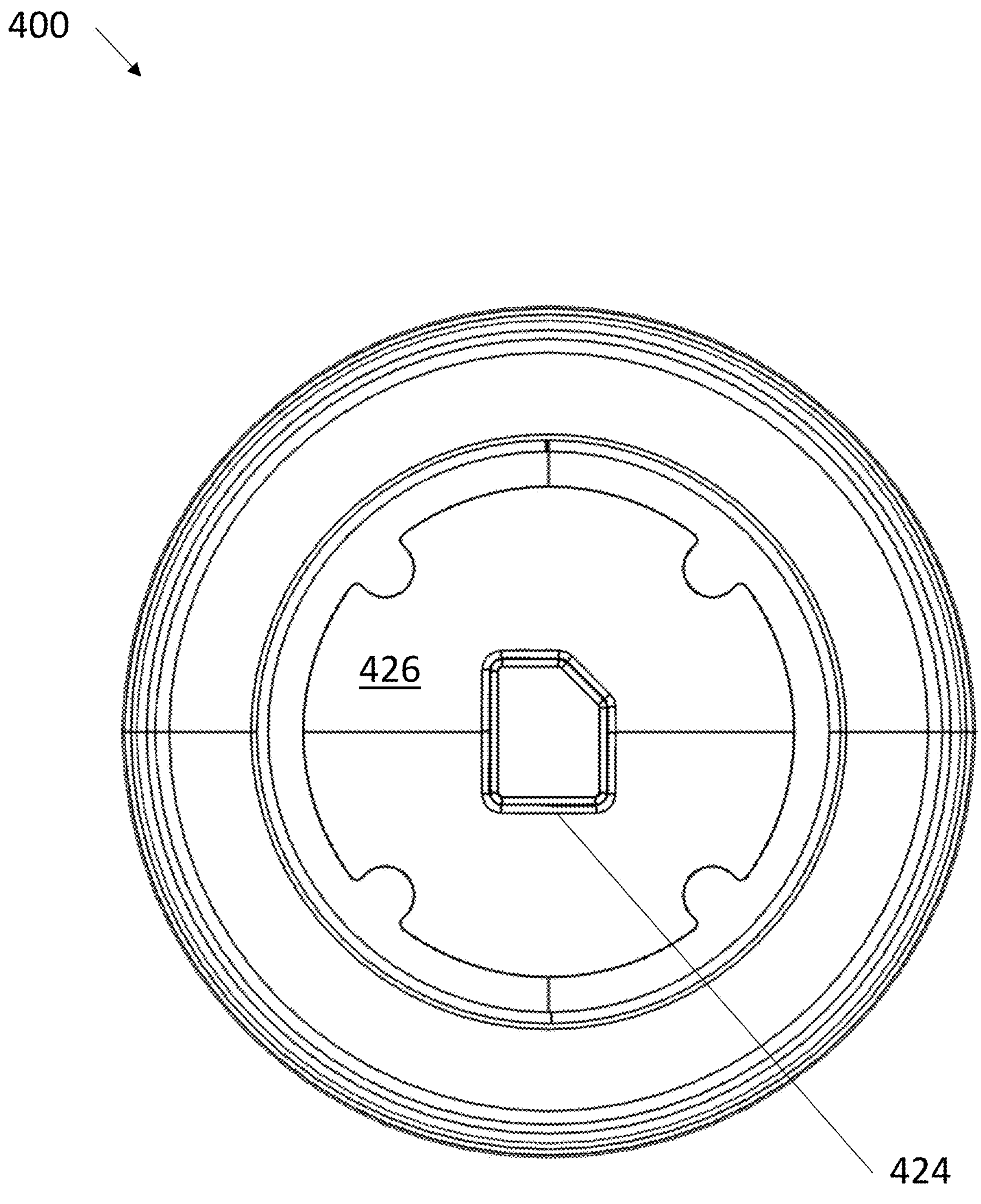
FIG. 4E is a bottom plan view of a cover of the massage head of FIG. 4A.

Turning to FIGS. 4C and 4E, case 418 comprises first orienting features on an exterior surface of case 418, and cover 416 comprises complementary second orienting features facing an interior of cover 416. In the illustrated example, the first orienting features are provided by a depression 424 in the exterior surface of case 418 and the second orienting features are provided by an inward facing boss 426 of the same shape as the depression. Because the respective orienting features 424, 426 of case 418 and cover 416 are complementary in shape, they can be used to guide cover 416 to an intended placement on case 418 wherein the orienting features 424, 426 become nested. Further, the orienting features 424, 426 inhibit movement of cover 416 relative to case 418 and can therefore cause cover 416 to vibrate along with case 418 even when external resistance is applied, such as by a surface of tissue being treated. Depression 424 and boss 426 are asymmetric, so they can only fit together in one orientation. Thus, the orienting features 424, 426 can be asymmetric, as in the illustrated example, and thereby define only one orientation of cover 416 upon case 418 wherein the orienting features 424, 426 nest together. However, in other examples, the cover 416 and case 418 can comprise different orienting features. In further examples, the cover 416 can have a concave orienting feature such as a depression while the case 418 can have a convex orienting feature such as a boss. In further examples, the orienting features can be symmetrical and allow cover 416 to fit on case 418 in multiple orientations.

Figure 4F:
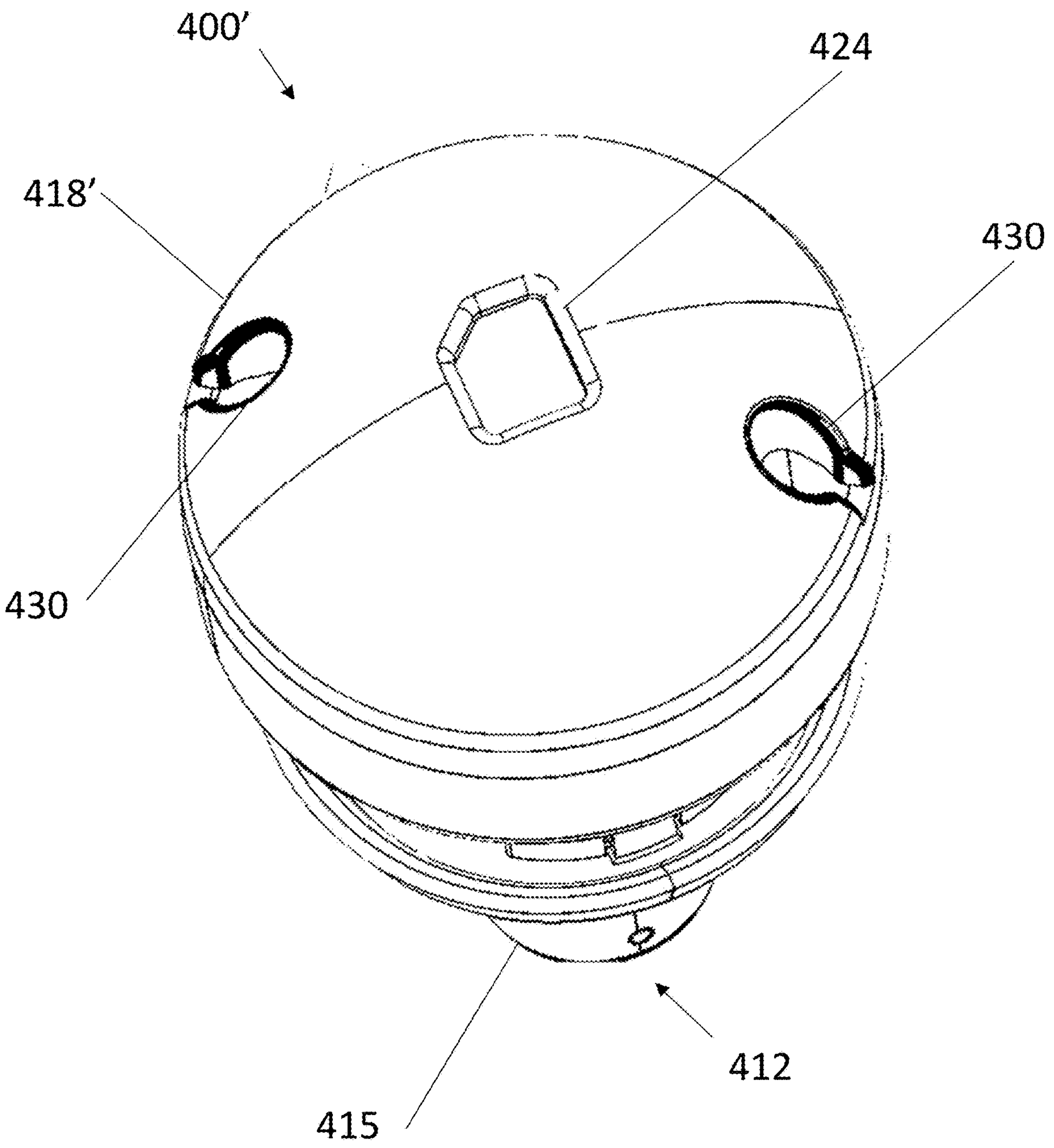
FIG. 4F is an oblique perspective view of another configuration of a massage head of the type shown in FIG. 4A.

FIG. 4F shows a case 418' of a massage head 400' according to another example. Case 418' comprises third orienting features in the form of guide holes 430. A cover can be provided with fourth orienting features in the form of interior guide posts complementary to guide holes 430 for use with case 418'. In the example illustrated in FIG. 4F, guide holes 430 and the guide posts are used in conjunction with a depression 424 and a complementary boss on the cover, meaning the massage head 400' comprises first, second, third, and fourth orienting features. In further examples, guide holes 430 and corresponding guide posts can be used without the depression 424 and corresponding boss.

Figure 5A:
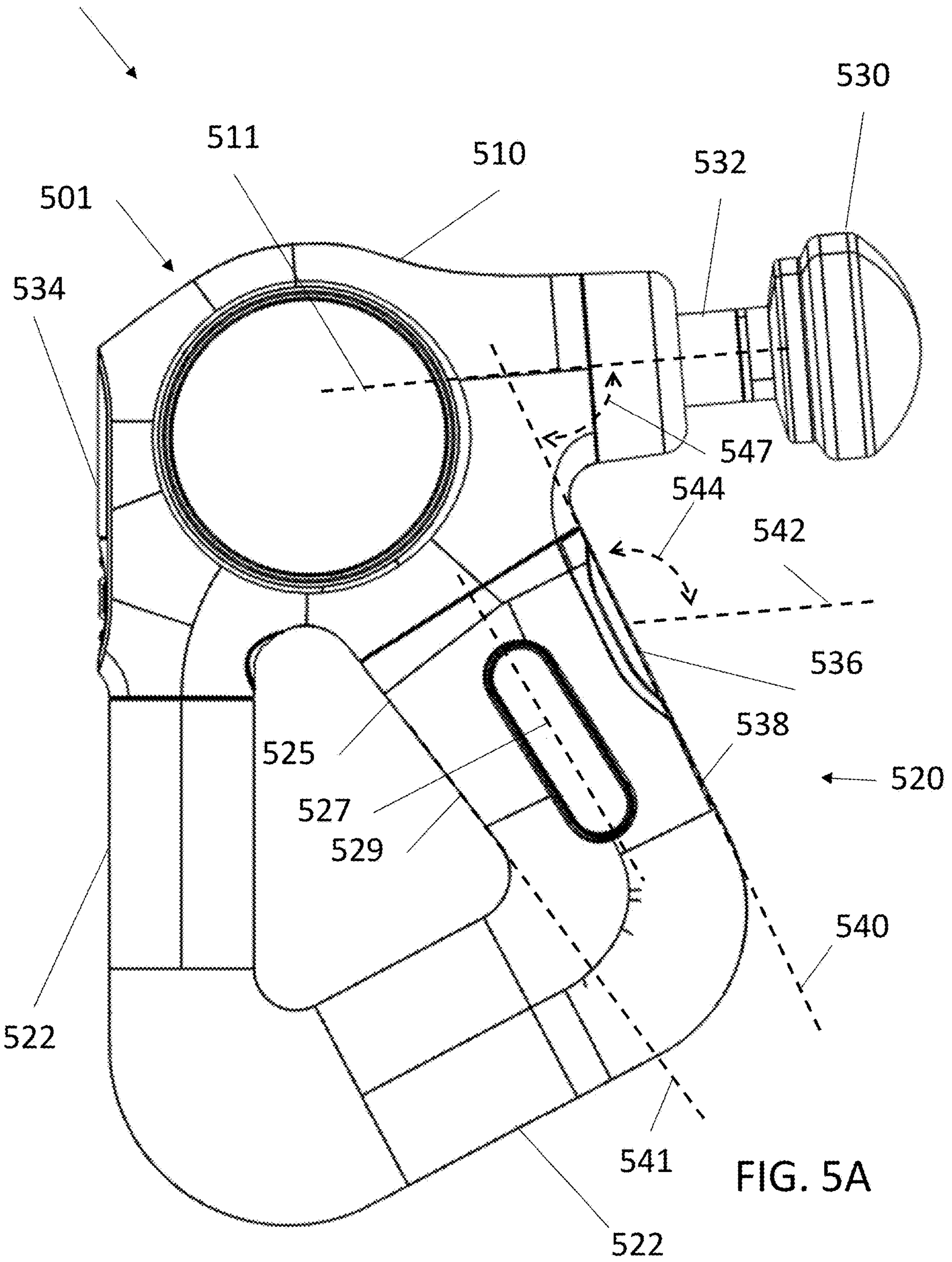
FIG. 5A is a side plan view of a therapeutic system according to further aspects of the present disclosure.

FIG. 5A illustrates a therapeutic system 500 comprising a percussive massage device 501 and a massage head 530. Therapeutic system 500 can, in some examples, be the same as therapeutic system 100 described above. Accordingly, percussive massage device 501 and massage head 530 can be the same as percussive massage device 101 and massage attachment 130, respectively, described above. Thus, the features described herein with regard to therapeutic system 500 can also be true of some implementations of the therapeutic system 100 of FIGS. 1A-1L. Similarly, the features described above with regard to therapeutic system 100 can also be true of some implementations therapeutic system 500 of FIGS. 5A-5E. However, therapeutic systems 100, 500 need not be the same, and features described with regard to either system 100, 500 can be implemented independently of one another.

Massage head 530 is mounted to a distal end of a shaft 532 comprised by percussive massage device 501. Percussive massage device 501 comprises a head portion 510, from which shaft 532 extends. Percussive massage device 501 further comprises a handle 520 that also extends from head portion 510. Handle 520 of the illustrated example comprises three handle portions 522 in a co-planar, triangular arrangement, though in other examples other types of handles may be used. In further examples, handle 520 can have any shape enabling a user to grasp device 501 and use device 501 to apply percussive massage with massage attachment 530.

Shaft 532 is configured to reciprocate linearly along a reciprocation axis 511 when a motor of massage device 501 is active. Thus, when the motor is active, device 501 may be used for percussive massage by applying massage head 530 to tissue while shaft 532 reciprocates. Percussive massage device 501 further comprises a control panel 534 comprising a switch configured to activate the motor that drives shaft 532. Control panel 534 of the illustrated example is positioned on a proximally facing side of head portion 510, though in further examples, control panel 534 can be positioned anywhere accessible by a user. In some embodiments, control panel 534 may comprise one or more buttons and a user interface that allows the user to power on/off the percussive massage device 501 and operate the therapeutic massage attachments, along with the various functions of the percussive massage device 501. In still further examples, percussive massage device 501 can be operable by remote control, such as, for example, through a smart device, and can lack a control panel 534. Control panel 534 can be used to control the infrared therapy functions described below.

Figure 5B:
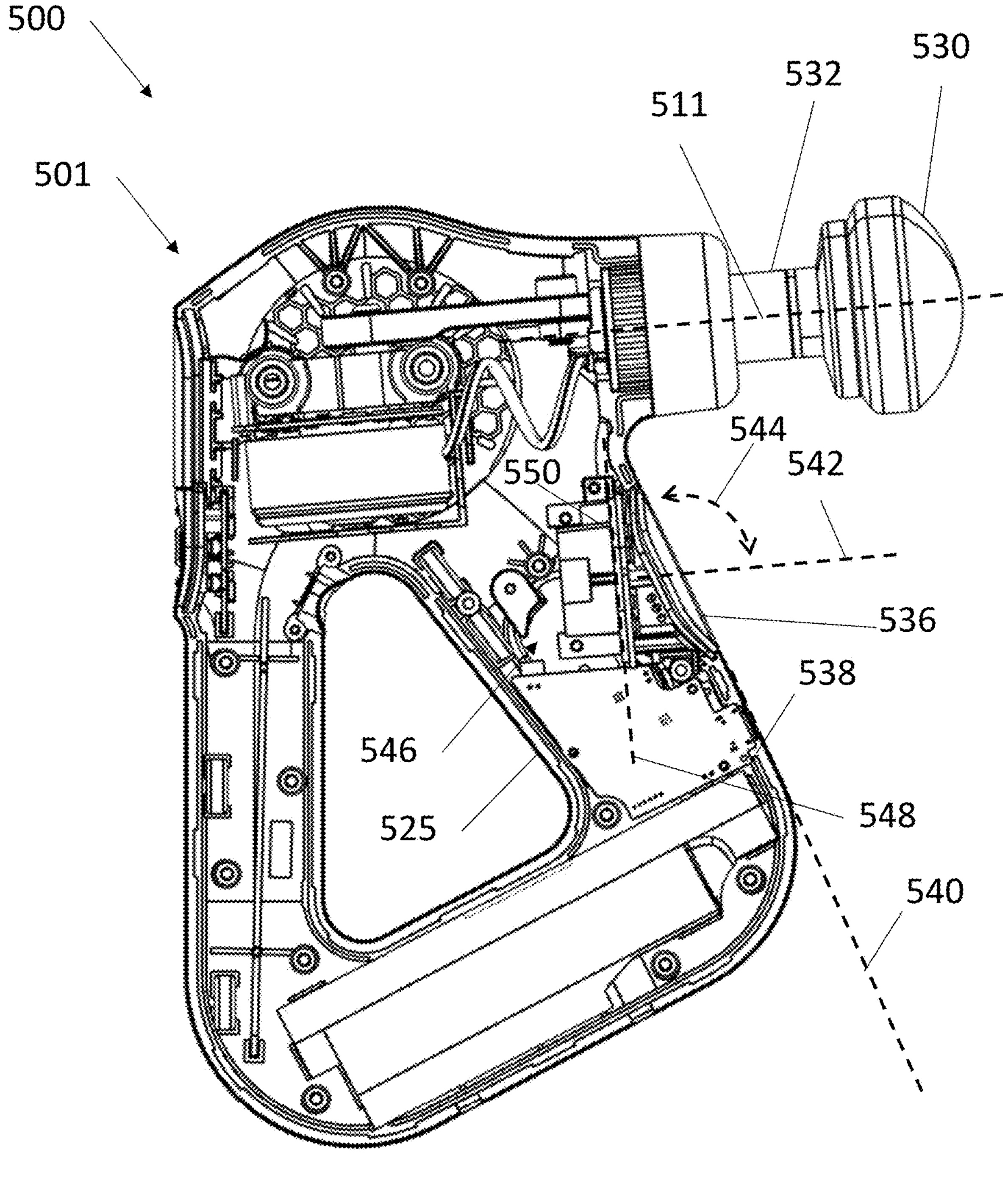
FIG. 5B is a side plan view of the therapeutic system of FIG. 5A in a partially disassembled state.

Turning to FIG. 5B, with continued reference to FIG. 5A, device 501 comprises an infrared module 546, shown in FIG. 5B. Infrared module 546 is configured to emit infrared radiation from device 501 in a generally distal direction. Infrared module 546 directs infrared radiation out of device 501 through a window 536. Window 536 of the illustrated example is a panel of material permeable by infrared radiation, such as, for example, glass, clear plastic, or another similarly permeable material. In further examples, window 536 can be one or more openings defined through a housing of device 501. In the illustrated example, infrared module 546 is configured to direct emitted infrared radiation to intersect reciprocation axis 511 at a location slightly distal of a distal-most position reachable by massage head 530 in massage head's 530 reciprocation pattern. Infrared module 546 is thus configured to direct infrared radiation to reach a portion of treated tissue immediately adjacent a point on the treated tissue contacted by massage head 530 when massage head 530 is used for percussive massage. Portions of the treated tissue can therefore be affected by both the percussive massage and the infrared radiation, enabling simultaneous application of percussive massage and infrared therapy. Infrared module 546 can therefore augment percussive massage with complementary effects associated with infrared therapy, such as reduced inflammation, reduced pain, and improved blood flow.

In particular, infrared module 546 of the illustrated example is configured to direct infrared radiation along an infrared axis 542. Infrared axis 542 refers to an axis parallel to which more infrared radiation is directed than in any other direction. Infrared axis 542 can intersect reciprocation axis 511. In the illustrated example, infrared axis 542 intersects reciprocation axis 511 at a location distal of a distal-most location reached by massage head 530 in a reciprocation pattern of massage head 530. However, in other examples, infrared axis 542 can intersect reciprocation axis 511 at another location, such as at a location along reciprocation axis 511 through which massage head 530 passes during a reciprocation pattern of massage head 530.

Device 501 also comprises an extension 525 that extends along an extension axis 527. Extension axis 527 is an axis that comes nearest to extending through the center of area of every cross-section along the length of extension 525. In some other examples, extension 525 may not define an extension axis 527.

In the illustrated example, extension axis 527 intersects reciprocation axis 511. Extension 525 of the illustrated example is a handle portion 522, though in other examples extension 525 can be a portion of device 501 outside of handle 520. Infrared module 546 and window 536 are both located in extension 525. Thus, in the illustrated example, infrared axis 542 intersects extension axis 527 in addition to reciprocation axis 511. Thus, in the illustrated example, infrared axis 542, extension axis 527, and reciprocation axis 511 define a triangle. However, in some other examples, extension axis 527 may not intersect either or both of infrared axis 542 and reciprocation axis 511.

Returning to FIG. 5A, window 536 of the illustrated example is located on a distal straight edge 538 of extension 525. Edge 538 defines an edge axis 540 that extends along edge 538 and intersects both infrared axis 542 and reciprocation axis 511. Thus, reciprocation axis 511, edge axis 540, and infrared axis 542 also define a triangle. The triangle defined by reciprocation axis 511, edge axis 540, and infrared axis 542 includes a first internal angle 544 at the intersection of edge axis 540 and infrared axis 542. Internal angle 544 of the illustrated example is an obtuse angle. First internal angle 544 being an obtuse angle enables a placement of window 536 and infrared module 546 at a location relatively near to reciprocation axis 511 and an intersection between reciprocation axis 511 and infrared axis 542 at a relatively distal location while a second internal angle 547 defined between reciprocation axis 511 and edge axis 540 remains relatively small. Thus, first internal angle 544 can contribute to infrared radiation from infrared module 546 reaching treated tissue near a point contacted by massage head 530 with elevated intensity and density in proportion to the amount of radiation emitted while extension 525 has an ergonomically desirable shape. Further, in the illustrated example, infrared axis 542 intersects edge 538 with a non-zero angle of incidence.

Extension 525 of the illustrated example further comprises a proximal straight edge 529. Thus, in the illustrated example, edge axis 540 is a first edge axis while proximal straight edge 529 extends along a second edge axis 541. Distal edge 528 and proximal edge 529 converge toward one another with increasing distance from reciprocation axis 511 such that first edge axis 540 and second edge axis 541 intersect on an opposite side of extension 525 from reciprocation axis 511. Extension 525 thus tapers to become narrower at an end further from window 536. Extension 525 of the illustrated example is therefore convenient to grasp without the user's hand covering window 536. However, in some further examples, distal edge 538 and proximal edge 539 may not converge with increasing distance from reciprocation axis 511. In still further examples, extension 525 can lack either or both of a straight distal edge 538 and a straight proximal edge 539. With regard to FIGS. 5A-5E, distal refers to a direction along reciprocation axis 511 toward massage head 530, while proximal is an opposite direction along reciprocation axis 511. Thus, control panel 534 faces generally proximally. Reciprocation axis 511 can therefore also be a proximal-distal axis.

Figure 5C:
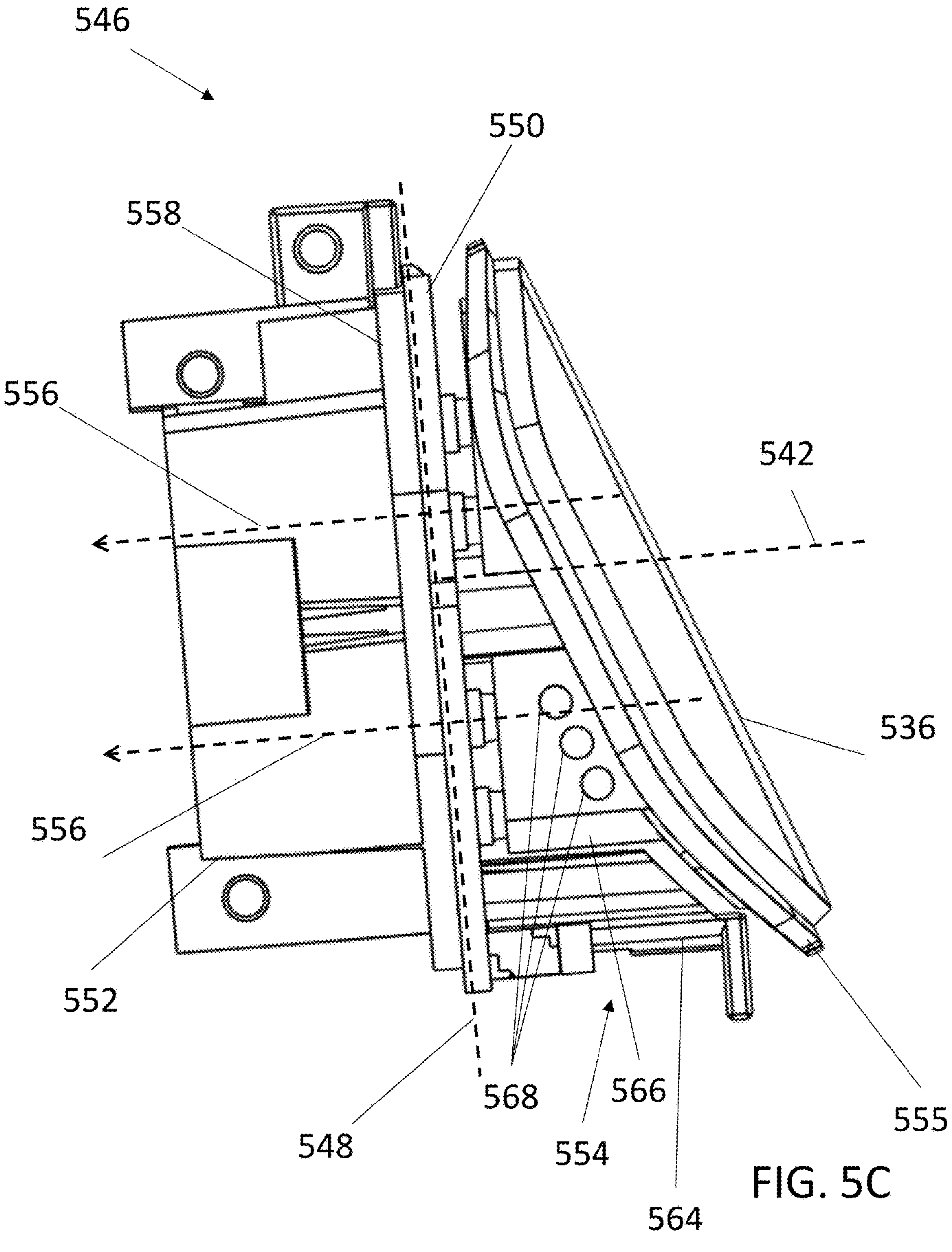
FIG. 5C is a side elevation view of an infrared module of the therapeutic device of FIG. 5A.

Referring to FIGS. 5B and 5C, infrared module 546 comprises a board 550 supporting one or more infrared radiation emitters. Board 550 of the illustrated example supports the infrared radiation emitters in a planar arrangement defining an emitter plane 548, wherein infrared axis 542 is normal to emitter plane 548. Board 550 of the illustrated example is further arranged to define emitter plane 548 such that edge axis 540 intersects emitter plane 548 between window 536 and reciprocation axis 511. In further examples, board 550 can support the one or more infrared emitters in other than a planar arrangement.

Figure 5D:
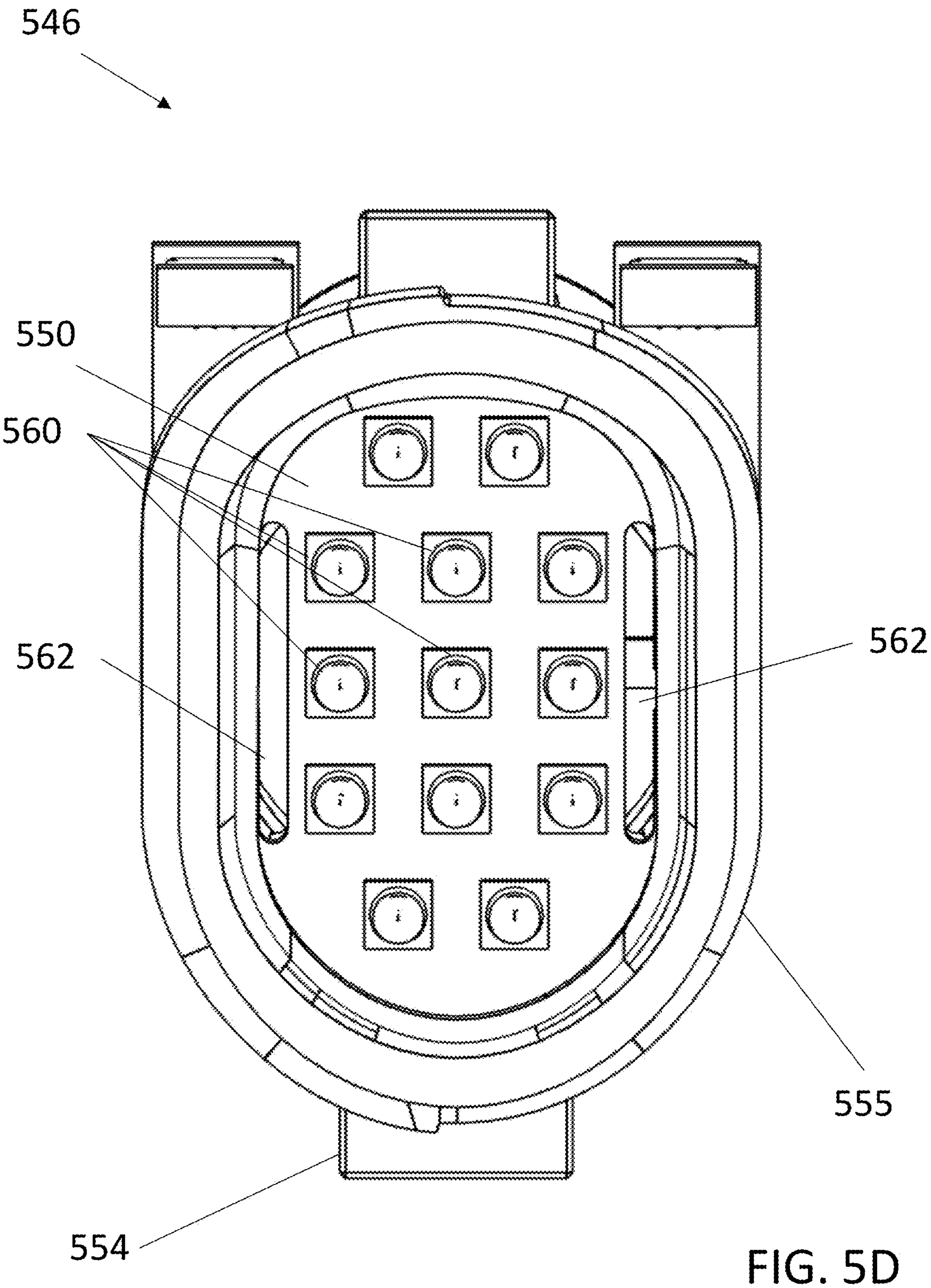
FIG. 5D is front elevation view of the infrared module of FIG. 5C in a partially disassembled state.
Figure 5E:
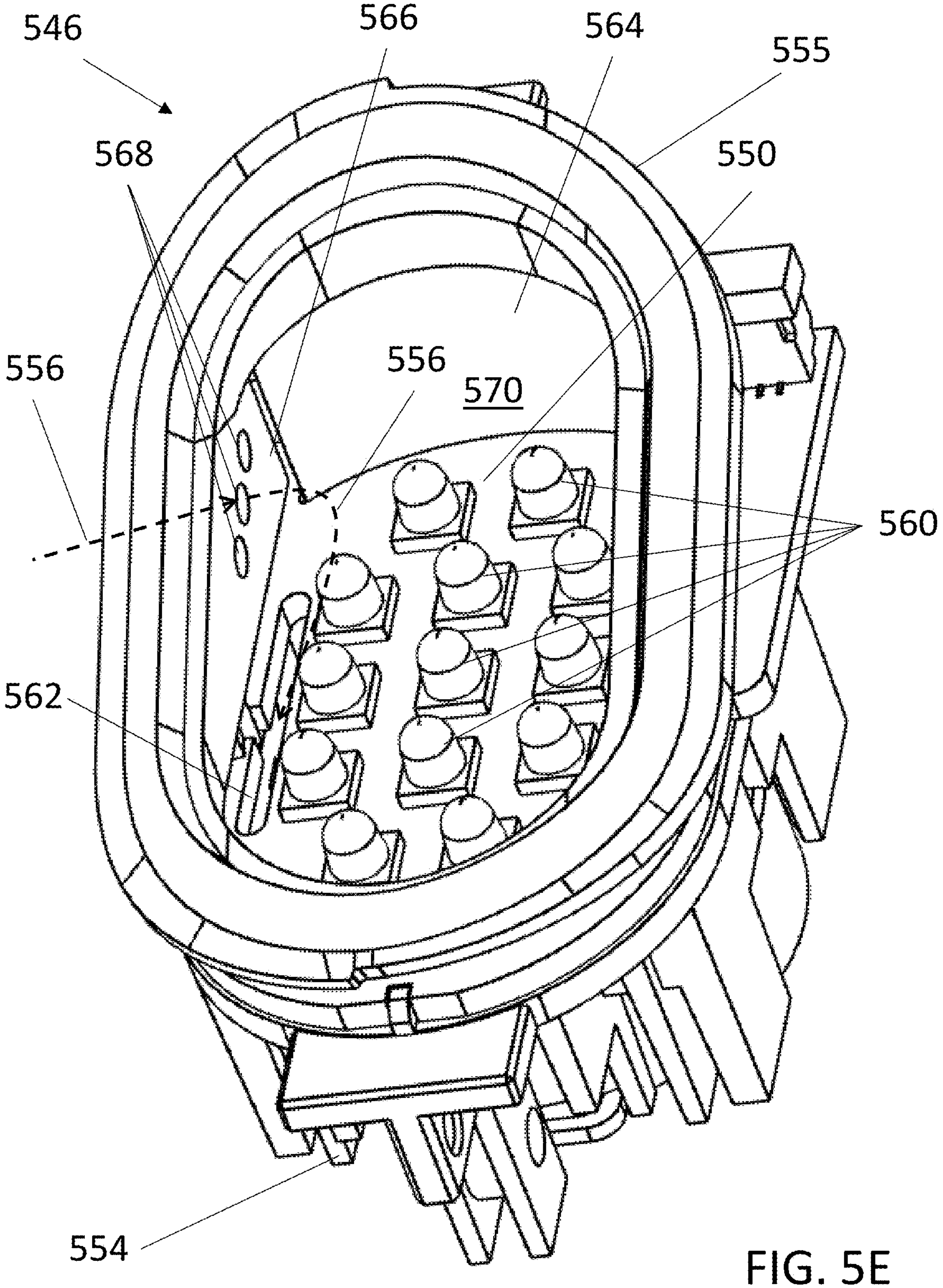
FIG. 5E is an oblique perspective view of the infrared module of FIG. 5C in the partially disassembled state of FIG. 5D.

Referring to FIGS. 5C, 5D, and 5E, infrared module further comprises a heat sink 554. Heat sink 554 can be constructed partially or entirely of thermally conductive materials, such as, for example, metal. In the illustrated example, board 550 is mounted to heat sink 554, though in other examples, heat sink 554 can comprise board 550. In particular, heat sink 554 of the illustrated example comprises a tray 558, and board 550 is positioned to be in contact with tray 558. In further examples, board 550 can be thermally coupled to tray 558. In further examples, heat sink 554 can lack a tray and be otherwise in contact with or thermally coupled to board 550.

Device 501 further comprises a fan 552 configured to cool infrared module 546. In the illustrated example, fan 552 is configured to draw air along an air flow path 556 that passes window 536 and heat sink 554. Fan 552 can therefore convectively cool window 536 and heat sink 554. Because heat sink 554 and board 550 are respectively configured such that thermal load from board 550 is conducted to heat sink 554, fan 552 also cools board 550 and infrared emitters 560 mounted to board 550 by cooling heat sink 554. Fan 552 of the illustrated example is positioned against tray 558, though in further examples fan 552 can be located anywhere else in device 501 and otherwise configured to cause air to move across any one or any combination of window 536, board 550, and heat sink 554.

Infrared light emitting diodes ("LEDs") 560 are mounted to board 550. Thus, device 501 of the illustrated example comprises a fan 552 and a heat sink 554, wherein an infrared radiation emitter in the form of an array of infrared LEDs 560 mounted to board 550 is mounted to heat sink 554. The infrared emitter is further contained in the housing of device 501. Thus the infrared radiation emitter of the illustrated example comprises a plurality of LEDs arrayed on an emitter plane 548 that is normal to infrared axis 542 and intersects edge axis 540. Infrared LEDs 560 of the illustrated example are one source of infrared radiation suitable for the infrared radiation emitter of device 501, though other sources of infrared radiation can be used in other examples. The infrared radiation emitter can be configured to emit radiation at a power density of, for example, from about 25 to about 80 milliwatts per square centimeter in an area centered on infrared axis 542 at a distance of from about 8 centimeters to about 10 centimeters from the array of infrared LEDs 560. Further the infrared radiation emitter can emit radiation at that power density and distance for an entirety of an area centered on infrared axis 542 having a diameter of about 10 centimeters. "About," in this instance, encompasses values within 10% of the stated number, and the stated number itself is explicitly contemplated.

Heat sink 554 comprises sidewalls 566 and an end wall 564 that, together with tray 558 and window 536, define an enclosed space 570 within which the infrared radiation emitters 560 are disposed. Heat sink 554 further comprises wall openings 568 and tray openings 562 that allow air to flow into or out of enclosed space 570. Wall openings 568 of the illustrated example are defined through sidewalls 566, though in other examples, wall openings 568 can additionally or alternatively be defined through end wall 564. In the illustrated example, heat sink 554 further comprises a frame 555 that contacts window 536, and sidewalls 566 are integrally formed with frame 555. Tray openings 562 are defined through tray 558 at a location not covered by board 550 such that air can pass board 550 as the air exits enclosed space 570 through tray 558. For example, as shown in FIGS. 5D and 5E, board 550 can comprise additional openings aligned with tray openings 562.

Fan 552 is configured to draw air through infrared module 546 along an air flow path 556. Air flow path 556 of the illustrated example enters enclosed space 570 through wall openings 568 and exits enclosed space 570 through tray 558. Accordingly, in the illustrated example, fan 552, window 536, and heat sink 554 cooperate to define an air flow path 556. Further, fan 552 is configured to mobilize air along the air flow path 556 that extends across at least a portion of window 536 and through fan 552. Fan 552 and heat sink 554 are respectively configured such that a downstream portion of flow path 556 that extends from window 536 to fan 552 extends through tray openings 562 and board 550, and an upstream portion of flow path 556 is defined through wall openings 568. Fan 552, window 536, and heat sink 554 are further respectively configured such that a portion of the air flow path flows across a portion of a surface of window 536 between entering space 570 through wall openings 568 and leaving space 570 through tray openings 562. Fan 552 thus causes air to travel past sidewalls 566, end wall 564, and tray 558, and thereby convectively cools heat sink 554. As noted above, board 550 is coupled to heat sink 554, so fan 552 cools board 550 and infrared emitters 560 by cooling heat sink 554. Air flow path 556 of the illustrated example also passes infrared emitters 560 and board 550, so fan 552 also convectively cools infrared emitters 560 and board 550 directly in the illustrated example. Air flow path 556 of the illustrated example also travels across window 536, meaning fan 552 also convectively cools window 536 in the illustrated example. In particular, air flow path 556 of the illustrated example travels across window 536 before passing infrared emitters 560, board 550, or tray 558, meaning the travelling air is relatively cool when it passes window 536. Air flow path 556 established by fan 552 is therefore relatively efficient in cooling window 536. Cooling window 536 efficiently can improve a user experience by reducing an amount of heat a user may perceive upon touching an exterior of window 536 when infrared emitters 560 are active. Air flow path 556 of the illustrated example can therefore prevent user discomfort upon touching window 536 while also cooling board 550 enough to enable use of a relatively powerful infrared emitter.

Figure 6A:
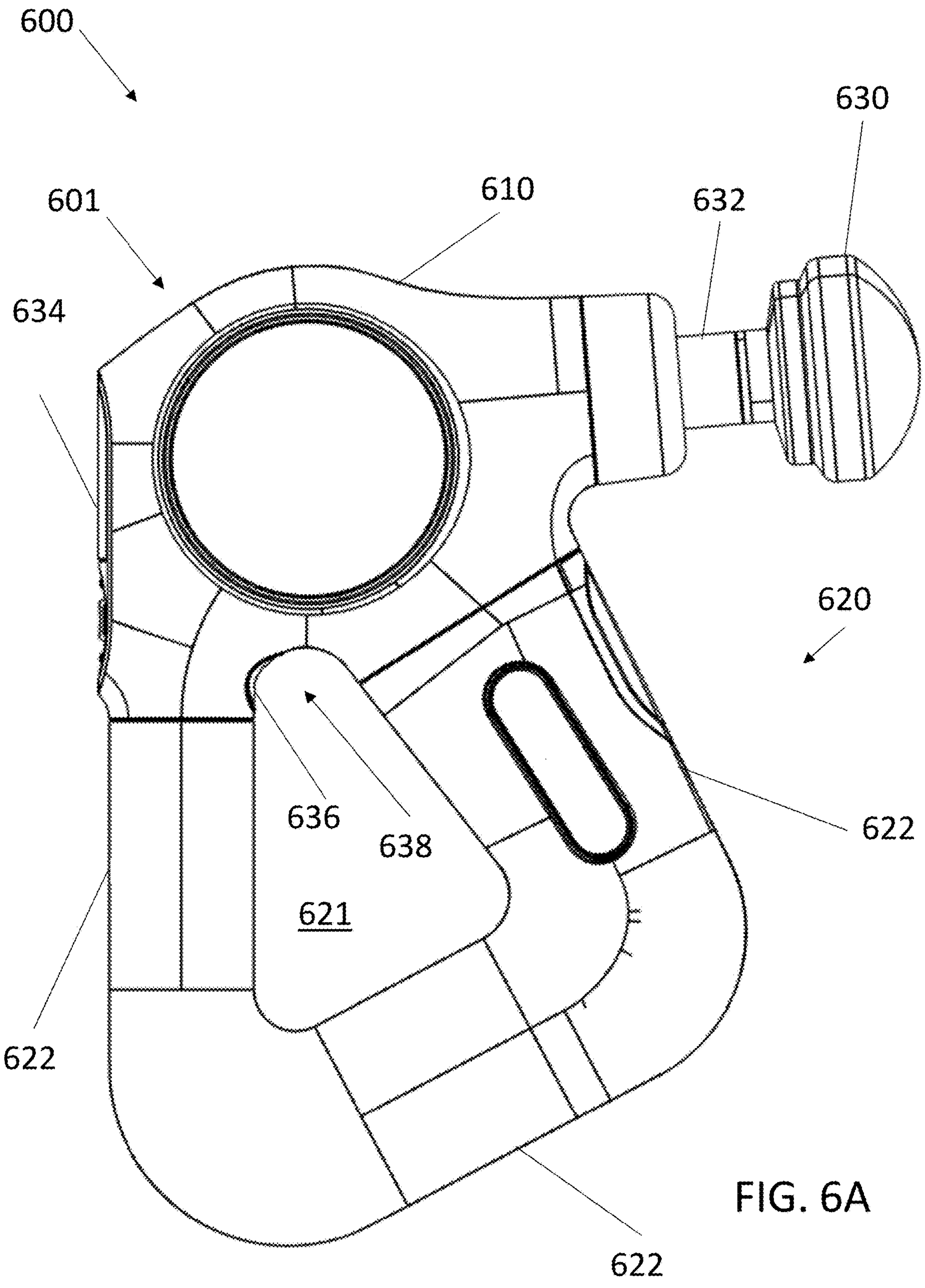
FIG. 6A is a side elevation view of a therapeutic system according to further aspects of the present disclosure.

FIG. 6A illustrates a therapeutic system 600 comprising a percussive massage device 601 and a massage head 630. Therapeutic system 600 can, in some examples, be the same as therapeutic systems 100, 500 described above. Accordingly, percussive massage device 601 and massage head 630 can be the same as percussive massage devices 101, 501 and massage attachment 130 or massage head 530, respectively, described above. Thus, the features described herein with regard to therapeutic system 600 can also be true of some implementations of the therapeutic system 100 of FIGS. 1A-1L or therapeutic system 500 of FIGS. 5A-5E. Similarly, the features described above with regard to therapeutic systems 100, 500 can also be true of some implementations therapeutic system 600 of FIGS. 6A-6E. However, therapeutic systems 100, 500, 600 need not be the same, and features described with regard to any of the systems 100, 500, 600 can be implemented independently of one another.

Massage head 630 is mounted to a distal end of a shaft 632 comprised by percussive massage device 601. Percussive massage device 601 comprises a head portion 610 from which shaft 632 extends. Percussive massage device 601 further comprises a housing and a motor 637, shown in FIG. 6D, contained within the housing. Percussive massage device 601 further comprises a handle 620 that also extends from head portion 610. Handle 620 of the illustrated example comprises three handle portions 622 in a co-planar, triangular arrangement, though in other examples other types of handles may be used. In further examples, handle 620 can have any shape enabling a user to grasp device 601 and use device 601 to apply percussive massage with massage attachment 630.

Shaft 632 is configured to reciprocate linearly along a reciprocation axis when motor 637 of massage device 601 is active. Thus, when the motor is active, device 601 may be used for percussive massage by applying massage head 630 to tissue while shaft 632 reciprocates. Percussive massage device 601 further comprises a control panel 634 comprising a switch configured to activate the motor that drives shaft 632. Control panel 634 of the illustrated example is positioned on a proximally facing side of head portion 610, though in further examples, control panel 634 can be positioned anywhere accessible by a user. In still further examples, percussive massage device 601 can be operable by remote control, such as, for example, through a smart device, and can lack a control panel 634. Control panel 634 or the remote control device can be used to select protocols and display information, such as measured heart rate, such as the protocols and information discussed below.

Device 601 comprises a heart rate sensor 636. In the illustrated example, heart rate sensor 636 is a photoplethysmography ("PPG") sensor. Thus, heart rate sensor 636 of the illustrated example comprises a local recess 644 that acts as an aperture for sensor 636, at which heart rate sensor 636 is recessed behind adjoining portions of the housing of device 601. However, in other examples, heart rate sensor 636 can be another type of heart rate sensor, such as, for example, an electrocardiography sensor, which may lack recess 644. A PPG sensor can be used to gain additional biometric and health information about a user, which can be used to enhance the breathing protocols and biometric feedback loops discussed below.

Figure 6B:
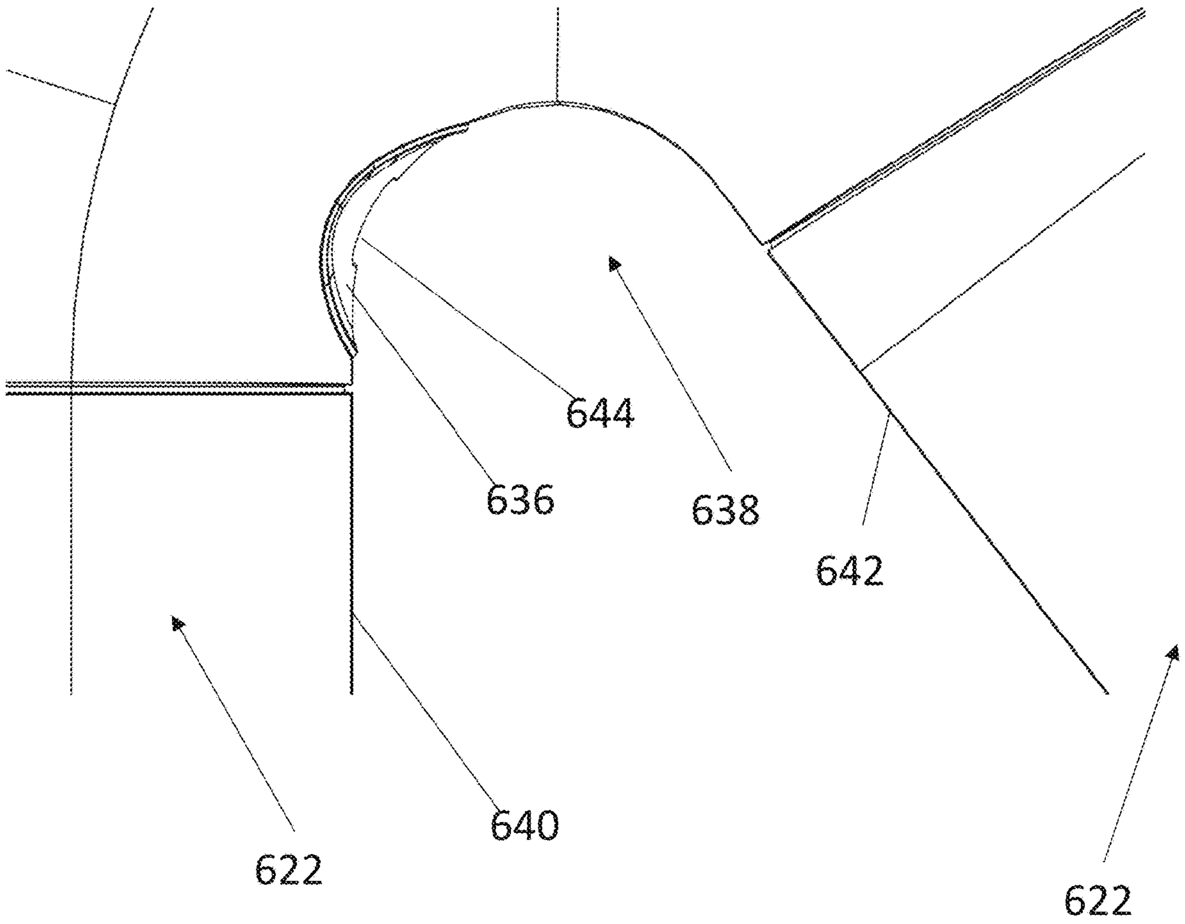
FIG. 6B is a close view of a portion of the therapeutic system of FIG. 6A.
Figure 6C:
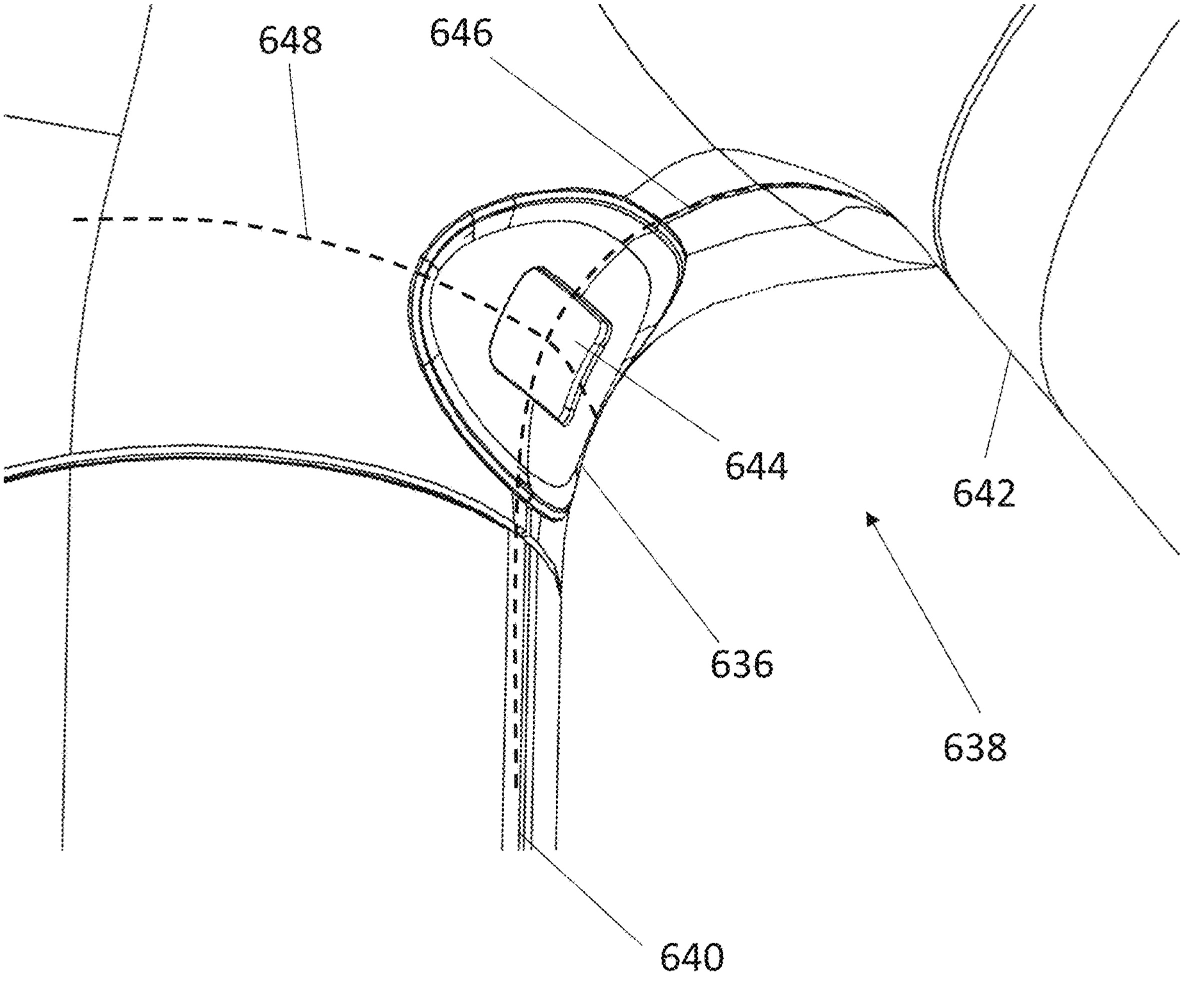
FIG. 6C is an oblique perspective view of the portion of FIG. 6B.

Referring to FIGS. 6A, 6B, and 6C, device 601 comprises a corner 638 that is at least partially defined by handle 620 and is where heart rate sensor 636 of the illustrated example is located. Corner 638 is defined where at least two mutually transverse portions of a housing of device 601 meet and define a concave profile on at least one plane. In the illustrated example, device 601 comprises housing that defines handle portion 622 and a corner 638, the corner 638 being defined where a handle portion 622 meets another portion of the housing of device 601. Further according to the illustrated example, corner 638 is defined where two handle portions 622 meet and form a concave profile on at least one plane. Still further according to the illustrated example, corner 638 is defined where two handle portions 622 meet each other and head 610 of massage device 601. Still further according to the illustrated example, corner 638 is defined where a first edge 640 defined by a first portion of the housing of device 601 meets a second edge 642 defined by as second portion of the housing to form a concave profile on at least one plane. In the illustrated example, the portions of the housing that define edges 640, 642 are two different handle portions 622 and the at least one plane includes the plane on which FIG. 6B is illustrated. Further according to the illustrated example, first edge 640 and second edge 642 are a first straight edge and a second straight edge, making corner 638 a transition between the first straight edge and the second straight edge. The transition is a curvature on a plane parallel to the plane on which FIGS. 6A and 6B are illustrated. In the illustrated example, the transition is also a curvature on a plane on which a concave profile 646 is defined. Still further according to the illustrated example, corner 638 is defined where two handle portions 622 meet and faces a handle space 621 surrounded on at least one plane by handle 620. Though heart rate sensor 636 of the illustrated example is located at corner 638, heart rate sensor 636 in other examples can be located elsewhere on device 601.

As shown specifically in FIG. 6C, heart rate sensor 636 of the illustrated example is located at a corner 638 of the housing of device 601 that defines a concave profile 646 on a first plane and a convex profile 648 on a second plane normal to the first plane. Further, heart rate sensor 636 is located at an intersection between concave profile 646 and convex profile 648. Thus, according to the illustrated example, the recess 644 defined by heart rate sensor 636 is a local recess in the housing behind the concave profile 646 and the convex profile 648. Further, the recess 644 defined by heart rate sensor 636 is a local recess in the housing located at an intersection between the first plane, on which the concave profile 646 is defined, and the second plane, on which convex profile 648 is defined. The placement of heart rate sensor 636 at the intersection between concave profile 646 and convex profile 648 facilitates grasping device 601 such that the user's hand will contact heart rate sensor 636 because concave profile 646 can rest on a user's fingers when the user's fingers are wrapped around convex profile 648. Thus, grasping device 601 by wrapping fingers around convex profile 648 allows a weight of the device to be transferred to the fingers by concave profile 646. In particular, the illustrated placement of heart rate sensor 636 at a corner 638 adjacent head 610 makes heart rate sensor 636 positioned like a trigger with respect to handle 620 and shaft 632. Heart rate sensor 636 can therefore be adapted to act as a convenient additional receiver for manual control inputs as described further below. In some embodiments, a user may tap their index finger or pointer finger on heart rate sensor 636 while holding the device 601.

Accordingly, percussive massage device 601 can be configured to sense skin on heart rate sensor 636 and detect a tap on heart rate sensor 636 from an absence of skin on heart rate sensor 636 followed by a presence of skin on heart rate sensor. Device 601 can further be configured to execute a function upon detecting a predetermined sequence of at least two taps on heart rate sensor 636. Each predetermined sequence of taps can have predefined parameters comprising a total number of taps and a timing of taps with respect to one another. Thus, the predetermined sequence of taps can be a predetermined quantity of taps within a predetermined amount of time. In some examples, a function executed by device 601 upon detecting a predetermined sequence of taps on heart rate sensor 636 can be to display a heart rate detected with heart rate sensor 636. In further examples, device 601 can be configured to display a heart rate detected with heart rate sensor 636 upon detecting two taps upon heart rate sensor 636 within a predetermined amount of time. The predetermined amount of time can be, for example, three seconds, two seconds, or one second.

In the illustrated example, the plane on which concave profile 646 is defined is a plane on which central axes of all three handle portions 522 extend. Further according to the illustrated example, the plane on which concave profile 646 is defined is a plane parallel to the planes of FIGS. 6A and 6B. However, heart rate sensor 636 can be located elsewhere on device 601 in other examples.

Heart rate sensor 636 can be used as a touch sensor. For example, measurements from heart rate sensor 636 can be used to determine whether skin is in contact with heart rate sensor 636. In further examples, heart rate sensor 636 can be used as a touch sensor by configuring a controller of device 601 to determine that skin touches heart rate sensor 636 when heart rate sensor 636 detects a heartbeat and to determine that skin does not touch heart rate sensor 636 when heart rate sensor 636 does not detect a heartbeat.

By using heart rate sensor 636 as a touch sensor, heart rate sensor 636 can further be used as a receiver for manual control inputs. For example, a controller of device 601 can be configured to detect predefined sequences of touch inputs to heart rate sensor 636 and execute functions associated with those sequences upon detection. The sequences may be selected to be easily performed by a user but uncommon in normal handling of device 601 during use of other functions of device 601, such as percussive massage. For example, the predefined sequence or sequences of touch inputs to heart rate sensor 636 that device 601 may be configured to detect can comprise multiple taps in quick succession.

Figure 6D:
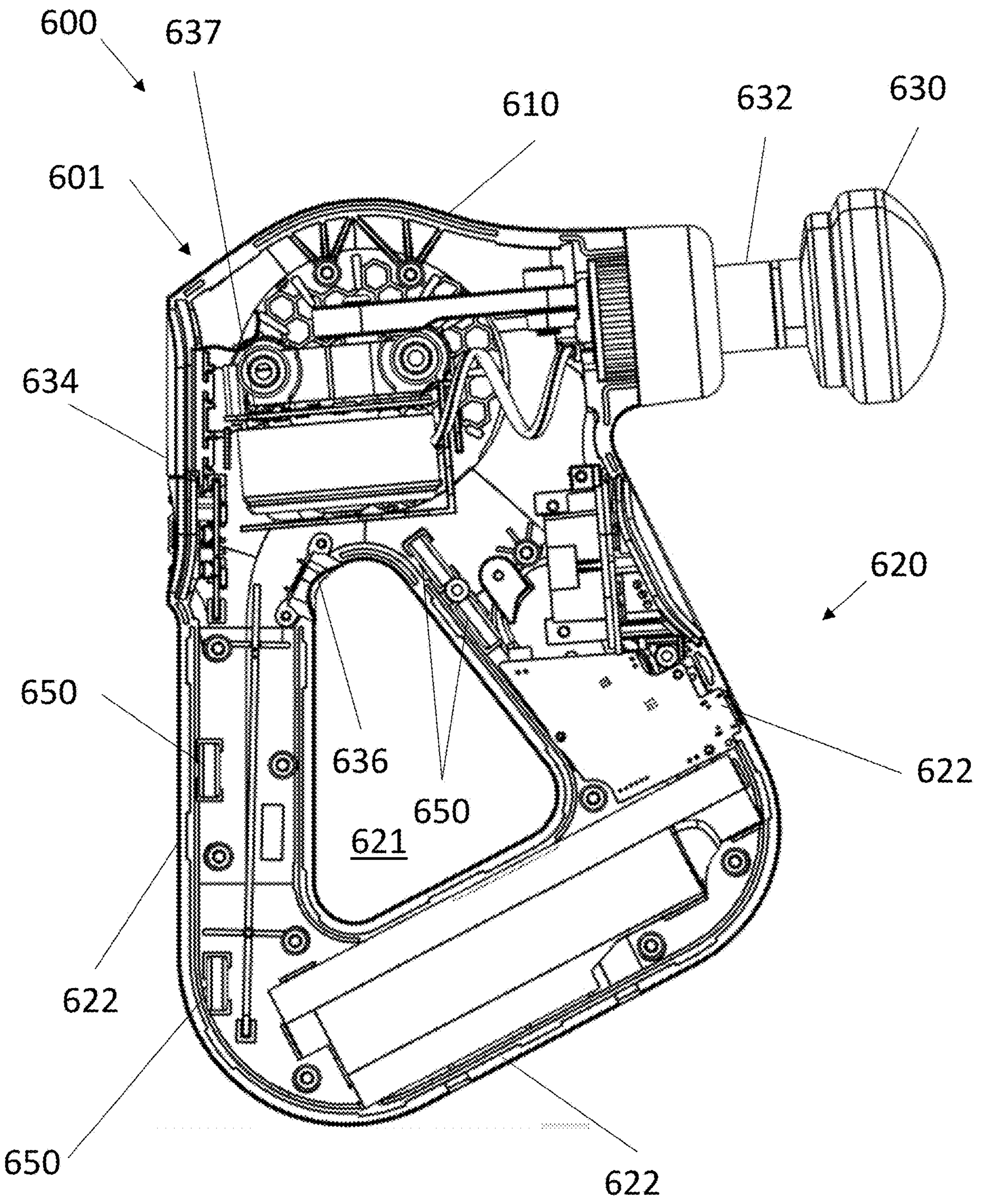
FIG. 6D is a side elevation view of the therapeutic system of FIG. 6A in a partially disassembled state.

Turning to FIG. 6D, device 601 comprises one or more vibration motors 650 for providing haptic feedback to a user grasping device 601. In the illustrated example, device 601 comprises two vibration motors 650 in each of the two handle portions 622 that extend from head 610. Thus, device 601 comprises a reciprocation motor 637 in addition to a first vibration motor 650 disposed in a first handle portion 622 and a second vibration motor 650 disposed in a second handle portion 622. Placement of vibration motors 650 in each of two handle portions 622 facilitates strong haptic feedback to two hands of a user when the user grasps both handle portion 622 that comprise vibration motors 650. However, in other examples, device 601 can comprise any number of vibration motors 650, and the vibration motors 650 can be located anywhere in device 601. In some examples, including the illustrated example, at least one vibration motor can be placed to provide an intended intensity of haptic feedback to a hand that grasps device 601 in at least one expected position wherein the hand contacts heart rate sensor 636. In some such examples, heart rate sensor 636 can be used in cooperation with vibration motors 650 to provide haptic feedback that responds to a user's heart rate.

As shown in FIG. 6D, at least one vibration motor 650 is positioned in a handle portion 622 against a wall of that handle portion 622 facing away from another handle portion 622 having a vibration motor 650 therein. Further, at least one vibration motor 650 is positioned against a wall of another, wider handle portion 622 facing toward another handle portion 622 having a vibration motor 650 therein. In particular, vibration motors 650 are positioned against proximal facing walls of the handle portions 622 that contain vibration motors 650. In other examples, vibration motors 650 can be positioned other than where shown in FIG. 6D.

Figure 6E:
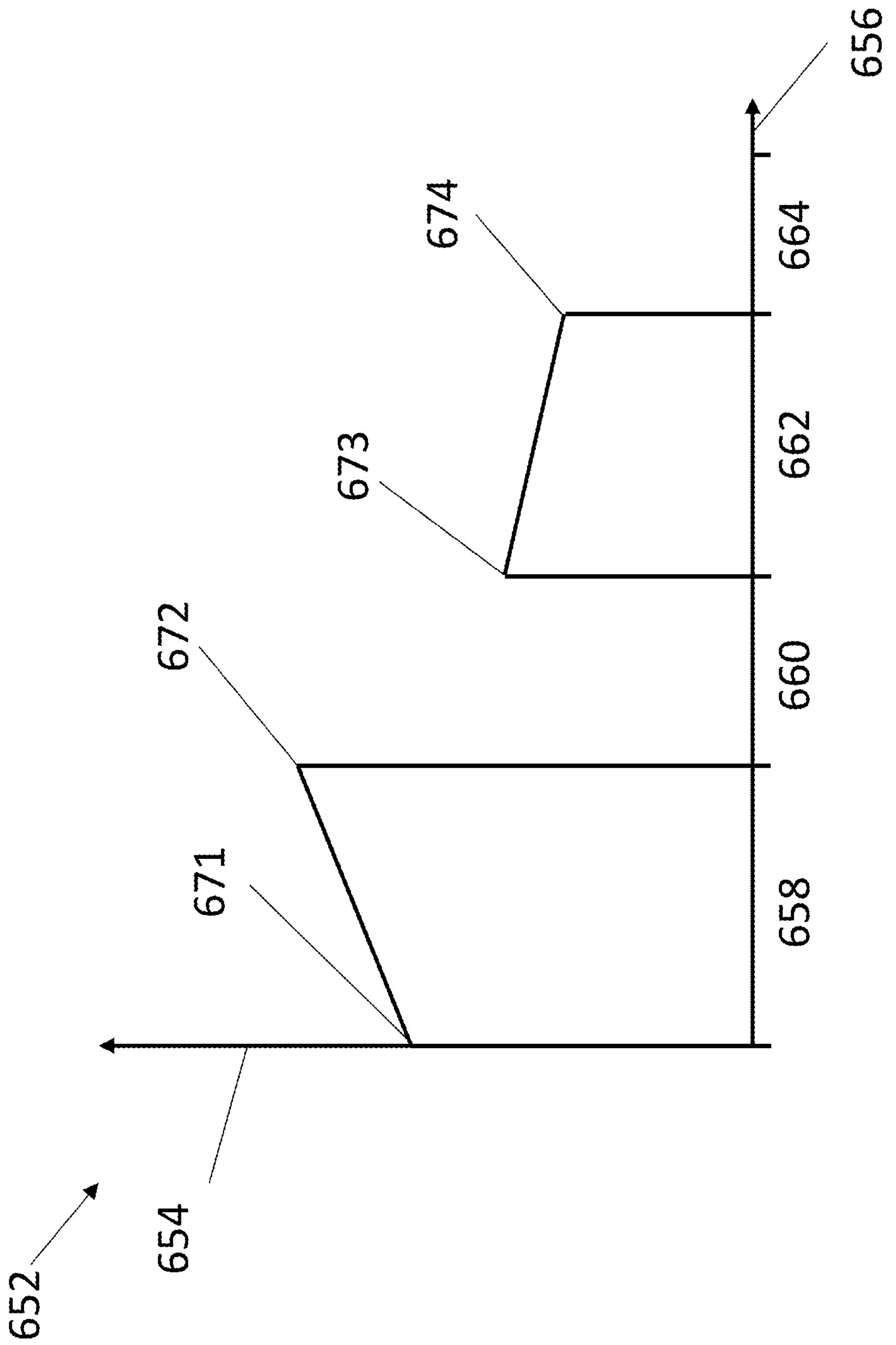
FIG. 6E is a graphical representation of a therapeutic protocol executable by the therapeutic system of FIG. 6A.

FIG. 6E shows a frequency over time graph of a guided breathing protocol 652 that can be implemented with vibration motors 650. FIG. 6E depicts protocol 652 with respect to a frequency axis 654 and a time axis 656. Protocol 652 comprises, in sequence, a first stage 658, a first gap 660, a second stage 662, and a second gap 664. Vibration motors 650 begin first stage 658 operating at a first frequency 671. Vibration motors 650 gradually accelerate through first stage 658 until reaching a second frequency 672, which is greater than first frequency 671, at the end of first stage 658. Upon the conclusion of first stage 658, vibration motors 650 cease to operate for a duration of first gap 660. Following first gap 660, motors 650 begin second stage 662 operating at a third frequency 673. Vibration motors 650 gradually decelerate through second stage 662 until reaching a fourth frequency 674, which is less than third frequency 673, at the end of second stage 662. Following second gap 664, protocol 652 can begin again at first stage 658. Upon the conclusion of second stage 662, vibration motors 650 cease to operate for a duration of second gap 664. In the illustrated example, both third frequency 673 and fourth frequency 674 are less than first frequency 671 and second frequency 672. However, the proportions of frequencies 671, 672, 673, 674 relative to one another can vary in other examples. In further examples, the relative durations of stages 658, 662 and gaps 660, 664 can vary. In still further examples, either or both of gaps 660, 664 can be eliminated.

The frequency at which vibration motors 650 operate during protocol 652 can be used as a prompt for a user's breathing. For example, a user can interpret increasing frequency, such as during first stage 658, as a prompt to inhale. A user can further interpret decreasing frequency, such as during second stage 662, as a prompt to exhale. A user can further interpret deactivation of motors such as during gaps 660, 664, or operation at a constant frequency, as a prompt to hold the user's breath. Variations upon protocol 652 can be generated and provided to device 601 to prepare users for differing occasions and mental states. For example, slower variations on protocol 652 can be used to calm a user, lower a user's heart rate, prepare a user for meditation, or prepare a user for sleep. In further examples, faster variations on protocol 652 can be used to bring a user to a state of alertness, raise a user's heart rate, or prepare a user for athletic activity. Variations on protocol 652 can further be adapted dynamically in response to measurements from heart rate sensor 636 to bring a user to an intended heart rate or cause the user's heart rate to change at an intended rate.

The durations of stages 658, 662 and gaps 660, 664 can vary across implementations. Stages 658, 662 can have a duration longer than the time required for a vibration motor 650 to transition between being deactivated and operating at a haptically perceptible frequency, but shorter than an amount of time required for a typical user to fully inhale or exhale. Stages 658, 662 can therefore be, for example, between 0.4 and 30 seconds long. In further examples, stages 658, 662 can be between 1 second and 20 seconds long, between 2 seconds and 15 seconds long, or between 3 seconds and 10 seconds long. A duration of first stage 658 can vary independently of a duration of second stage 662. Durations of gaps 660, 664 can similarly vary independently of one another and of durations of stages 658, 662. In protocols 652 according to other examples, more stages wherein vibration motors 650 are active can occur, and more or fewer gaps wherein vibration motors 650 are inactive can occur.

In view of the foregoing, protocol 652 can comprise a first stage 658 having a duration between 0.4 and 30 seconds and a second stage 662 having a duration between 0.4 and 30 seconds. In protocol 652, at least one vibration motor 650 begins first stage 658 at a first operating frequency 671 that is greater than zero and less than a second operating frequency 672, ends first stage 658 at the second operating frequency 672, and operates between first operating frequency 671 and second operating frequency 672 for an entire time between a beginning and an ending of first stage 658. Similarly, in protocol 652, at least one vibration motor 650 begins second stage 662 at a third operating frequency 673, ends second stage 662 at a fourth operating frequency 674 that is greater than zero and less than third operating frequency 673, and operates between third operating frequency 673 and fourth operating frequency 674 for an entire time between a beginning and an ending of second stage 662. Protocol 652 further comprises a repeating cycle that, in turn, comprises first stage 658, a first gap 660 following first stage 658, wherein the vibration motors 650 are deactivated during first gap 660, second stage 662 following first gap 660, and a second gap 664 following second stage 662, wherein the vibration motors 650 are deactivated during second gap 664. Another iteration of the cycle beginning with first stage 658 can follow second gap 664.

Though protocol 652 is described above with regard to changing frequency over time, the same or similar protocols 652 can be implemented through vibration motors 650 with respect to varying other haptic parameters over time, such as such as haptic intensity.

In further examples, device 601 can be configured to run a routine that varies an operating parameter of vibration motors 650 in response to a heart rate measured by heart rate sensor 636. In some examples, the operating parameter can be a pulse frequency. A pulse of vibration motors 650 can be an increase in operating frequency followed by a decrease in operating frequency, such as an activation followed by a deactivation. Thus, a pulse frequency for vibration motors 650 can be a frequency at which vibration motors 650 are made to pulse. Accordingly, device 601 according to some examples can be configured to run a routine that varies a frequency at which vibration motors 650 are made to pulse in response to a heart rate measured by heart rate sensor 636. Device 601 can, for example, run the routine by causing the pulse frequency of vibration motors 650 be a function of heart rate measured by heart rate sensor 636, such as a geometric function or a function wherein the pulse frequency is a sum of a heart rate measured by heart rate sensor 636 and a constant. The constant can be positive or negative. Thus, in some examples, device 601 can be configured to vary the pulse frequency of vibration motors 650 to be offset from a heart rate measured by heart rate sensor 636 by a predetermined proportion or a predetermined magnitude.

Accordingly, device 601 can be configured to use heart rate sensor 636 and vibration motors 650 to create a haptic feedback loop wherein a user's heart rate is measured through heart rate sensor 636 then guided toward a goal rate by providing pulsing haptic feedback with vibration motors 650 in a manner similar to what is described in U.S. patent application Ser. No. 17/933,419, filed Sep. 19, 2022, the entirety of which is hereby incorporated herein by reference. For example, it is possible to guide a human heart rate up or down by providing external stimuli that pulse similarly to a human heart, but at a slightly higher or lower frequency. Thus, device 601 can lower a user's heart rate by continuously or periodically measuring the heart rate with heart rate sensor 636, then pulsing vibration motors 650 at a slightly lower frequency than the most recent measured heart rate. Similarly, device 601 can raise a user's heart rate by continuously or periodically measuring the heart rate with heart rate sensor 636, then pulsing vibration motors 650 at a slightly higher frequency than the most recent measured heart rate. Further, a user's heart rate can be held steady by pulsing vibration motors 650 at a constant rate within a typical range for human heart rates.

The user may select a heart control function of percussive massage device 601 for a predetermined treatment period, such as, for example, fifteen minutes. In other embodiments, the treatment period may be, for example, between ten and twenty minutes, between five and twenty-five minutes, or between one and thirty minutes, or any other suitable length of time. Each treatment period may be divided up into a plurality of smaller dynamic periods where the pulse rate may be updated based on the heart rate of the user.

For a heart rate adjustment protocol conducted with percussive massage device 601, a user's heart rate may be found with heart rate sensor 636. For a first dynamic period, percussive massage device 601 may detect the heart rate of the user, such as by use of sensor 636. Percussive massage device 601 may then operate vibration motors 650 at a first pulse rate equal to a first percentage of the heart rate of the user. The first pulse rate, or any other pulse rates mentioned herein with regard to heart rate control or adjustment processes, can optionally be either individual pulses of equal magnitude and timing or alternating primary and secondary pulses timed to mimic a sinus rhythm of a human heart. If the first pulse rate is determined to be greater than the upper treatment limit, meaning an upper limit on the pulse rate device 601 is configured to achieve with vibration motors 650, percussive massage device 601 may operate at the upper treatment limit. In the examples provided in FIGS. 6G-6H, the first percentage is 100%, though other percentages are possible in other examples.

For a second dynamic period, following the first dynamic period, percussive massage device 601 may detect the heart rate of the user. Percussive massage device 601 may then operate at second pulse rate equal to a second percentage of the heart rate of the user. If the second pulse rate is determined to be greater than the upper treatment limit, percussive massage device 601 may operate the at the upper treatment limit. The second percentage is less than the first percentage. For example, the second percentage may be 97%. Percussive massage device 601 continues to lower the user's pulse rate by implementing lowering percentages for following dynamic periods until the treatment period is over, a desired heart rate of the user is achieved, or the pulse rate is equal to the lower treatment limit, meaning a lower limit on the pulse rate device 601 is configured to achieve with vibration motors 650. If the desired heart rate of the user is achieved before the end of the treatment period, percussive massage device 601 may maintain a pulse rate of the vibration motors 650 equal to the desired heart rate.

For example, if a user has a heart rate of 88 beats per minute and wishes to lower the heart rate to 50 beats per minute, percussive massage device 601 may use pulses to provide haptic feedback with vibration motors 650 in the first minute of the treatment to mimic a heart rate of about 60 beats per minute, if about 60 beats per minute is the upper treatment limit. If in the second minute of the treatment, the user's heart rate has dropped to 60 beats per minutes, percussive massage device 601 may provide haptic feedback with vibration motors 650 to mimic a heart rate of 58 beats per minute (97% of user's heart rate).

In another example, if a user has a heart rate of 54 beats per minute and wishes to lower the heart rate to 45 beats per minute, percussive massage device 601 may use pulses to provide haptic feedback in the first minute of the treatment to mimic a heart rate of about 54 beats per minute (100% of user heart rate). If in the second minute of the treatment, the user's heart rate has dropped to 49 beats per minutes, percussive massage device 601 may use pulses of vibration motors 650 to provide haptic feedback to mimic a heart rate of 48 beats per minute (97% of user's heart rate). The heart rate the haptic feedback is provided to mimic can decrease further as time goes on according to an example shown in FIGS. 6F and 6G.

In another operational mode, percussive massage device 601 may be configured to increase the heart rate. For example, the user may have a lowered heart rate due to sleeping, resting, or otherwise being in a relaxed state and desire to increase their heart rate to become focused or energized. In the energize or focus operational mode, for a first dynamic period, sensor 636 may detect the heart rate of the user with heart rate sensor 636. Percussive massage device 601 may then operate vibration motors 650 at a first pulse rate equal to a first percentage of the heart rate of the user. If the first pulse rate is determined to be lower than the lower treatment limit, percussive massage device 601 may operate the at the lower treatment limit. In the example of FIG. 6H, the first percentage is 100%. For a second dynamic period, sensor 636 may detect the heart rate of the user. Percussive massage device 601 may then operate vibration motors 650 at a second pulse rate equal to a second percentage of the heart rate of the user. The second percentage is greater than the first percentage. For example, the second percentage may be about 103%. Percussive massage device 601 may continue to increase the pulse rate by using increasing the percentages for following dynamic periods.

For example, if a user has a heart rate of 40 beats per minute and wishes to increase the heart rate to 50 beats per minute, percussive massage device 601 may use pulses of vibration motors 650 to provide haptic feedback in the first minute of the treatment to mimic a heart rate of 40 beats per minute. If in the second minute of the treatment, the user's heart rate has increased to 44 beats per minutes, percussive massage device 601 may use pulses to provide haptic feedback to mimic a heart rate of 45 beats per minute (103% of user's heart rate).

In some embodiments, percussive massage device 601 may include five heart rate adjustment programs such as, for example, focus, energize, relax, inspire, and sleep. For each of said programs, percussive massage device 601 may use pulses of vibration motors 650 to provide haptic feedback within a range of heart rates set as a goal within the program.

In some embodiments, a method for providing heart rate information about a user, and/or providing biofeedback to the user, may include defining a plurality of heart rate zones as ranges of beats per minute of the user. In some embodiments, the zones may be defined by parameters other than heart rate ranges. In some embodiments, the method may include determining upper and lower limits for heart rate zones, and/or associating a color with each of said heart rate zones. In some embodiments, the method may include receiving heart rate information from sensor 636 or another device, and/or providing biofeedback to the user of percussive massage device 601 by activating vibration motors 650 to pulse in a way that corresponds to each of the intended zones and user consciousness states. In some embodiments, the method may also include initiating a display or other visual indicia on the percussive massage device 601, such as at control panel 634, or a separate device (e.g., a phone) in response to receiving the heart rate information from the user and/or providing biofeedback to the user. In some embodiments, a color of the display or other visual indicia corresponds with the color associated with one of said heart rate zones.

In some embodiments, a user may employ a mobile application on a mobile device to select routines or protocols for utilizing the percussive massage device 601 with any of the therapeutic massage attachments (e.g., cooling, heating, or vibration attachments). The mobile application may be paired with the percussive massage device 601 (e.g., via Bluetooth), and the user may also select personalized routines or protocols through the mobile application for guided breathing and haptic feedback provided through the vibration motors 650. In some embodiments, a user interface of the control panel 634 may provide prompts to the user for holding the device and instructions to the user for inhaling and exhaling along with a predetermined pulse rate or vibration pattern of the vibration motors 650. In some embodiments, a mobile application paired with the percussive massage device 601 may provide a visual and/or audio output that is customized to match the pulse rate or vibration pattern of the vibration motors 650. In some embodiments, the visual output may include a visualization or visual imagery that is displayed via a user interface of the mobile device paired with the percussive massage device 601. In some embodiments, the audio output may include one or more musical tracks that are composed to energize, focus, relax, or inspire the user, and may be similar in some respects to the audio protocols described in U.S. patent application Ser. No. 17/933,423, filed Sep. 19, 2022, the entirety of which is hereby incorporated herein by reference. In some embodiments, before and/or after using the personalized routines or protocols for guided breathing and haptic feedback, the mobile application may provide the user with measured heart rate readings (e.g., via heart rate sensor 636) to show the user the effects and benefits of using the personalized routines or protocols for the percussive massage device 601.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A massage head for a percussive therapy device, comprising:

a base configured to connect a massage attachment to a reciprocating shaft of a percussive massage device;

an end portion comprising a heater and a heat spreader thermally coupled to the heater, wherein the heat spreader is inflexible; and a medial portion located between the base and the end portion, the medial portion being configured to resiliently bias the end portion away from the base;

wherein the end portion comprises a rigid frame that retains the heater and a compressible pad positioned proximally of the heater and between the heater and a portion of the rigid frame.

2. The massage head of claim 1, comprising a flexible cover that extends across a distal side of the heater.

3. The massage head of claim 2, wherein the heat spreader comprises a panel between the heater and the flexible cover, wherein the panel has a thermal conductivity of from about 90 to about 5000 watts per meter-kelvin.

4. The massage head of claim 3, wherein the end portion defines a distal surface, and an area of a distal side of the panel is at least 90% of an area of the distal surface.

5. The massage head of claim 3, wherein the panel comprises metal.

6. The massage head of claim 1, comprising:

a temperature sensor located in the end portion and configured to measure a temperature of the heater; and a wire extending from the temperature sensor to the base.

7. The massage head of claim 6, comprising a controller located in the base, wherein the wire is connected to the controller.

8. A percussive massage system comprising:

the massage head of claim 1; and a percussive massage device comprising a reciprocating shaft and a motor, wherein the reciprocating shaft is configured to reciprocate linearly along a reciprocation axis in response to activation of the motor, and the medial portion is configured to resiliently bias the end portion away from the base along a proximal-distal axis that is parallel to the reciprocation axis.

9. The percussive massage system of claim 8, wherein the base is configured to releasably connect the massage head to the reciprocating shaft.

10. A massage attachment for a percussive therapy device, comprising:

a base configured to connect the massage attachment to a reciprocating shaft of a percussive therapy device;

a heater;

a heat spreader positioned distally of the base and thermally coupled to the heater;

a cushion positioned between the base and the heat spreader and configured to resiliently bias the heat spreader away from the base; and a rigid frame within which the heater is disposed, the rigid frame being positioned distally of the cushion.

11. The massage attachment of claim 10, comprising a flexible cover within which the cushion is disposed.

12. The massage attachment of claim 11, wherein the heat spreader is disposed within the flexible cover.

13. The massage attachment of claim 11, wherein the heat spreader is a panel disposed within the flexible cover distally of the heater, the panel having a thermal conductivity of from about 90 to about 5000 watts per meter-kelvin.

14. The massage attachment of claim 10, comprising a controller mounted to the base and electrically connected to the heater through the cushion.

15. The massage attachment of claim 10, comprising a compressible pad located proximally of the heater and between the heater and a portion of the rigid frame.

16. The massage attachment of claim 10, wherein the cushion comprises a foam block.

17. A massage head for a percussive therapy device, comprising:

a base configured to connect a massage attachment to a reciprocating shaft of a percussive massage device;

an end portion comprising a heater and a rigid frame that retains the heater; and a medial portion located between the base and the end portion, the medial portion being configured to resiliently bias the end portion away from the base;

wherein the end portion comprises a compressible pad positioned proximally of the heater and between the heater and a portion of the rigid frame.

* * * * *